(12) United States Patent
Miyamoto

(10) Patent No.: US 10,298,927 B2
(45) Date of Patent: May 21, 2019

(54) IMAGE DECODING DEVICE AND METHOD

(71) Applicant: SONY CORPORATION, Tokyo (JP)

(72) Inventor: Kohei Miyamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 75 days.

(21) Appl. No.: 15/127,141

(22) PCT Filed: Mar. 13, 2015

(86) PCT No.: PCT/JP2015/057532
§ 371 (c)(1),
(2) Date: Sep. 19, 2016

(87) PCT Pub. No.: WO2015/146646
PCT Pub. Date: Oct. 1, 2015

(65) Prior Publication Data
US 2017/0127061 A1    May 4, 2017

(30) Foreign Application Priority Data

Mar. 28, 2014  (JP) ................................. 2014-067813

(51) Int. Cl.
*H04N 19/122* (2014.01)
*H04N 19/436* (2014.01)
(Continued)

(52) U.S. Cl.
CPC ......... *H04N 19/122* (2014.11); *H04N 19/124* (2014.11); *H04N 19/127* (2014.11);
(Continued)

(58) Field of Classification Search
None
See application file for complete search history.

(56) References Cited

U.S. PATENT DOCUMENTS 9,743,089 B1 * 8/2017 Nishitani ............. H04N 19/463
9,894,364 B2 * 2/2018 Nishitani ............. H04N 19/463
(Continued)

FOREIGN PATENT DOCUMENTS

| JP | 2012-147293 A | 8/2012 |
| JP | 2013-038758 A | 2/2013 |

(Continued)

OTHER PUBLICATIONS

Bross, et al., "Editors' proposed corrections to HEVC version 1", Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, 310 pages.

(Continued)

*Primary Examiner* — Reza Aghevli
(74) *Attorney, Agent, or Firm* — Chip Law Group

(57) ABSTRACT

The present disclosure relates to an image decoding device and method through which it is possible to perform a decoding process more efficiently. The present disclosure is provided with a decoding unit configured to generate decoded data by decoding encoding data obtained by encoding image data, and a processing unit configured to independently perform processes of the decoded data generated by the decoding unit for each block size performed in a method according to a block size based on a block structure of the encoding data. The present disclosure is applicable, for example, to an image decoding device and the like.

18 Claims, 31 Drawing Sheets

(51) Int. Cl.
*H04N 19/176* (2014.01)
*H04N 19/127* (2014.01)
*H04N 19/157* (2014.01)
*H04N 19/124* (2014.01)
*H04N 19/159* (2014.01)
*H04N 19/51* (2014.01)
*H04N 19/61* (2014.01)
*H04N 19/30* (2014.01)
*H04N 19/597* (2014.01)

(52) U.S. Cl.
CPC ......... *H04N 19/157* (2014.11); *H04N 19/159* (2014.11); *H04N 19/176* (2014.11); *H04N 19/436* (2014.11); *H04N 19/51* (2014.11); *H04N 19/61* (2014.11); *H04N 19/30* (2014.11); *H04N 19/597* (2014.11)

(56) References Cited

U.S. PATENT DOCUMENTS

| | | | | |
|---|---|---|---|---|
| 9,900,600 | B2* | 2/2018 | Nishitani | H04N 19/463 |
| 9,936,198 | B2* | 4/2018 | Nishitani | H04N 19/463 |
| 2010/0118945 | A1* | 5/2010 | Wada | H04N 19/176 375/240.12 |
| 2011/0299788 | A1* | 12/2011 | Suzuki | H04N 19/176 382/233 |
| 2012/0082224 | A1* | 4/2012 | Van Der Auwera | H04N 19/176 375/240.12 |
| 2013/0083839 | A1* | 4/2013 | Yang | H04N 19/30 375/240.02 |
| 2013/0208805 | A1* | 8/2013 | Sato | H04N 19/52 375/240.16 |
| 2013/0343664 | A1* | 12/2013 | Kobayashi | H04N 19/139 382/233 |
| 2014/0072215 | A1* | 3/2014 | Terada | G06T 9/007 382/166 |
| 2014/0079135 | A1* | 3/2014 | Van der Auwera | H04N 19/70 375/240.18 |
| 2014/0119455 | A1* | 5/2014 | Kobayashi | H04N 19/176 375/240.18 |
| 2014/0286403 | A1* | 9/2014 | Nishitani | H04N 19/463 375/240.03 |
| 2014/0348233 | A1* | 11/2014 | Kondo | H04N 19/119 375/240.12 |
| 2015/0381980 | A1* | 12/2015 | Tsuchiya | H04N 19/176 375/240.02 |

FOREIGN PATENT DOCUMENTS

| | | |
|---|---|---|
| WO | 2007/136093 A | 11/2007 |
| WO | 2007/136093 A1 | 11/2007 |
| WO | 2012/046435 A1 | 4/2012 |
| WO | 2013/076888 A1 | 5/2013 |
| WO | 2013/108330 A1 | 7/2013 |

OTHER PUBLICATIONS

Benjamin Bross et al., "Editors' proposed corrections to HEVC version 1", Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, Document: JCTVC-M0432_v3, 2013, pp. 310.

Office Action for JP Patent Application No. 2016-510235, dated Nov. 13, 2018, 05 pages of Office Action and 03 pages of English Translation.

Office Action for JP Patent Application No. 2016-510235, dated Feb. 7, 2019, 03 pages of Office Action and 03 pages of English Translation.

* cited by examiner

IMAGE DECODING DEVICE AND METHOD

CROSS REFERENCE TO RELATED APPLICATIONS

This application is a U.S. National Phase of International Patent Application No. PCT/JP2015/057532 filed on Mar. 13, 2015, which claims priority benefit of Japanese Patent Application No. 2014-067813 filed in the Japan Patent Office on Mar. 28, 2014. Each of the above-referenced applications is hereby incorporated herein by reference in its entirety.

TECHNICAL FIELD

The present disclosure relates to an image decoding device and method, and particularly, to an image decoding device and method through which it is possible to perform a decoding process more efficiently.

BACKGROUND ART

In order to improve video coding efficiency, standardization of a coding scheme called High Efficiency Video Coding (HEVC) has proceeded and the development of version 1 has already been completed (for example, refer to Non-Patent Literature 1).

In HEVC, diversification and subdivision of a block size has proceeded, and compared to AVC, the number of sizes of a coding block is 4 times as many, the number of sizes of a block of a prediction process is about 4 times as many, and the number of sizes of a block of a prediction difference signal process is twice as many.

CITATION LIST

Non-Patent Literature

Non-Patent Literature 1: Benjamin Bross, Gary J. Sullivan, Ye-Kui Wang, "Editors' proposed corrections to HEVC version 1," JCTVC-M0432_v3, 2013, Apr. 25

SUMMARY OF INVENTION

Technical Problem

However, while diversification and subdivision of a block size contribute greatly to improving compression performance, there is concern of a processing rate of a decoding process decreasing.

The present disclosure has been made in view of the above-described circumstances and can perform a decoding process more efficiently.

Solution to Problem

According to an aspect of the present technology, there is provided an image decoding device including a decoding unit configured to generate decoded data by decoding encoding data obtained by encoding image data, and a processing unit configured to independently perform processes of the decoded data generated by the decoding unit for each block size performed in a method according to a block size based on a block structure of the encoding data.

The processing unit may include an inverse quantization unit configured to perform inverse quantization of the decoded data that is quantized.

The block structure may be information indicating a number and positions of transform units for each size, and the inverse quantization unit may independently perform inverse quantization for each size of the transform unit.

The processing unit may include an inverse orthogonal transform unit configured to perform an inverse orthogonal transform of the decoded data that is orthogonally transformed.

The block structure may be information indicating a number and positions of transform units for each size, and the inverse orthogonal transform unit may independently perform an inverse orthogonal transform for each size of the transform unit.

The processing unit may include an inter prediction unit configured to generate a prediction image on which motion compensation is performed.

The block structure may be information indicating a number and positions of prediction units for each size, and the inter prediction unit may independently perform motion compensation for each size of the prediction unit.

The block structure may be information indicating a number and positions of coding units for each size, and the inter prediction unit may independently perform motion compensation for each size of the coding unit.

The processing unit may perform processes performed in a method according to the block size in parallel for each block size.

The image decoding device further includes an analysis unit configured to analyze a block structure of the encoding data. The processing unit may independently perform processes performed in a method according to the block size based on an analysis result of the block structure by the analysis unit for each block size.

The analysis unit may obtain a number of generations and generation positions of coding units of the encoding data for each size.

The analysis unit may obtain a number of generations and generation positions of transform units of the encoding data for each size.

The analysis unit may obtain a number of generations and generation positions of prediction units of the encoding data for each size.

The image decoding device may further include a parallel control unit configured to control parallelization of processes performed in a method according to the block size based on an amount of a processing load for each block size.

The parallel control unit may parallelize processes performed in a method according to the block size such that an amount of a load is as uniform as possible.

The parallel control unit may obtain an amount of a processing load for each block size based on an environment.

The parallel control unit may obtain an amount of a processing load for each block size based on a calibration result.

According to an aspect of the present technology, there is provided an image decoding method including generating decoded data by decoding encoding data obtained by encoding image data, and independently performing processes of the generated decoded data performed in a method according to a block size for each block size based on a block structure of the encoding data.

In an aspect of the present technology, encoding data obtained by encoding image data is decoded, decoded data is thus generated, and processes of the generated decoded data performed in a method according to a block size are independently performed for each block size based on a block structure of the encoding data.

Advantageous Effects of Invention

According to the present disclosure, it is possible to decode encoding data obtained by encoding image data. In particular, it is possible to perform a decoding process more efficiently.

DESCRIPTION OF EMBODIMENT(S)

Figure 1:
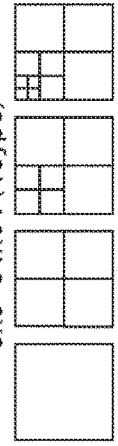
FIG. 1 is a diagram illustrating comparison of block sizes.

Hereinafter, forms (hereinafter referred to as "embodiments") for implementing the present disclosure will be described. The description will proceed in the following order.

1. First embodiment (image decoding device)
2. Second embodiment (image decoding device)
3. Third embodiment (multi-view image decoding device)
4. Fourth embodiment (hierarchical image decoding device)
5. Fifth embodiment (computer)
6. Sixth embodiment (application example)
7. Seventh embodiment (set, unit, module, and processor)

<1. First Embodiment>
<Flow of Standardization of Image Encoding>

In recent years, devices in which image information is digitally handled, and in this case, in order to transmit and accumulate information with high efficiency, image-information-specific redundancy is used, and an image is compression-coded employing a coding scheme in which an orthogonal transform such as a discrete cosine transform and motion compensation are used for compression have proliferated. As such a coding scheme, Moving Picture Experts Group (MPEG) is exemplified.

In particular, MPEG2 (ISO/IEC 13818-2) is a standard that is defined as a general-purpose image coding scheme, and generally supports both an interlaced scanning image and a progressive scanning image as well as a standard resolution image and a high-definition image. For example, MPEG2 is currently being widely used for a wide range of applications including professional applications and consumer applications. When an MPEG2 compression scheme is used, for example, an interlaced scanning image having a standard resolution of 720×480 pixels may be assigned a code amount (bit rate) of 4 to 8 Mbps. In addition, when the MPEG2 compression scheme is used, for example, an interlaced scanning image having a high resolution of 1920×1088 pixels may be assigned a code amount (bit rate) of 18 to 22 Mbps. Therefore, it is possible to implement a high compression rate and good image quality.

MPEG2 is mainly designed for high image quality coding suitable for broadcast, but does not correspond to a coding scheme of a lower code amount (bit rate), that is, a higher compression rate, than that of MPEG1. With the proliferation of mobile terminals, it is assumed that needs for such a coding scheme will increase in the future. Accordingly, MPEG4 coding schemes have been standardized. A standard of image coding schemes was approved as an international standard ISO/IEC14496-2 in December 1998.

Further, in recent years, for the initial purpose of image coding for television conferencing, a standard called H.26L (International Telecommunication Union Telecommunication (ITU-T) Standardization Sector Q6/16 Video Coding Experts Group (VCEG)) has been standardized. It is known that H.26L requires a greater amount of computation for coding and decoding than coding schemes of the related art such as MPEG2 or MPEG4, but has a higher coding efficiency. In addition, currently, as a part of MPEG4 activities, based on H.26L, standardization in which functions that are not supported in H.26L are also incorporated to implement higher coding efficiency is being performed as Joint Model of Enhanced-Compression Video Coding As schedules of standardization, H.264 and MPEG-4 Part10 (Advanced Video Coding, hereinafter referred to as "AVC") became international standards in March 2003.

Further, as extensions of H.264/AVC, standardization of Fidelity Range Extension (FRExt) including coding tools necessary for professional use such as RGB, 4:2:2, or 4:4:4, and 8×8 DCT or a quantization matrix defined in MPEG-2 was completed in February 2005. Therefore, when H.264/AVC is used, the coding scheme is also able to appropriately represent film noise included in a movie and is used for a wide range of applications such as a Blu-Ray Disc (trademark).

However, in recent years, needs for higher compression rate coding including compression of an image of about 4000×2000 pixels, four times as many as in a high definition image, or delivery of a high definition image in an environment having a limited transmission capacity such as the Internet, are increasing. Therefore, in previously described VCEG under ITU-T, studies for increasing coding efficiency are continuing.

Therefore, currently, in order to further increase coding efficiency over that of AVC, Joint Collaboration Team-Video Coding (JCTVC), which is a joint standardization organization of ITU-T and the International Organization for Standardization/International Electrotechnical Commission (ISO/IEC), are proceeding with the standardization of a coding scheme called High Efficiency Video Coding (HEVC), and the development of version 1 has already been completed (for example, refer to Non-Patent Literature 1).

<Block Size and Processing Rate>

HEVC has compression performance that is about four times that of MPEG-2 (H.262) and about twice that of H.264/AVC. Diversification and subdivision of a block size contribute greatly to the compression performance. FIG. 1 is a diagram illustrating comparison of block sizes between AVC and HEVC. As illustrated in FIG. 1, in HEVC, compared to AVC, the number of sizes of a coding block is 4 times as many, the number of sizes of a prediction process block (MC Block) is about 4 times as many, and the number of sizes of a prediction difference signal process block (DCT Block) is twice as many.

Diversification and subdivision of a block size contribute greatly to improving compression performance, but there is concern of a processing rate of a pixel reconstruction process such as inverse quantization, an inverse orthogonal transform, and motion compensation in a decoding process decreasing.

For example, main factors decreasing a processing rate in this manner are considered to include the following.

1. It is necessary to sequentially branch processes for each block size, and a branch overhead increases. In particular, when a processor has difficulty in branching, the overhead is unignorable.

2. There is an overhead of a load of a processing method calling each block size. A general processing method is loaded in a cache of a processor, and a process is actually performed through the cache. However, when a size of the cache is insufficient, a processing method is sequentially removed. For example, when a block size to be processed is frequently switched, if a processing method is sequentially loaded and removed, there is a possibility of the overhead being too much to ignore.

3. Since parallelization of processes is insufficiently performed in parallel processes, some processors are in an idle state.

Figure 2:
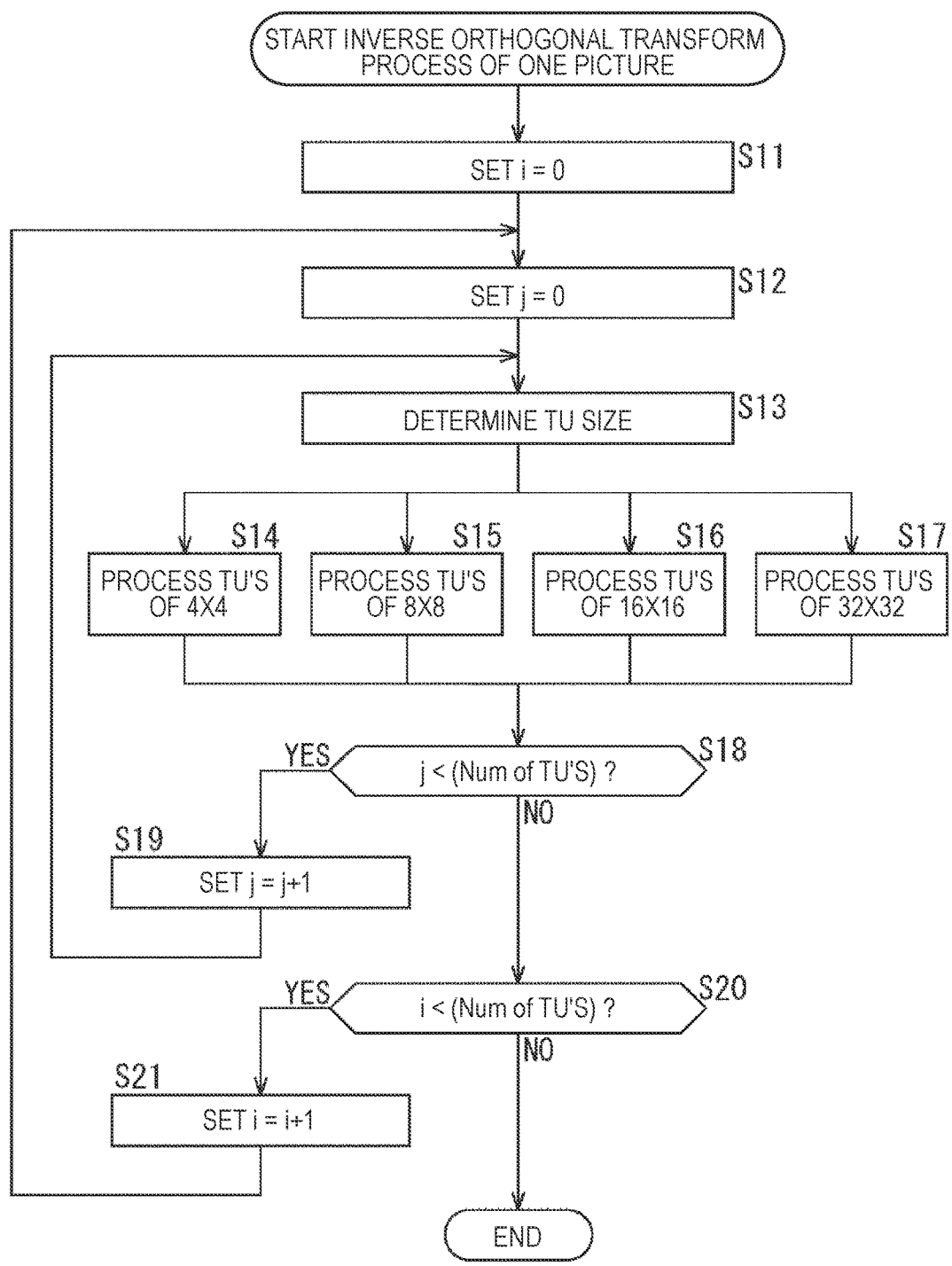
FIG. 2 is a flowchart describing an example of a flow of an inverse orthogonal transform process.

An inverse orthogonal transform process (IDCT) is performed, for example, as in Step S11 to Step S21 of a flowchart shown in FIG. 2. This is the same as in inverse quantization (IQ). As shown in Step S14 to Step S17, the number of transform units (TU's) inside a coding tree unit (CTU) is used for a loop counter, the process is branched each time for each TU block size, and units calling processes for each TU block size become smaller. Therefore, in a processor that can calculate the same process at a high speed and has difficulty in branching (such as a graphics processing unit (GPU) and a field programmable gate array (FPGA)), there is concern of performance greatly decreasing.

In addition, even in a processor having a good branching ability, there is a possibility of an overhead of a load of a call processing method for each block size increasing. In particular, when an area in which a processing method (program) called an instruction cache is temporarily stored is small, there is a possibility of storing and loading of the cache being frequently performed, and there is concern of performance further decreasing.

Figure 3:
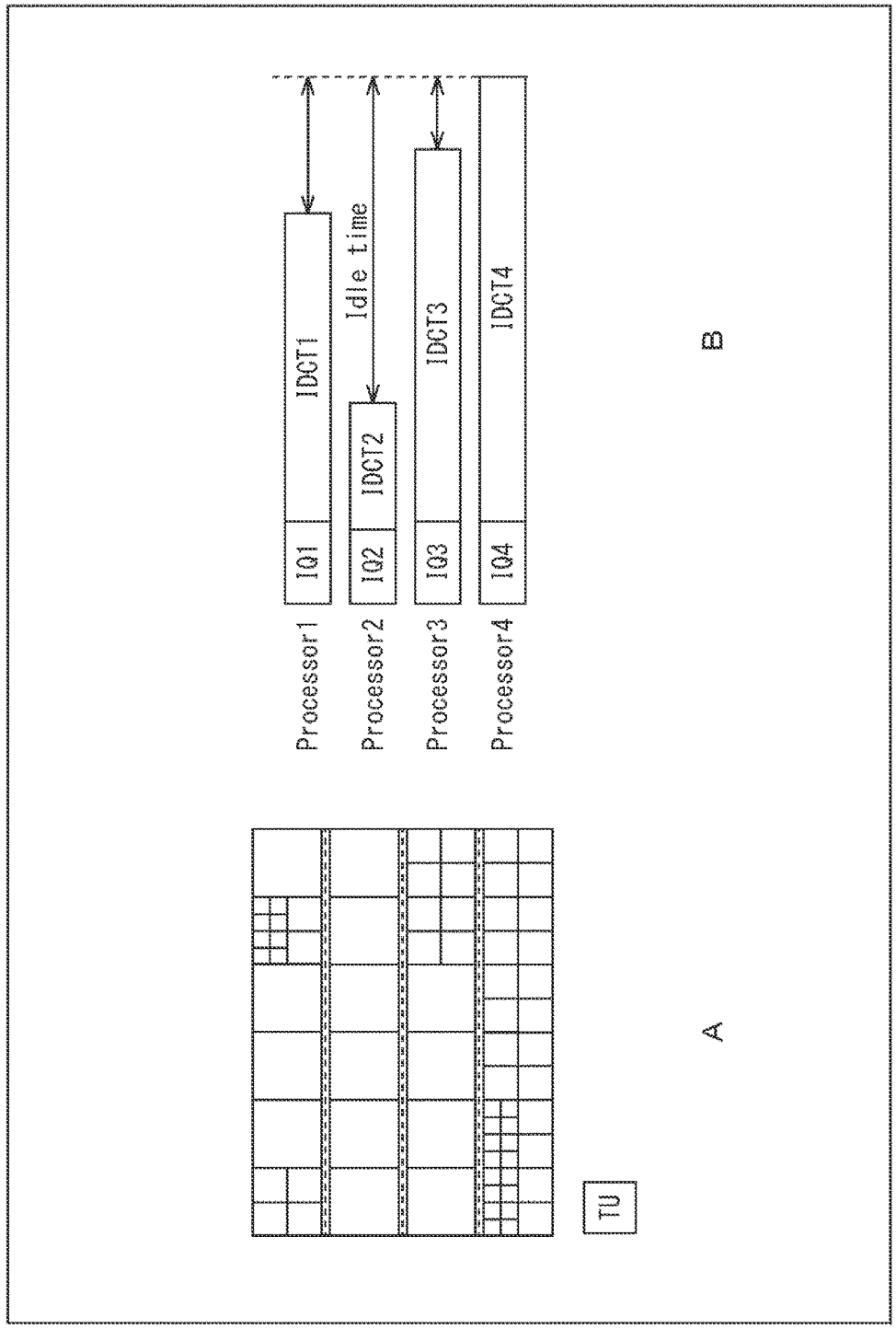
FIG. 3 is a diagram illustrating an example of a state of parallelization of a decoding process.

Further, in view of parallelization, there is concern of performance decreasing. In recent years, with the progress of multicore processors such as those with two cores and four cores, distributing processes to such cores as uniformly as possible is a key factor for improving performance. When speeds of processes for each block size are substantially the same, benefits of parallel processes are obtained even when the parallel processes are simply performed at a uniform size in a picture. However, in inverse quantization (IQ) and an inverse orthogonal transform (IDCT), and particularly, in the part of IDCT, an amount of processing for each block size is greatly changed. For example, as illustrated in FIG. 3A, when a picture is simply uniformly divided and assigned to cores, a block size of the TU is greatly different for each core in some cases. In this case, as illustrated in FIG. 3B, there are concerns of processing times of the inverse orthogonal transform (IDCT) performed in the cores not being aligned, and some cores being in an idle state for a long time.

<Image Decoding Device>

Therefore, encoding data obtained by encoding image data is decoded, decoded data is thus generated, and processes of the generated decoded data performed in a method according to a block size are independently performed for each block size based on a block structure of the encoding data. Thus, it is possible to perform a decoding process more efficiently.

Figure 4:
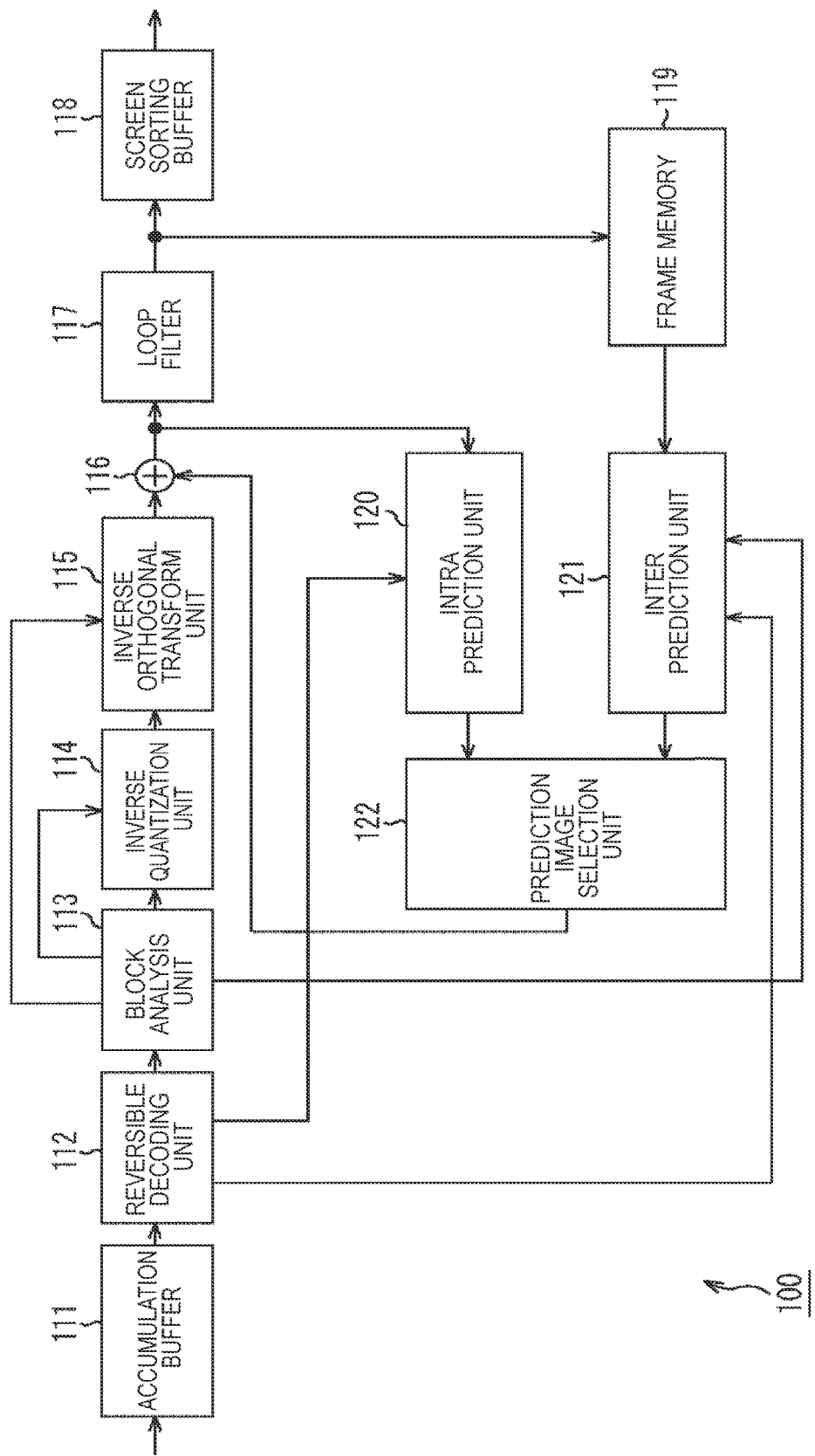
FIG. 4 is a block diagram illustrating an example of a main configuration of an image decoding device.

FIG. 4 is a block diagram illustrating an example of a main configuration of an image decoding device that is a form of an image processing device to which the present technology is applied. An image decoding device 100 illustrated in FIG. 4 decodes encoding data that is generated when an image encoding device (not illustrated) encodes image data according to an HEVC encoding scheme.

As illustrated in FIG. 4, the image decoding device 100 includes an accumulation buffer 111, a reversible decoding unit 112, a block analysis unit 113, an inverse quantization unit 114, an inverse orthogonal transform unit 115, a computation unit 116, a loop filter 117, and a screen sorting buffer 118. In addition, the image decoding device 100 includes a frame memory 119, an intra prediction unit 120, an inter prediction unit 121, and a prediction image selection unit 122.

The accumulation buffer 111 is a reception unit configured to receive encoding data that has been transmitted from an encoding side. The accumulation buffer 111 receives and accumulates the transmitted encoding data and supplies the encoding data to the reversible decoding unit 112 at a predetermined timing. The reversible decoding unit 112 decodes the encoding data supplied from the accumulation buffer 111 according to an HEVC scheme. The reversible decoding unit 112 supplies quantized coefficient data obtained by decoding to the block analysis unit 113.

In addition, the reversible decoding unit 112 determines whether an intra prediction mode or an inter prediction mode is selected as the optimal prediction mode based on information about an optimal prediction mode that is added to the encoding data, and supplies information about the optimal prediction mode to the intra prediction unit 120 or the inter prediction unit 121 according to a mode determined to have been selected. For example, when the intra prediction mode is selected as the optimal prediction mode on the encoding side, information about the optimal prediction mode is supplied to the intra prediction unit 120. In addition, for example, when the inter prediction mode is selected as the optimal prediction mode on the encoding side, information about the optimal prediction mode is supplied to the inter prediction unit 121.

Further, the reversible decoding unit 112 supplies information necessary for inverse quantization, for example, a quantization matrix and a quantization parameter, to the inverse quantization unit 114.

The block analysis unit 113 analyzes a structure of a block such as a coding unit (CU), a transform unit (TU), and a prediction unit (PU) of coefficient data. The block analysis unit 113 supplies the analysis result to a processing unit that uses the analysis result for a process performed by the unit itself, for example, the inverse quantization unit 114, the inverse orthogonal transform unit 115, and the inter prediction unit 121.

In addition, the block analysis unit 113 supplies the quantized coefficient data supplied from the reversible decoding unit 112 to the inverse quantization unit 114.

The inverse quantization unit 114 performs inverse quantization of the quantized coefficient data obtained by decoding performed by the reversible decoding unit 112 according to a scheme corresponding to a quantization scheme on the encoding side. In this case, the inverse quantization unit 114 performs inverse quantization using a method according to a block size of the TU. For example, when the TU has a size of 4×4, the inverse quantization unit 114 performs inverse quantization of the quantized coefficient data using a method according to a size of 4×4. Similarly, when the TU has any size of 8×8, 16×16, and 32×32, the inverse quantization unit 114 performs inverse quantization using a method according to each block size, similarly to the case of a size of 4×4.

Then, the inverse quantization unit 114 independently performs inverse quantization for each block size of the TU. For example, as in all TU's having a size of 4×4, all TU's having a size of 8×8, all TU's having a size of 16×16, and all TU's having a size of 32×32, each TU may undergo inverse quantization in order of block sizes. In addition, for example, TU's are grouped for each block size and the groups may be processed in parallel to each other. In any case, the inverse quantization unit 114 continuously (collectively) processes TU's having the same block size.

Thus, since inverse quantization can be continuously performed using the same method, it is possible to decrease branches of the process. In addition, it is possible to decrease an overhead of a load of a processing method. Accordingly, the inverse quantization unit 114 can perform inverse quantization more efficiently.

In order to perform the process for each block size in this manner, the inverse quantization unit 114 refers to a block structure of encoding data. The block structure includes the number of generations and generation positions of block sizes. The inverse quantization unit 114 collects TU's having the same size based on the number of generations and generation positions of block sizes, and thus performs inverse quantization for each block size. Information about the block structure may be obtained from anywhere. For example, it may be supplied from the block analysis unit 113 (as an analysis result).

The inverse quantization unit 114 supplies the obtained coefficient data to the inverse orthogonal transform unit 115.

The inverse orthogonal transform unit 115 performs an inverse orthogonal transform of an orthogonal transform coefficient supplied from the inverse quantization unit 114 according to a scheme corresponding to an orthogonal transform scheme on the encoding side. In this case, the inverse orthogonal transform unit 115 performs an inverse orthogonal transform using a method according to a block size of the TU. For example, when the TU has a size of 4×4, the inverse orthogonal transform unit 115 performs an inverse orthogonal transform of the coefficient data using a method according to a size of 4×4. Similarly, when the TU has any size of 8×8, 16×16, and 32×32, the inverse orthogonal transform unit 115 performs an inverse orthogonal transform using a method according to each block size, similarly to the case of a size of 4×4.

Then, the inverse orthogonal transform unit 115 independently performs an inverse orthogonal transform for each block size of the TU. For example, as in all TU's having a size of 4×4, all TU's having a size of 8×8, all TU's having a size of 16×16, and all TU's having a size of 32×32, each TU may undergo an inverse orthogonal transform in order of block sizes. In addition, for example, TU's are grouped for each block size, and the groups may be processed in parallel to each other. In any case, the inverse orthogonal transform unit 115 continuously (collectively) processes TU's having the same block size.

Thus, since inverse quantization can be continuously performed using the same method, it is possible to decrease branches of the process. In addition, it is possible to decrease an overhead of a load of a processing method. Accordingly, the inverse orthogonal transform unit 115 can perform an inverse orthogonal transform more efficiently.

In order to perform the process for each block size in this manner, the inverse orthogonal transform unit 115 refers to a block structure of encoding data. The block structure includes the number of generations and generation positions of block sizes. The inverse orthogonal transform unit 115 collects TU's having the same size based on the number of generations and generation positions of block sizes, and thus performs an inverse orthogonal transform for each block size. The information about the block structure may be obtained from anywhere. For example, it may be supplied from the block analysis unit 113 (as an analysis result).

The inverse orthogonal transform unit 115 obtains residual data corresponding to a state before an orthogonal transform was performed on the encoding side by the inverse orthogonal transform process. The residual data obtained by an inverse orthogonal transform is supplied to the computation unit 116.

The computation unit 116 acquires the residual data from the inverse orthogonal transform unit 115. In addition, the computation unit 116 acquires a prediction image from the intra prediction unit 120 or the inter prediction unit 121 through the prediction image selection unit 122. The computation unit 116 adds a difference image and the prediction image and obtains a reconstructed image corresponding to an image from before the prediction image was subtracted on the encoding side. The computation unit 116 supplies the reconstructed image to the loop filter 117 and the intra prediction unit 120.

The loop filter 117 appropriately performs a loop filter process including, for example, a deblocking filter process and an SAO process, of the supplied reconstructed image, and generates a decoded image. For example, the loop filter 117 performs the deblocking filter process of the reconstructed image and thus removes block distortion. In addition, for example, the loop filter 117 performs the SAO process of the deblocking filter processing result (the reconstructed image in which block distortion is removed), and thus performs image quality improvement according to a decrease of ringing and correction of a deviation of a pixel value.

A type of the filter process performed by the loop filter 117 is arbitrary and a filter process other than the above-described process may be performed. In addition, the loop filter 117 may perform the filter process using a filter coefficient supplied from the encoding side.

The loop filter 117 supplies the decoded image serving as a filter processing result to the screen sorting buffer 118 and the frame memory 119.

The screen sorting buffer 118 sorts images. That is, the order of frames that are sorted for the encoding order on the encoding side is sorted according to the order of the original display. The screen sorting buffer 118 outputs decoded image data in which the order of frames is sorted to the outside of the image decoding device 100.

The frame memory 119 stores the supplied decoded image, and supplies the stored decoded image to the inter prediction unit 121 as a reference image at a predetermined timing or based on a request from the outside, for example, the inter prediction unit 121.

Information indicating the intra prediction mode obtained by decoding header information and the like are appropriately supplied to the intra prediction unit 120 from the reversible decoding unit 112. The intra prediction unit 120 performs intra prediction using the reconstructed image supplied from the computation unit 116 as a reference image in the intra prediction mode used on the encoding side and generates a prediction image. The intra prediction unit 120 supplies the generated prediction image to the prediction image selection unit 122.

The inter prediction unit 121 acquires information (for example, optimal prediction mode information and reference image information) obtained by decoding the header information from the reversible decoding unit 112.

The inter prediction unit 121 performs inter prediction (for example, motion compensation) using the reference image acquired from the frame memory 119 in the inter prediction mode indicated by the optimal prediction mode information acquired from the reversible decoding unit 112 and generates a prediction image. In this case, the inter prediction unit 121 performs inter prediction using a method according to a block size of the PU. For example, when the PU has a size of 4×8, the inter prediction unit 121 performs inter prediction using a method according to a size of 4×8 and generates a prediction image. This is the same when the PU has other sizes.

Then, the inter prediction unit 121 independently performs inter prediction for each block size of the PU. For example, as in all PUs having a size of 4×8, all PUs having a size of 8×4, . . . , all PUs having a size of 64×64, each PU may undergo inter prediction in order of block sizes, and a prediction image may be generated. In addition, for example, PUs are grouped for each block size, and the groups may be processed in parallel to each other. In any case, the inter prediction unit 121 continuously (collectively) processes PUs having the same block size.

Thus, since inter prediction can be continuously performed using the same method, it is possible to decrease branches of the process. In addition, it is possible to decrease an overhead of a load of a processing method. Accordingly, the inter prediction unit 121 can perform inter prediction more efficiently.

In order to perform the process for each block size in this manner, the inter prediction unit 121 refers to a block structure of encoding data. The block structure includes the number of generations and generation positions of block sizes. The inter prediction unit 121 collects PUs having the same size based on the number of generations and generation positions of block sizes, and thus performs inter prediction for each block size. The information about the block structure may be obtained from anywhere. For example, it may be supplied from the block analysis unit 113 (as an analysis result).

The inter prediction unit 121 may perform inter prediction using a CU instead of the above-described PU as a process unit. In this case, as in the PU, the inter prediction unit 121 may independently perform inter prediction for each block size of the CU.

The inter prediction unit 121 supplies the generated prediction image to the prediction image selection unit 122.

The prediction image selection unit 122 supplies the prediction image from the intra prediction unit 120 or the prediction image from the inter prediction unit 121 to the computation unit 116. Then, in the computation unit 116, a prediction image generated using a motion vector and the residual data supplied from the inverse orthogonal transform unit 115 are added and the original image is decoded. That is, a reconstructed image is generated.

<Block Analysis Unit>

Figure 5:
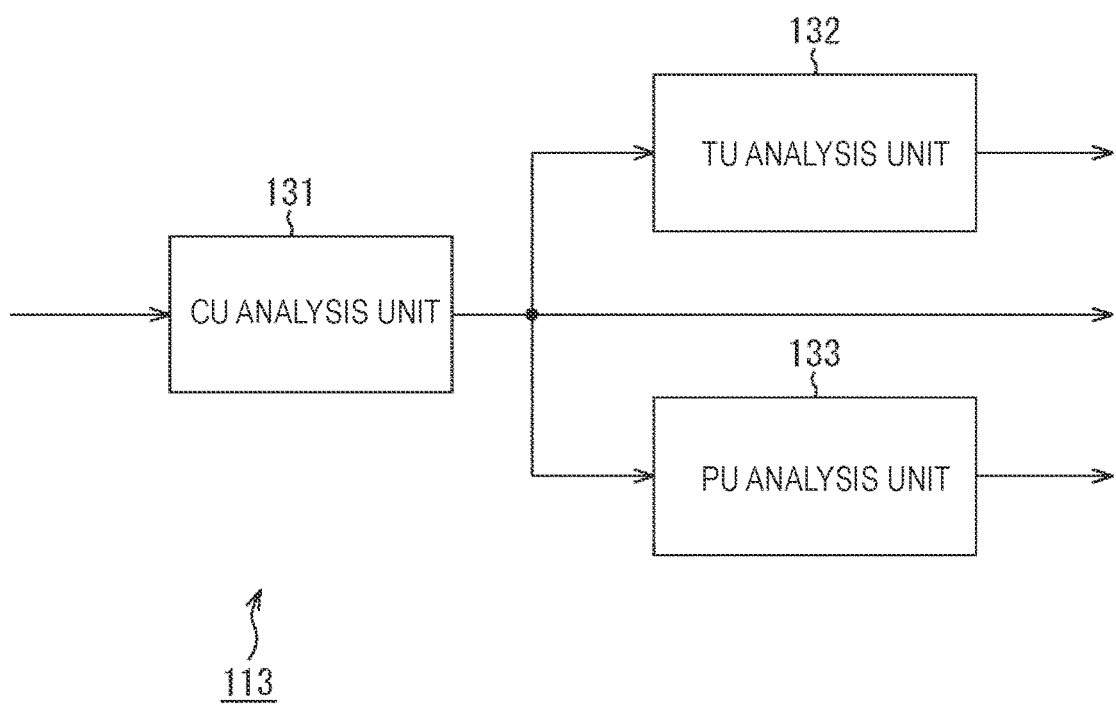
FIG. 5 is a block diagram illustrating an example of a main configuration of a block analysis unit.

FIG. 5 is a block diagram illustrating an example of a main configuration of the block analysis unit 113. As illustrated in FIG. 5, the block analysis unit 113 includes a CU analysis unit 131, a TU analysis unit 132, and a PU analysis unit 133.

Figure 6:
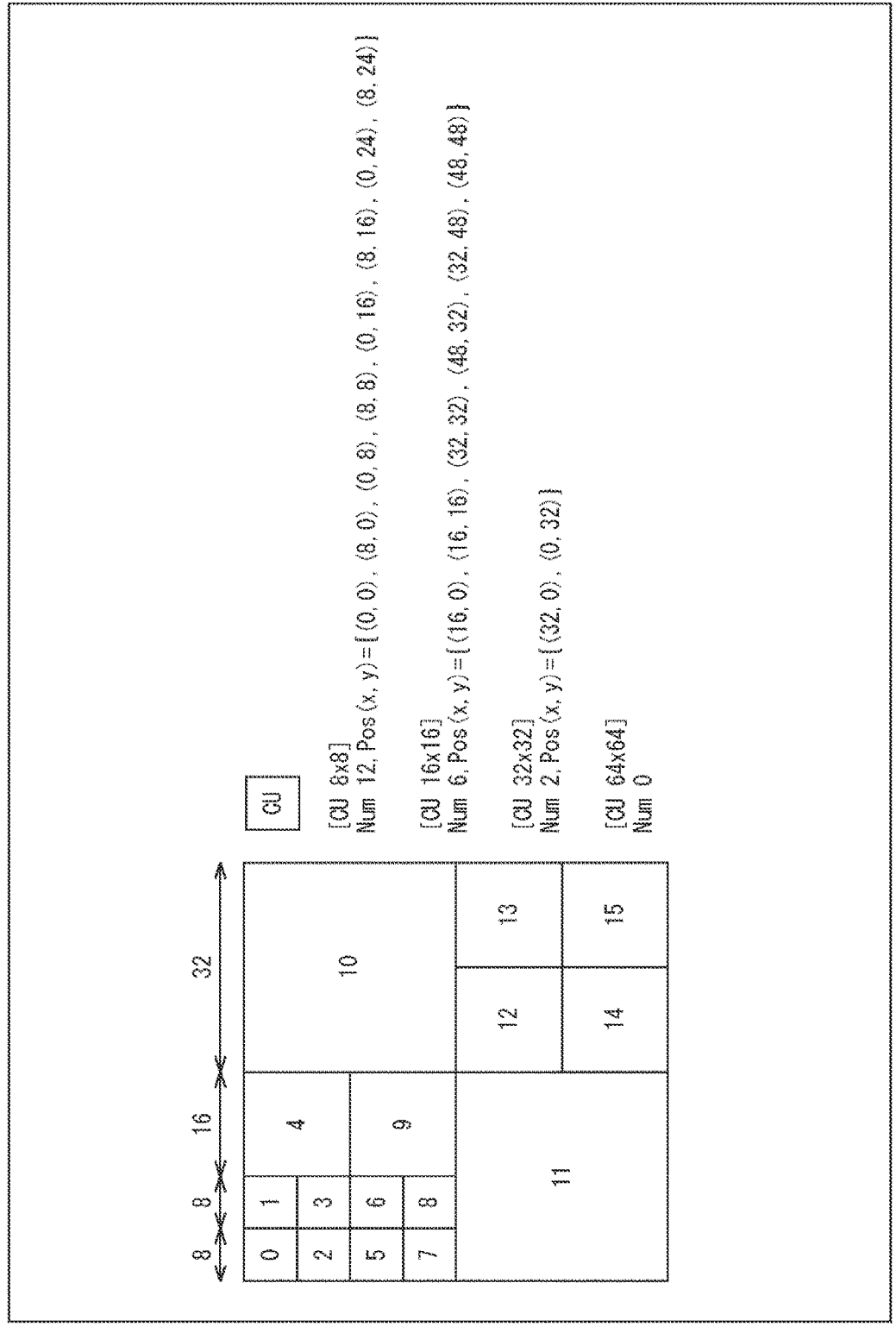
FIG. 6 is a diagram illustrating an example of a state of block structure analysis.

The CU analysis unit 131 parses coefficient data, obtains the number of generations and generation positions of block sizes of 4 types of 8×8 to 64×64 of the CU, and outputs them to another processing unit (for example, the inter prediction unit 121) as an analysis result. FIG. 6 illustrates an example of the analysis result. As illustrated in FIG. 6, the number (Num) of generations and positions (Pos(x, y)) for each size are obtained. In addition, the CU analysis unit 131 also supplies the analysis result and the coefficient data to the TU analysis unit 132 and the PU analysis unit 133.

The TU analysis unit 132 parses the coefficient data based on the analysis result of the CU, obtains the number of generations and generation positions of block sizes of 4 types of 4×4 to 32×32, and outputs them to other processing units (for example, the inverse quantization unit 114 and the inverse orthogonal transform unit 115) as an analysis result. The analysis result of the TU is the same as in the CU illustrated in FIG. 6.

The PU analysis unit 133 parses coefficient data based on the analysis result of the CU, obtains the number of generations and generation positions of block sizes of 27 types of 4×8/8×4 to 64×64, and outputs them to another processing unit (for example, the inter prediction unit 121) as an analysis result. The analysis result of the PU is the same as in the CU illustrated in FIG. 6.

<Flow of a Decoding Process>

Next, an example of a flow of processes performed by the image decoding device 100 will be described. First, an example of a flow of the decoding process will be described with reference to a flowchart of FIG. 7.

When the decoding process starts, in Step S101, the accumulation buffer 111 accumulates transmitted bitstreams. In Step S102, the reversible decoding unit 112 decodes the bitstreams supplied from the accumulation buffer 111. That is, I picture, P picture, and B picture that are encoded on the encoding side are decoded. In this case, various pieces of information other than image information included in a bitstream such as the header information are also decoded.

In Step S103, the block analysis unit 113 parses coefficient data obtained in the process of Step S102 and analyzes a block structure.

In Step S104, the inverse quantization unit 114 performs inverse quantization of the quantized coefficient obtained in the process of Step S102.

In Step S105, the inverse orthogonal transform unit 115 performs an inverse orthogonal transform of the orthogonal transform coefficient obtained in the process of Step S104. According to the process, residual data of a luminance component and prediction residual data of a color difference component are restored.

In Step S106, the intra prediction unit 120 or the inter prediction unit 121 performs a prediction process and generates a prediction image. That is, the prediction process is performed in the prediction mode that is determined by the reversible decoding unit 112 and applied during encoding.

In Step S107, the computation unit 116 adds the prediction image generated in Step S106 to the residual data restored in the process of Step S105. Accordingly, the reconstructed image is obtained.

In Step S108, the loop filter 117 performs the loop filter process, including, for example, the deblocking filter process and the SAO process, of the reconstructed image obtained in the process of Step S107.

In Step S109, the screen sorting buffer 118 sorts frames of the decoded image obtained in the process of Step S108. That is, the order of frames that are sorted during encoding is sorted according to the order of the original display. The decoded image whose frames are sorted is output to the outside of the image decoding device 100.

In Step S110, the frame memory 119 stores the decoded image obtained in the process of Step S108.

When the process of Step S110 ends, the decoding process ends.

<Flow of a Block Analysis Process>

Next, an example of a flow of the block analysis process performed in Step S103 of FIG. 7 will be described with reference to a flowchart of FIG. 8.

When the block analysis process starts, in Step S121, the CU analysis unit 131 of the block analysis unit 113 obtains the number of generations and generation positions of the CU's for each size.

In Step S122, the TU analysis unit 132 obtains the number of generations and generation positions of the TU's for each size.

In Step S123, the PU analysis unit 133 obtains the number of generations and generation positions of the PU's for each size.

Figure 7:
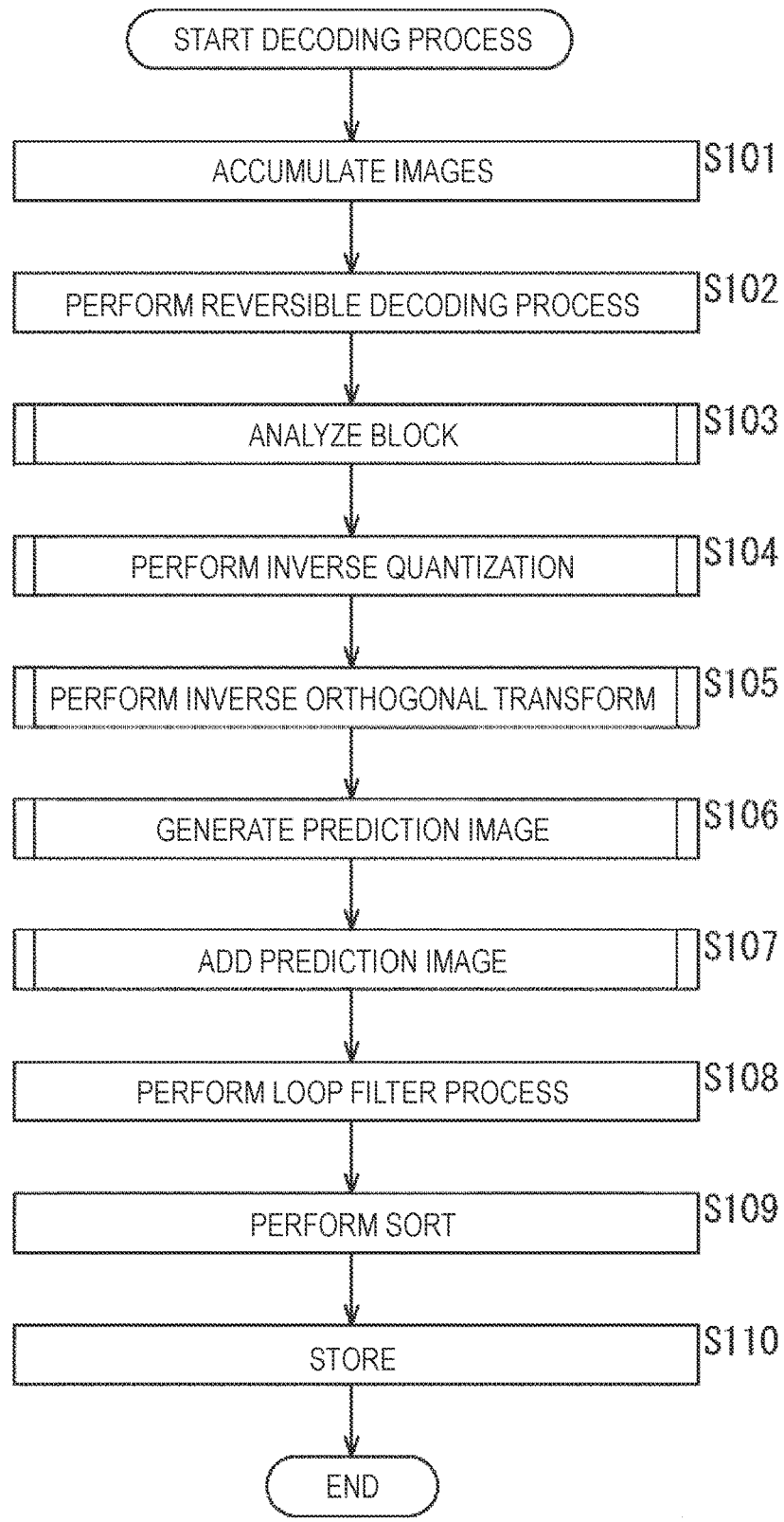
FIG. 7 is a flowchart describing an example of a flow of a decoding process.
Figure 8:
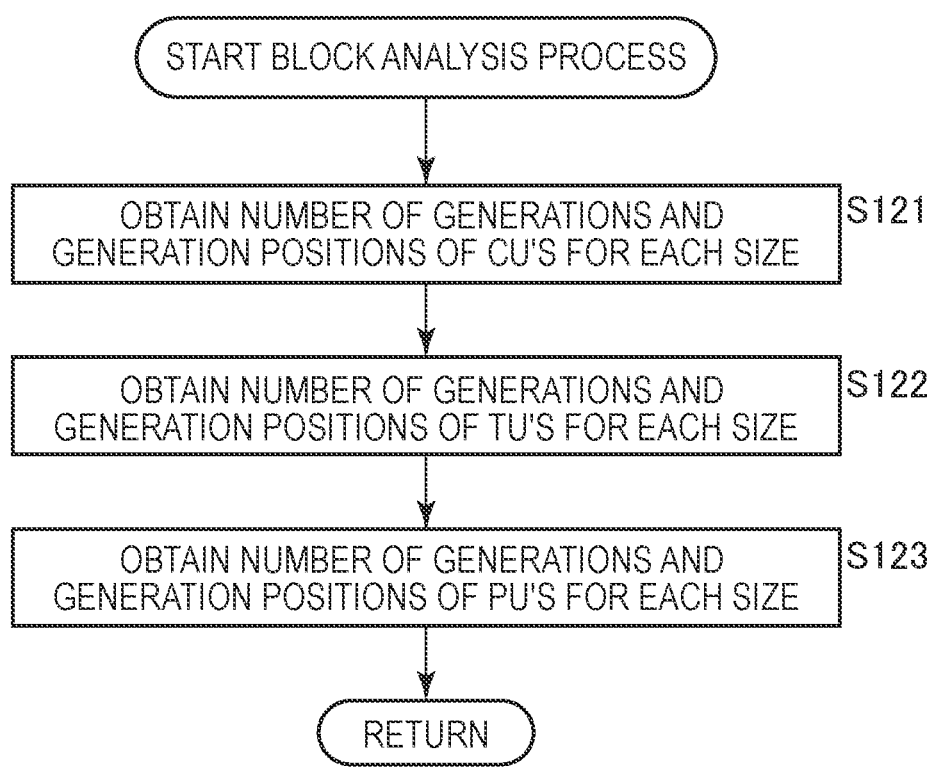
FIG. 8 is a flowchart describing an example of a flow of a block analysis process.

When the process of Step S123 ends, the block analysis process ends and the process returns to FIG. 7.

<Flow of an Inverse Quantization Process>

Next, an example of a flow of the inverse quantization process will be described with reference to flowcharts of FIG. 9 and FIG. 10.

When the inverse quantization process starts, the inverse quantization unit 114 sets i=0 in Step S131. In Step S132, the inverse quantization unit 114 acquires the number of generations of TU's calculated in the process of Step S122.

In Step S133, the inverse quantization unit 114 determines whether i<(Num of 4×4 TU's) is established. When it is determined that i<(Num of 4×4 TU's) is established (that is, there is an unprocessed TU having a size of 4×4), the process advances to Step S134.

In Step S134, the inverse quantization unit 114 identifies a position of a current TU having a size of 4×4 serving as a processing target based on the generation position of the TU calculated in the process of Step S122.

In Step S135, the inverse quantization unit 114 performs inverse quantization of the current TU having a size of 4×4.

In Step S136, the inverse quantization unit 114 sets i=i+1. That is, the processing target is moved to the next TU. When the process of Step S136 ends, the process returns to Step S132, and the process thereafter is repeated. That is, the processes of Step S132 to Step S136 are performed on each TU having a size of 4×4.

The processes of Step S132 to Step S136 are performed on all TU's having a size of 4×4, and when it is determined in Step S133 that i>(Num of 4×4 TU's) is established (that is, there is no unprocessed TU having a size of 4×4), the process advances to Step S137.

That is, the processes of Step S131 to Step S136 are processes for the TU having a size of 4×4.

Similarly, for a size of 8×8, the processes of Step S137 to Step S142 are performed. The processes of Step S137 to Step S142 are performed similarly to the processes of Step S131 to Step S136.

Figure 10:
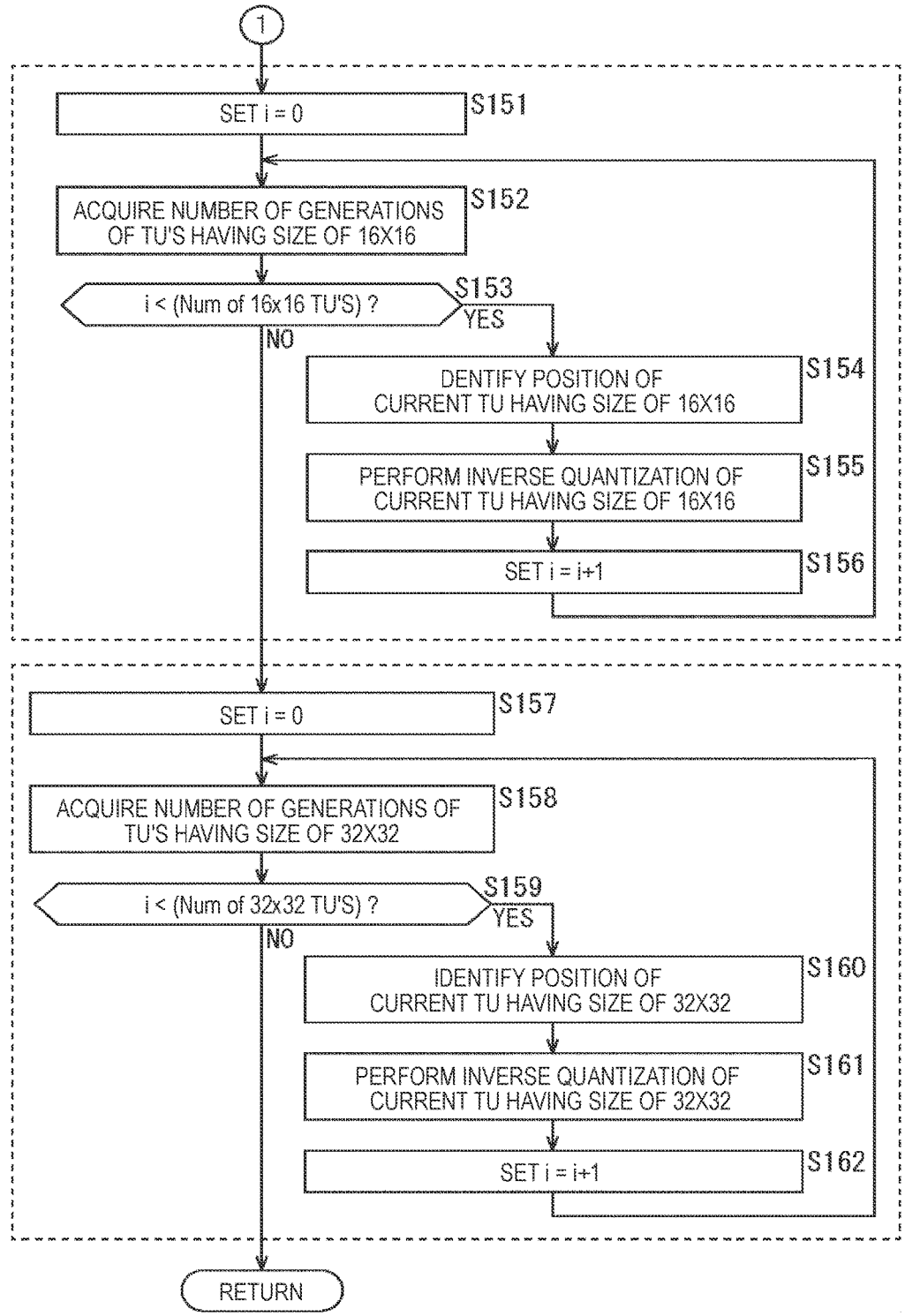
FIG. 10 is a flowchart continuing from FIG. 9 describing the example of the flow of the inverse quantization process.

In Step S139, when it is determined that i>(Num of 8×8 TU's) is established (that is, there is no unprocessed TU having a size of 8×8), the process advances to Step S151 of FIG. 10.

Similarly, for a size of 16×16, the processes of Step S151 to Step S156 of FIG. 10 are performed. The processes of Step S151 to Step S156 are performed similarly to the processes of Step S131 to Step S136.

In Step S153, when it is determined that i>(Num of 16×16 TU's) is established (that is, there is no unprocessed TU having a size of 16×16), the process advances to Step S157.

Similarly, for a size of 32×32, the processes of Step S157 to Step S162 are performed. The processes of Step S157 to Step S162 are performed similarly to the processes of Step S131 to Step S136.

In Step S159, when it is determined that i>(Num of 32×32 TU's) is established (that is, there is no unprocessed TU having a size of 32×32), the inverse quantization process ends and the process returns to FIG. 7.

Figure 9:
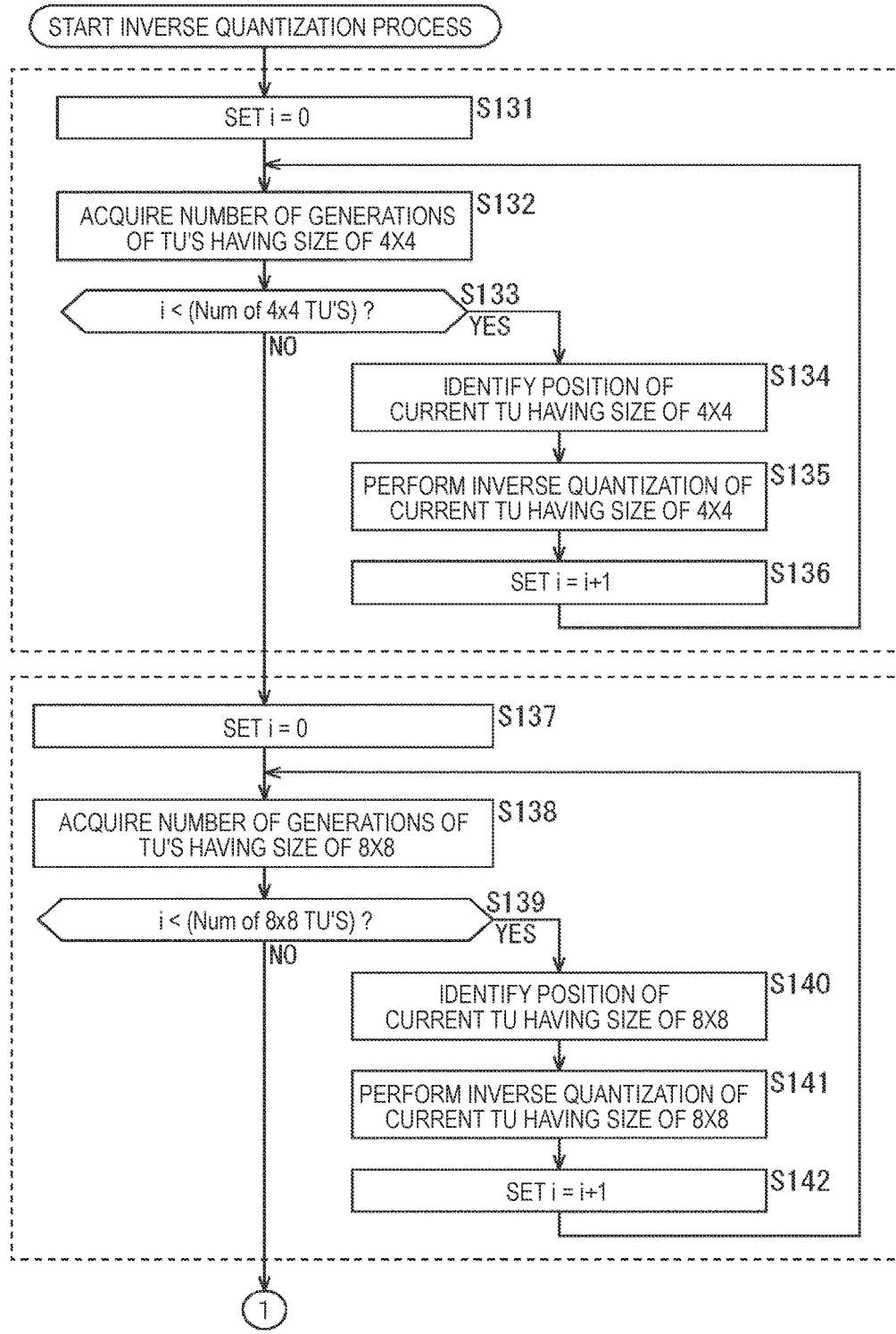
FIG. 9 is a flowchart describing an example of a flow of an inverse quantization process.

In FIG. 9 and FIG. 10, dashed line frames surround a process group for a TU having a certain block size. As illustrated in FIG. 9 and FIG. 10, processes surrounded by dotted lines can be independently performed. That is, the inverse quantization unit 114 can independently perform the inverse quantization process for each block size. Accordingly, it is possible to build an optimal algorithm in a processor capable of processing the same process at a high speed.

<Flow of an Inverse Orthogonal Transform Process>

Next, an example of a flow of the inverse orthogonal transform process performed in Step S105 of FIG. 7 will be described with reference to flowcharts of FIG. 11 and FIG. 12. Basically, the inverse orthogonal transform process is performed similarly to the inverse quantization process.

When the inverse orthogonal transform process starts, the inverse orthogonal transform unit 115 sets i=0 in Step S171. In Step S172, the inverse orthogonal transform unit 115 acquires the number of generations of TU's calculated in the process of Step S122.

In Step S173, the inverse orthogonal transform unit 115 determines whether i<(Num of 4×4 TU's) is established. When it is determined that i<(Num of 4×4 TU's) is established (that is, there is an unprocessed TU having a size of 4×4), the process advances to Step S174.

In Step S174, the inverse orthogonal transform unit 115 identifies a position of a current TU having a size of 4×4 serving as a processing target based on the generation position of the TU calculated in the process of Step S122.

In Step S175, the inverse orthogonal transform unit 115 performs an inverse orthogonal transform of the current TU having a size of 4×4.

In Step S176, the inverse orthogonal transform unit 115 sets i=i+1. That is, the processing target is moved to the next TU. When the process of Step S176 ends, the process returns to Step S172, and the process thereafter is repeated. That is, the processes of Step S172 to Step S176 are performed on each TU having a size of 4×4.

In all TU's having a size of 4×4, the processes of Step S172 to Step S176 are performed, and when it is determined in Step S173 that i>(Num of 4×4 TU's) is established (that is, there is no unprocessed TU having a size of 4×4), the process advances to Step S177.

That is, the processes of Step S171 to Step S176 are processes for the TU having a size of 4×4.

Similarly, for a size of 8×8, the processes of Step S177 to Step S182 are performed. The processes of Step S177 to Step S182 are performed similarly to the processes of the processes of Step S171 to Step S176.

Figure 12:
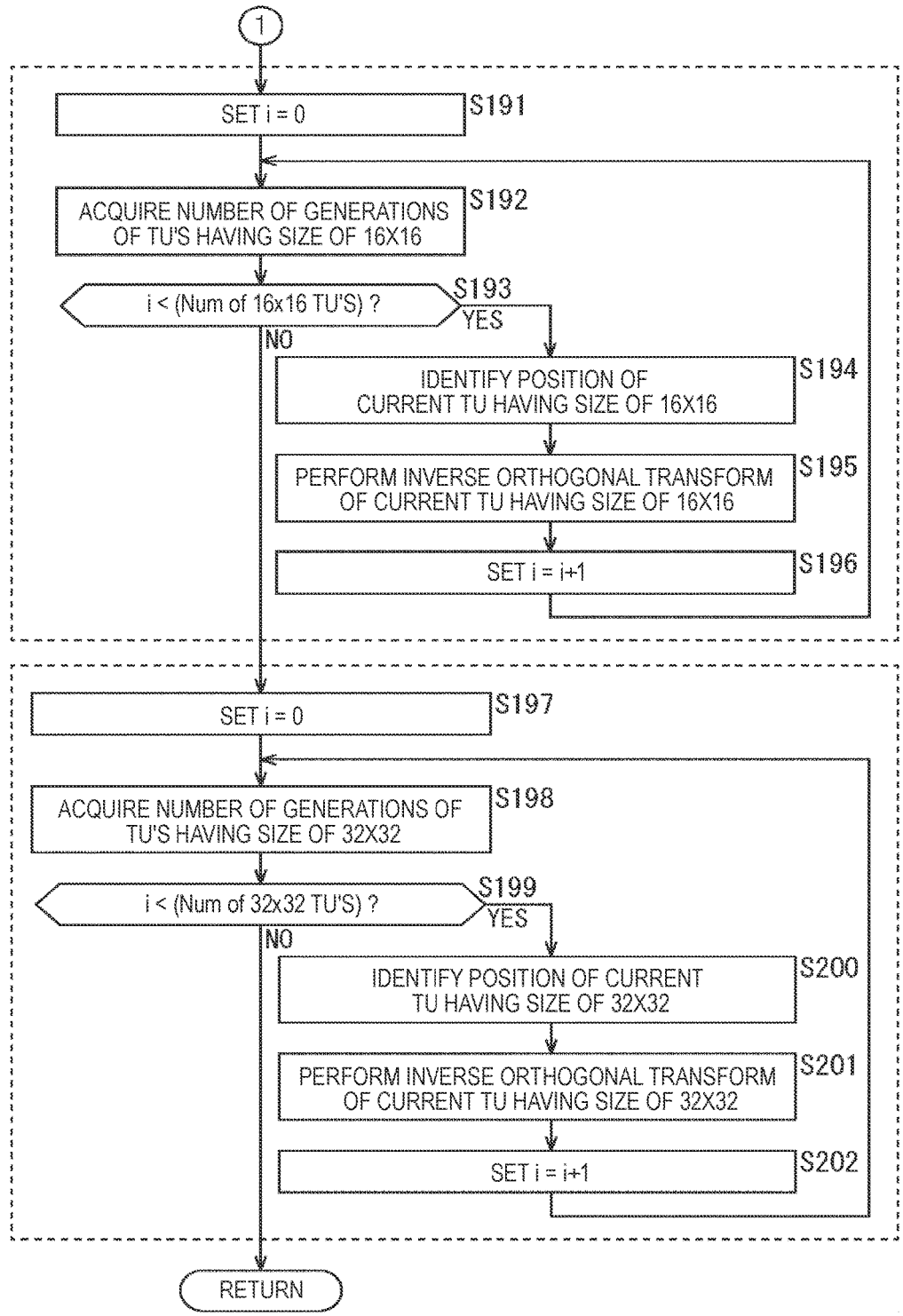
FIG. 12 is a flowchart continuing from FIG. 11 describing the example of the flow of the inverse orthogonal transform process.

In Step S179, when it is determined that i>(Num of 8×8 TU's) is established (that is, there is no unprocessed TU having a size of 8×8), the process advances to Step S191 of FIG. 12.

Similarly, for a size of 16×16, the processes of Step S191 to Step S196 of FIG. 12 are performed. The processes of Step S191 to Step S196 are performed similarly to the processes of Step S171 to Step S176.

In Step S193, when it is determined that i>(Num of 16×16 TU's) is established (that is, there is no unprocessed TU having a size of 16×16), the process advances to Step S197.

Similarly, for a size of 32×32, the processes of Step S197 to Step S202 are performed. The processes of Step S197 to Step S202 are performed similarly to the processes of Step S171 to Step S176.

In Step S179, when it is determined that i>(Num of 32×32 TU's) is established (that is, there is no unprocessed TU having a size of 32×32), the inverse orthogonal transform process ends and the process returns to FIG. 7.

Figure 11:
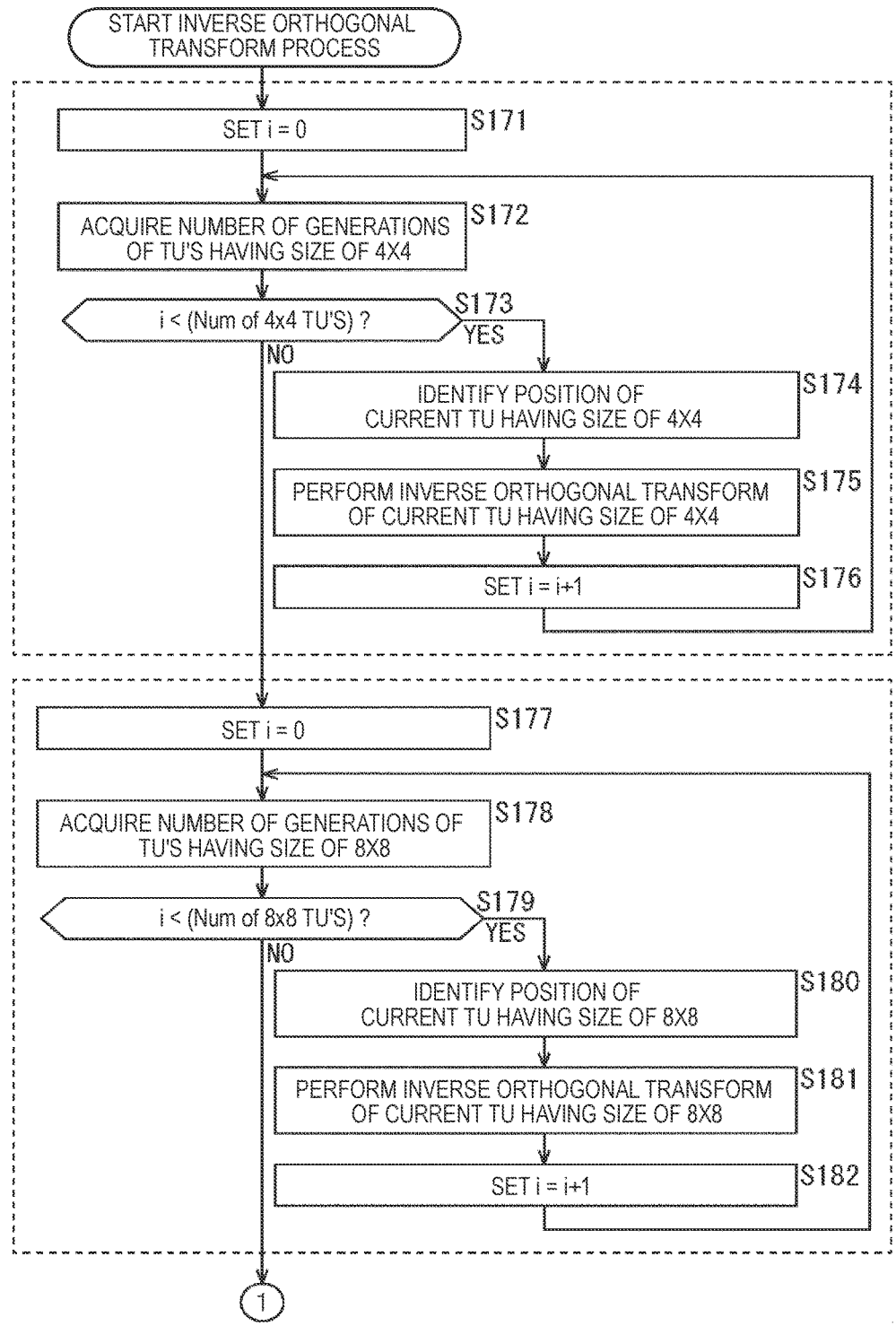
FIG. 11 is a flowchart describing an example of a flow of an inverse orthogonal transform process.

In FIG. 11 and FIG. 12, dashed line frames surround a process group for a TU having a certain block size. As illustrated in FIG. 11 and FIG. 12, processes surrounded by dotted lines can be independently performed. That is, the inverse orthogonal transform unit 115 can independently perform the inverse orthogonal transform process for each block size. Accordingly, it is possible to build an optimal algorithm in a processor capable of processing the same process at a high speed.

<Inter Prediction Process>

Figure 13:
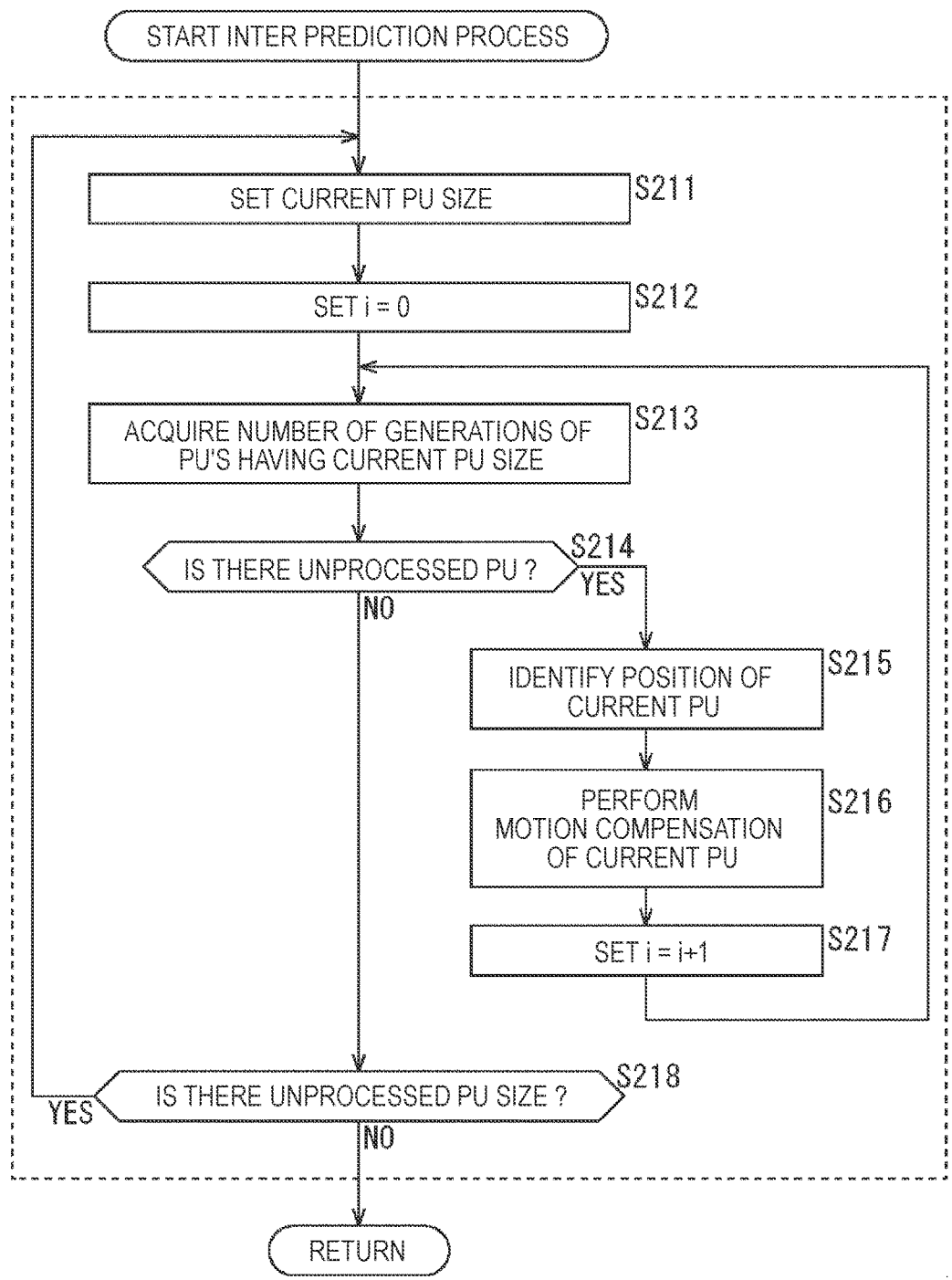
FIG. 13 is a flowchart describing an example of a flow of an inter prediction process.

Next, an example of a flow of the inter prediction process performed in Step S106 of FIG. 7 will be described with reference to a flowchart of FIG. 13. Description of the intra prediction process is omitted here.

When the optimal prediction mode is the inter prediction mode and the inter prediction process starts, the inter prediction unit 121 sets a current PU size that is a PU size of a processing target in Step S211.

In Step S212, the inter prediction unit 121 sets i=0. In Step S213, the inter prediction unit 121 acquires the number of generations of PUs having a current PU size calculated in the process of Step S123.

In Step S214, the inter prediction unit 121 determines whether there is an unprocessed PU. When it is determined that there is an unprocessed PU, the process advances to Step S215.

In Step S215, the inter prediction unit 121 identifies a position of a current PU having a current PU size based on the generation position of the PU calculated in the process of Step S123.

In Step S216, the inter prediction unit 121 performs motion compensation of the current PU having a current PU size and generates a prediction image.

In Step S217, the inter prediction unit 121 sets i=i+1. That is, the processing target is moved to the next PU. When the process of Step S217 ends, the process returns to Step S213, and the process thereafter is repeated. That is, the processes of Step S213 to Step S217 are performed on each PU having a current PU size.

When all PUs having a current PU size are processed, in Step S214, it is determined that there is no unprocessed PU, and the process advances to Step S218.

In Step S218, the inter prediction unit 121 determines whether there is an unprocessed PU size. When there is an unprocessed PU size, the process returns to Step S211, and the processing target is switched to the next PU size. When Step S211 to Step S218 are repeated as described above and prediction images of all PUs of all PU sizes are generated, the inter prediction unit 121 determines that there is no unprocessed PU size in Step S218, the inter prediction process ends and the process returns to FIG. 7.

As described above, inter prediction (motion compensation) can also be independently performed for each PU size. Accordingly, it is possible to build an optimal algorithm in a processor capable of processing the same process at a high speed.

Inter prediction may be processed in units of CUs instead of PUs. In this case, inter prediction may be independently performed for each CU size.

As described above, the image decoding device 100 can perform the inverse quantization process, the inverse orthogonal transform process, the inter prediction process (motion compensation), and the like more efficiently. A process to which the present technology can be applied is not limited to the above-described inverse quantization process, inverse orthogonal transform process, and inter prediction process (motion compensation). For example, the present technology can be applied to the pixel reconstruction process such as the filter process performed by the loop filter 117 and the intra prediction process performed by the intra prediction unit 120. That is, such processes can also be independently performed for each block size.

Therefore, the image decoding device 100 can perform a decoding process more efficiently.

<2. Second Embodiment>

<Image Decoding Device>

Since it is possible to recognize the number of generations of each block size, when a processing load of each block size is known in advance, it is possible to uniformly distribute processes. As a method of recognizing performance of each block size, a calibration process of measuring performance of each block size, for example, for each environment such as hardware specifications, or in advance when a decoding process starts, is effective.

Figure 14:
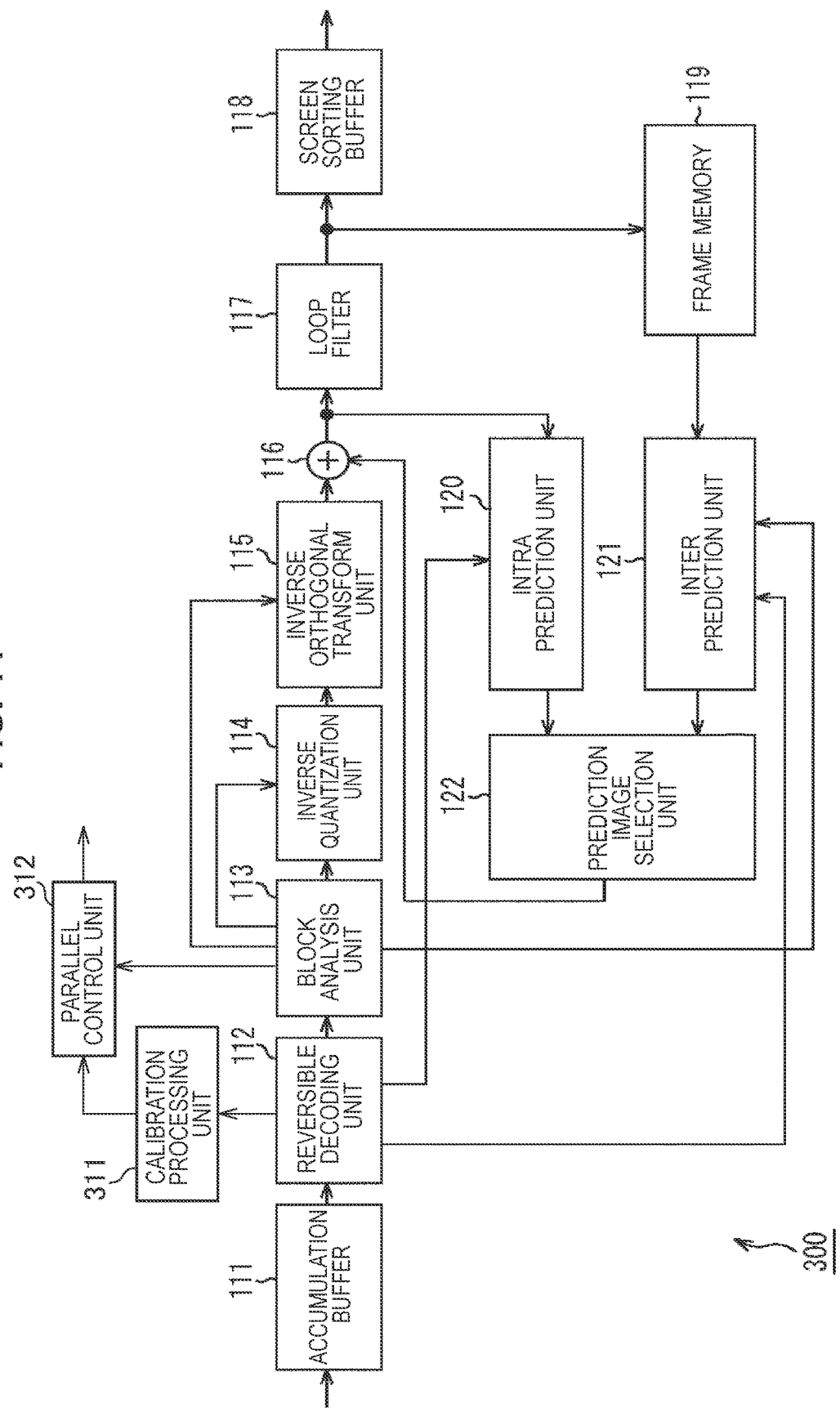
FIG. 14 is a block diagram illustrating an example of a main configuration of an image decoding device.

FIG. 14 is a block diagram illustrating an example of a main configuration of an image decoding device that is a form of an image processing device to which the present technology is applied. An image decoding device 300 illustrated in FIG. 14 is the same decoding device as the image decoding device 100 and decodes encoding data that is generated when an image encoding device (not illustrated) encodes image data according to an HEVC encoding scheme.

As illustrated in FIG. 14, the image decoding device 300 has basically the same configuration as the image decoding device 100, and further includes a calibration processing unit 311 and a parallel control unit 312.

The calibration processing unit 311 acquires coefficient data from the reversible decoding unit 112, performs calibration of block sizes, obtains an amount of a processing load for each block size, and supplies the information to the parallel control unit 312.

Based on the analysis result of the block structure supplied from the block analysis unit 113 and the information about an amount of a load for each block size supplied from the calibration processing unit 311, the parallel control unit 312 parallelizes processes for each block such that a load is applied as uniformly as possible.

Thus, since the image decoding device 300 can parallelize processes such that a variation of the processing load decreases, it is possible to use an environment (hardware specifications) more efficiently, and perform the process more efficiently.

<Flow of a Decoding Process>

Figure 15:
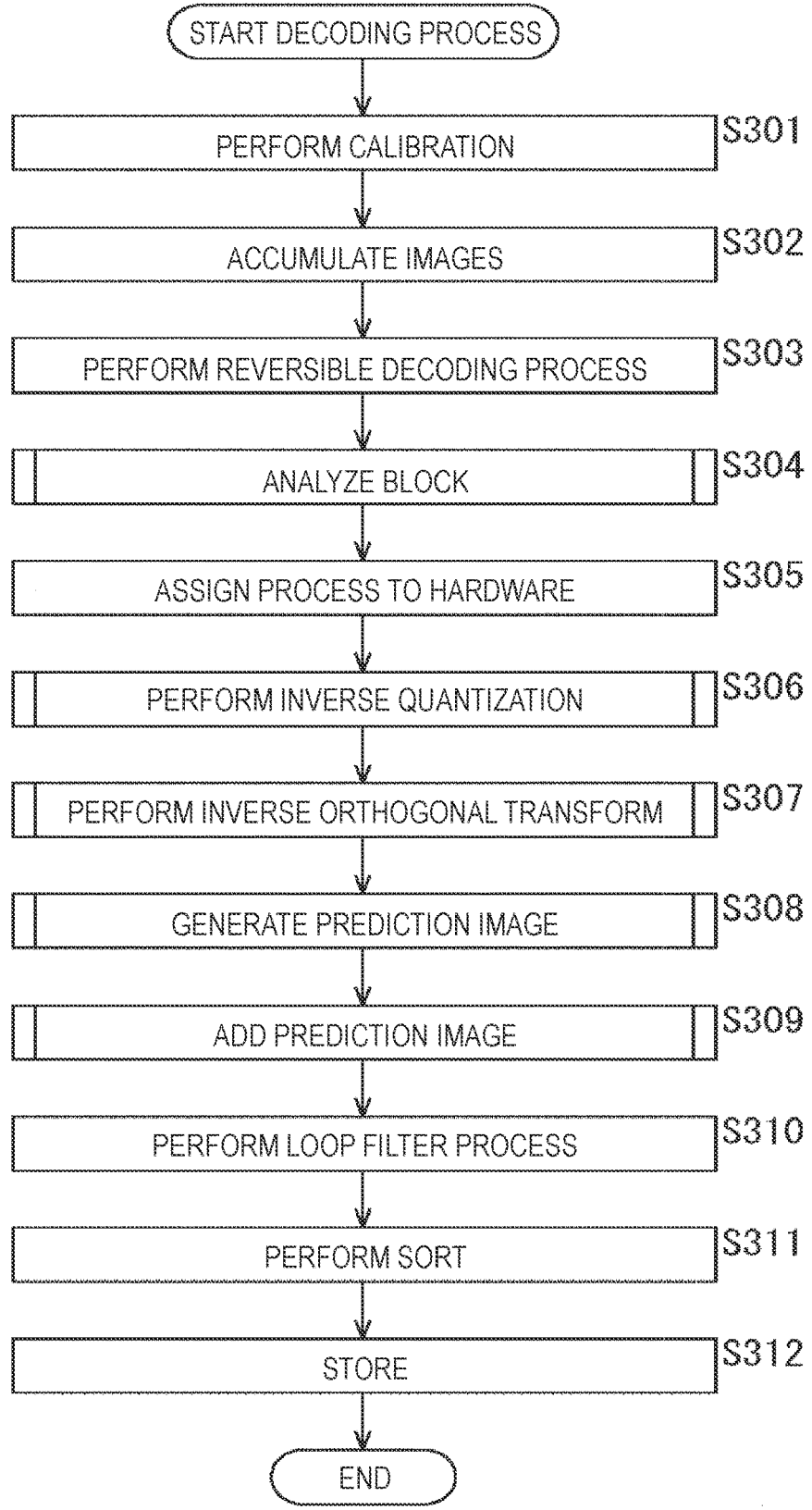
FIG. 15 is a flowchart describing an example of a flow of a decoding process.

Next, an example of a flow of the decoding process performed by the image decoding device 300 will be described with reference to a flowchart of FIG. 15.

When the decoding process starts, in Step S301, in the calibration processing unit 311, calibration is performed and an amount of a load for each block size is calculated.

The processes of Step S302 to Step S304 are performed similarly to the processes of Step S101 to Step S103 of FIG. 7.

In Step S305, the parallel control unit 312 assigns processes to hardware based on the calibration result obtained in the process of Step S301 and the analysis result of the block structure obtained in the process of Step S304. When the processes are parallelized, the processes are allocated such that an amount of a load becomes uniform.

The processes of Step S306 to Step S312 are performed similarly to the processes of Step S104 to Step S110.

When the decoding process is performed as described above, a coding block size is analyzed before the pixel reconstruction process, and thus the following pixel reconstruction process can be performed at a high speed. Specifically, for example, an overhead decreases according to a decrease of fine branches, cache efficiency increases, and a load is efficiently distributed. In addition, it is possible to easily build an optimal algorithm in a processor capable of processing the same process at a high speed. That is, the image decoding device 300 can perform a decoding process more efficiently.

The scope of applications of the present technology can be applied to all image decoding devices that can decode encoding data obtained by encoding image data and perform the filter process during decoding.

In addition, the present technology can be applied to an image decoding device that is used when image information (a bitstream) that is compressed by an orthogonal transform such as a discrete cosine transform and motion compensation, for example, MPEG and H.26x, is received through network media such as satellite broadcasting, cable television, the Internet, or a mobile phone. In addition, the present technology can be applied to an image decoding device that is used when processing is performed on storage media such as optical and magnetic disks and a flash memory.

<3. Third Embodiment>

<Application to Multi-view Image Decoding>

Figure 16:
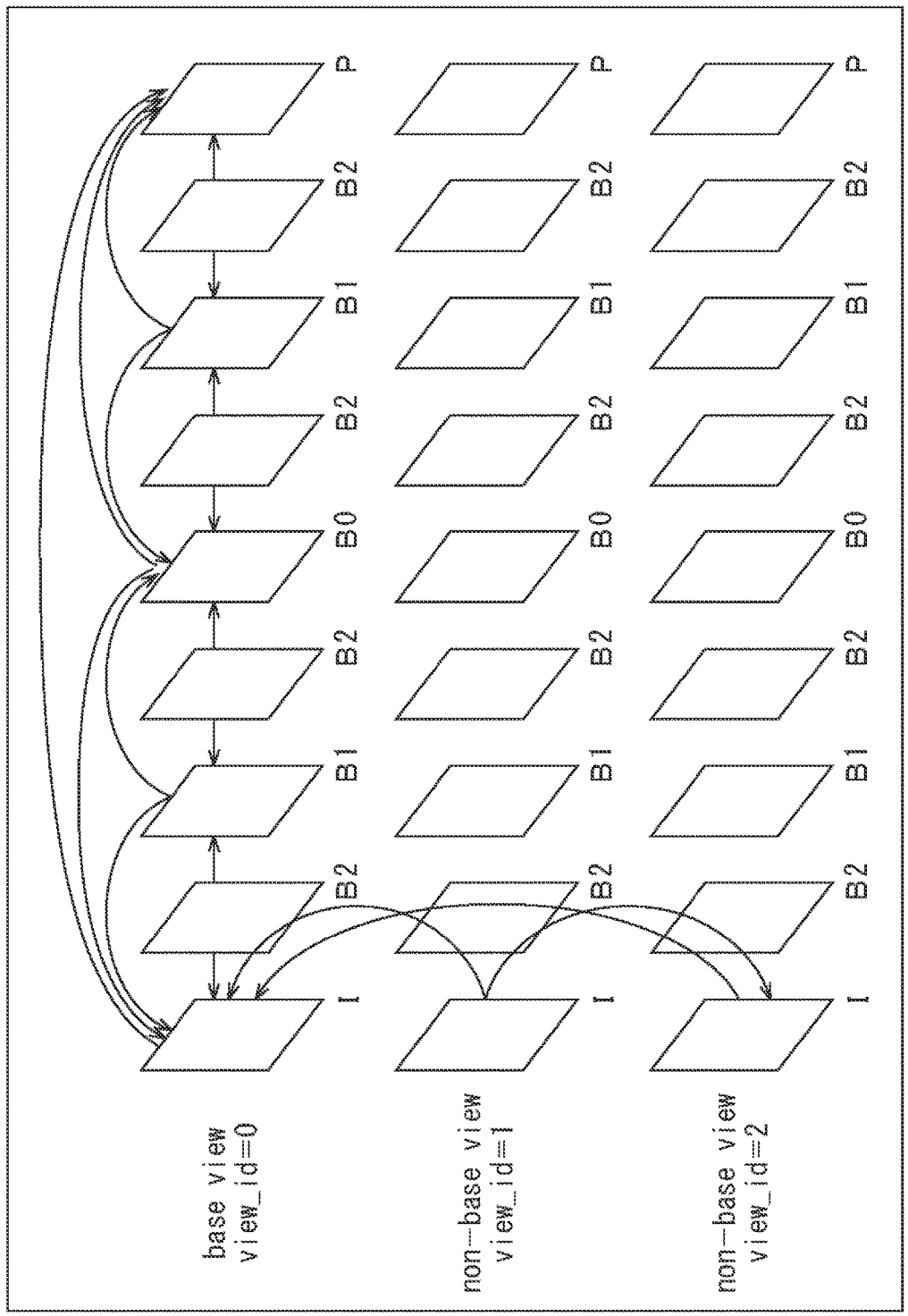
FIG. 16 is a diagram illustrating an example of a multi-view image encoding scheme.

The above-described series of processes can be applied to multi-view image decoding. FIG. 16 illustrates an example of a multi-view image encoding scheme.

As illustrated in FIG. 16, a multi-view image includes an image of a plurality of views. The plurality of views of the multi-view image include a base view in which only an image of its own view is used to perform encoding and decoding without using information of other views, and a non-base view in which information of other views is used to perform encoding and decoding. Encoding and decoding of the non-base view may use information of the base view and may use information of other non-base views.

When the multi-view image is encoded as illustrated in the example of FIG. 16, the multi-view image is encoded for each view. Then, when the encoding data obtained in this manner is decoded, the encoding data of each view is decoded (separately for each view). The above-described method in the first and second embodiments may be applied to decoding of such views. Thus, in the image of views, it is possible to perform the decoding process more efficiently. That is, similarly, in the case of the multi-view image, it is possible to perform the decoding process more efficiently.

<Multi-view Image Encoding Device>

Figure 17:
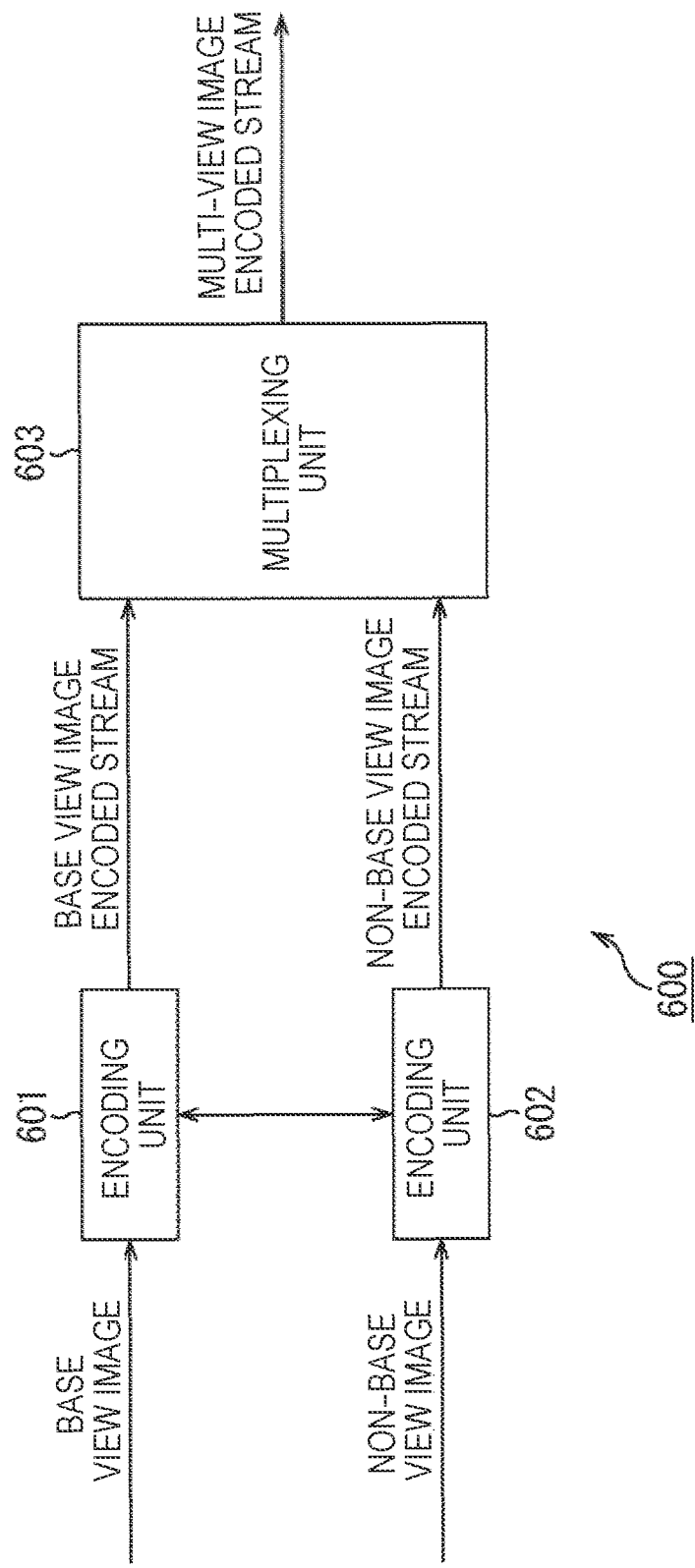
FIG. 17 is a diagram illustrating an example of a main configuration of a multi-view image encoding device to which the present technology is applied.

FIG. 17 is a diagram illustrating a multi-view image encoding device which performs the above-described multi-view image encoding. As illustrated in FIG. 17, the multi-view image encoding device 600 has an encoding unit 601, another encoding unit 602, and a multiplexing unit 603.

The encoding unit 601 encodes a base view image to generate a base view image encoded stream. The encoding unit 602 encodes a non-base view image to generate a non-base view image encoded stream. The multiplexing unit 603 multiplexes the base view image encoded stream generated by the encoding unit 601 and the non-base view image encoded stream generated by the encoding unit 602 to generate a multi-view image encoded stream.

<Multi-view Image Decoding Device>

Figure 18:
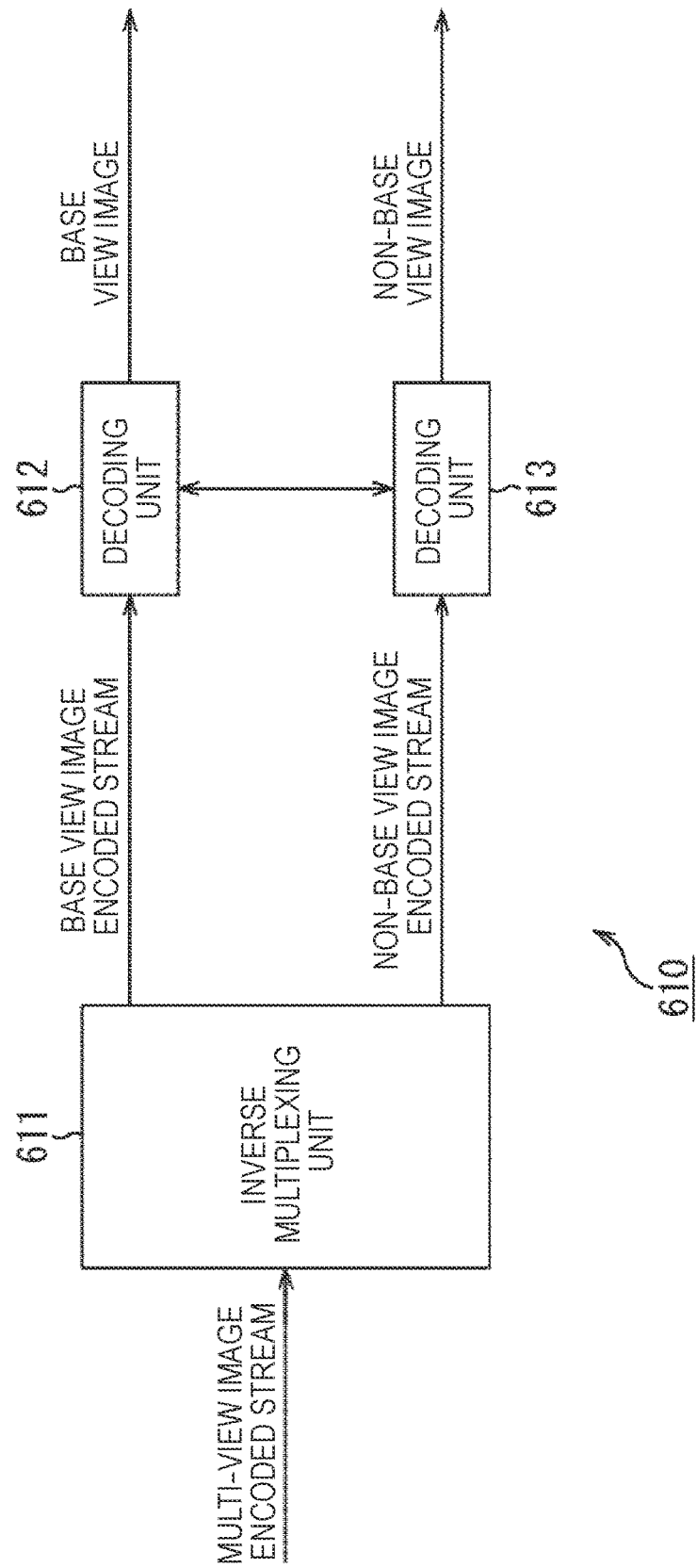
FIG. 18 is a diagram illustrating an example of a main configuration of a multi-view image decoding device to which the present technology is applied.

FIG. 18 is a diagram illustrating a multi-view image decoding device which performs the above-described multi-view image decoding. As illustrated in FIG. 18, the multi-view image decoding device 610 has an inverse multiplexing unit 611, a decoding unit 612, and another decoding unit 613.

The inverse multiplexing unit 611 inversely multiplexes the multi-view image encoded stream obtained by multiplexing the base view image encoded stream and the non-base view image encoded stream to extract the base view image encoded stream and the non-base view image encoded stream. The decoding unit 612 decodes the base view image encoded stream extracted by the inverse multiplexing unit 611 to obtain the base view image. The decoding unit 613 decodes the non-base view image encoded stream extracted by the inverse multiplexing unit 611 to obtain the non-base view image.

For example, as the decoding unit 612 and the decoding unit 613 of the multi-view image decoding device 610, the above-described image decoding device 100 or the image decoding device 300 may be applied. Thus, even when the encoding data of the multi-view image is decoded, the method described in the first and second embodiments can be applied. That is, the multi-view image decoding device 610 can perform the decoding process of the encoding data of the multi-view image more efficiently.

<4. Fourth Embodiment>
<Application to Hierarchical Image Decoding>

Figure 19:
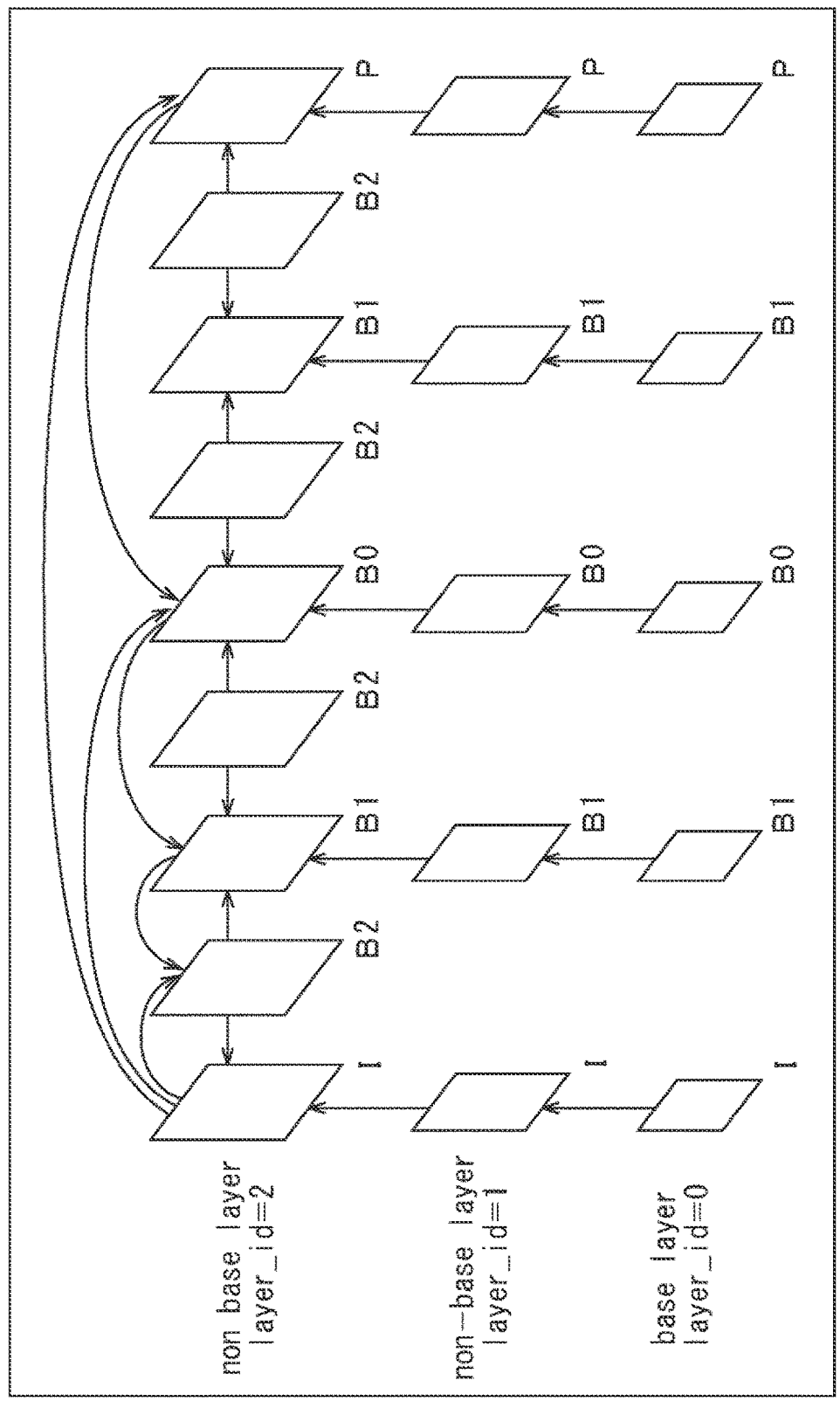
FIG. 19 is a diagram illustrating an example of a hierarchical image encoding scheme.

In addition, the above-described series of processes can be applied to hierarchical image decoding (scalable decoding). FIG. 19 illustrates an example of a hierarchical image encoding scheme.

Hierarchical image encoding (scalable encoding) involves dividing an image into a plurality of layers (hierarchized) and performing encoding for each layer so that image data can have scalability with respect to a predetermined parameter. Hierarchical image decoding (scalable decoding) is decoding that corresponds to the hierarchical image encoding.

As illustrated in FIG. 19, in hierarchizing of an image, one image is divided into a plurality of images (layers) with respect to a predetermined parameter that brings scalability. That is to say, the hierarchized image (hierarchical image) includes images with a plurality of hierarchies (layers) which have different values of the predetermined parameter. The plurality of layers of the hierarchical image are constituted by a base layer for which encoding/decoding is performed using only the image of its own layer without using images of other layers and non-base layers (each of which is also referred to as an enhancement layer) for which encoding/decoding is performed using images of other layers. A non-base layer may use the image of the base layer, or use the image of another non-base layer.

In general, a non-base layer includes data of the differential image (differential data) of its own image and the image of another layer so that redundancy is reduced. When one image has been divided into two hierarchies of a base layer and a non-base layer (also referred to as an enhancement layer), for example, an image with a lower quality than the original image is obtained only with data of the base layer, and by combining data of the base layer and data of the non-base layer, the original image (i.e., a high-quality image) is obtained.

By hierarchizing an image as described above, images with various levels of quality according to situations can be easily obtained. For example, image compression information according to a capability of a terminal or a network can be transmitted from a server without performing a transcoding process as when image compression information of only a base layer is transmitted to a terminal with a low processing capability such as a mobile telephone to reproduce a dynamic image having low spatial and temporal resolution or poor image quality or when image compression information of an enhancement layer in addition to a base layer is transmitted to a terminal with a high processing capability such as a television or a personal computer to reproduce a dynamic image having high spatial and temporal resolution or high image quality.

When the hierarchical image illustrated in the example of FIG. 19 is encoded, the hierarchical image is encoded for each layer. Then, when the encoding data obtained in this manner is decoded, the encoding data of each layer is decoded (separately for each layer). The above-described method in the first and second embodiments may be applied when such layers are decoded. Thus, it is possible to perform the decoding process in the image of layers more efficiently. That is, similarly, in the case of the hierarchical image, it is possible to perform the decoding process more efficiently.

<Scalable Parameter>

Figure 20:
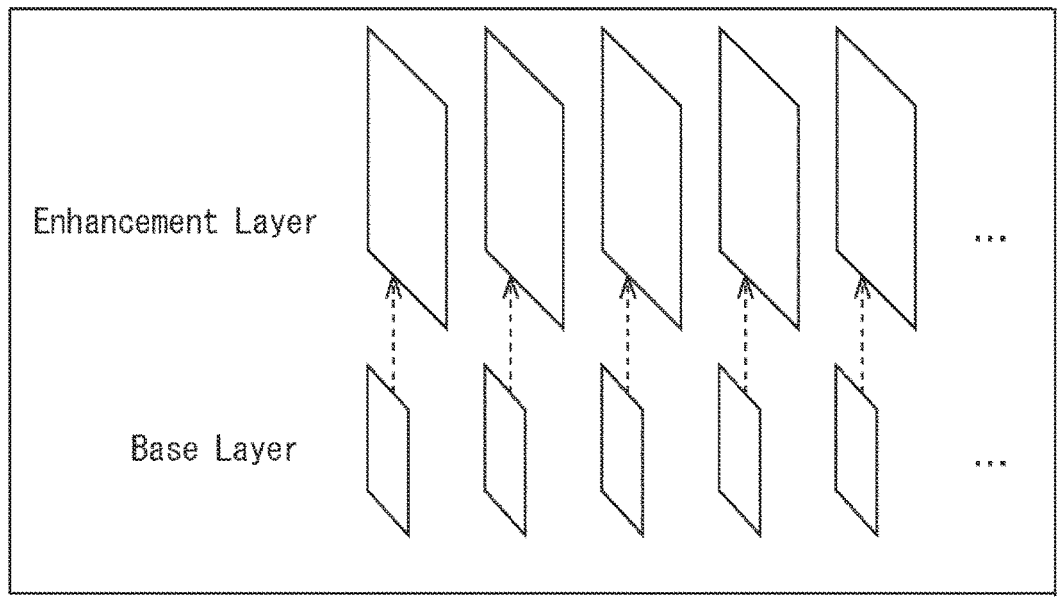
FIG. 20 is a diagram describing an example of spatial scalable encoding.

In such hierarchical image encoding and hierarchical image decoding (scalable encoding and scalable decoding), a parameter enabling a scalability function is arbitrary. For example, a spatial resolution illustrated in FIG. 20 may be used as the parameter (spatial scalability). In the spatial scalability, a resolution of an image is different for each layer. That is, as illustrated in, FIG. 20, each picture is layered into two levels, a base layer having a spatially lower resolution than the original image and an enhancement layer that is synthesized with an image of the base layer to obtain the original image (original spatial resolution). It is needless to say that the number of levels is only an example, and the image can be layered into any number of levels.

Figure 21:
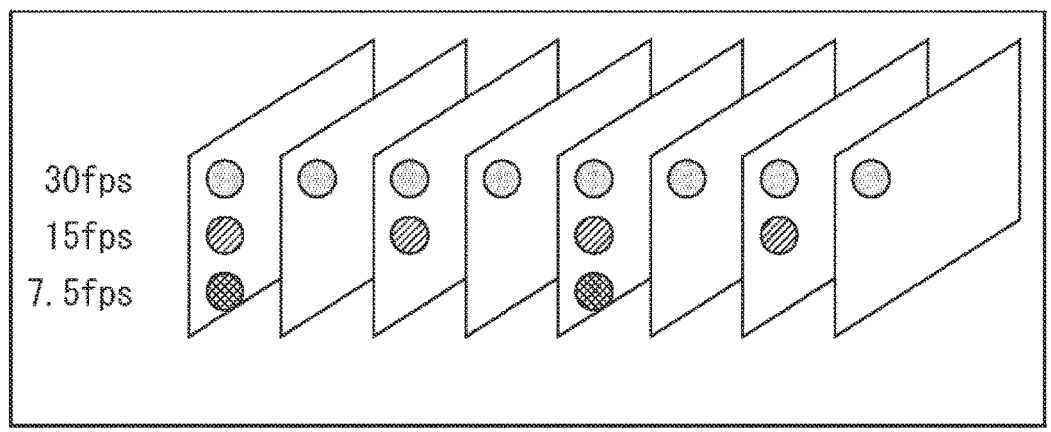
FIG. 21 is a diagram describing an example of temporal scalable encoding.

In addition, as a parameter enabling such scalability, another example, for example, a temporal resolution, may be applied (temporal scalability) as illustrated in FIG. 21. In the temporal scalability, a frame rate is different for each layer. That is, in this case, as illustrated in FIG. 21, the image is divided into layers having different frame rates, and when a layer having a high frame rate is added to a layer having a low frame rate, a video having a higher frame rate can be obtained, and when all layers are added, an original video (an original frame rate) can be obtained. The number of levels is only an example, and the image can be layered into any number of levels.

Figure 22:
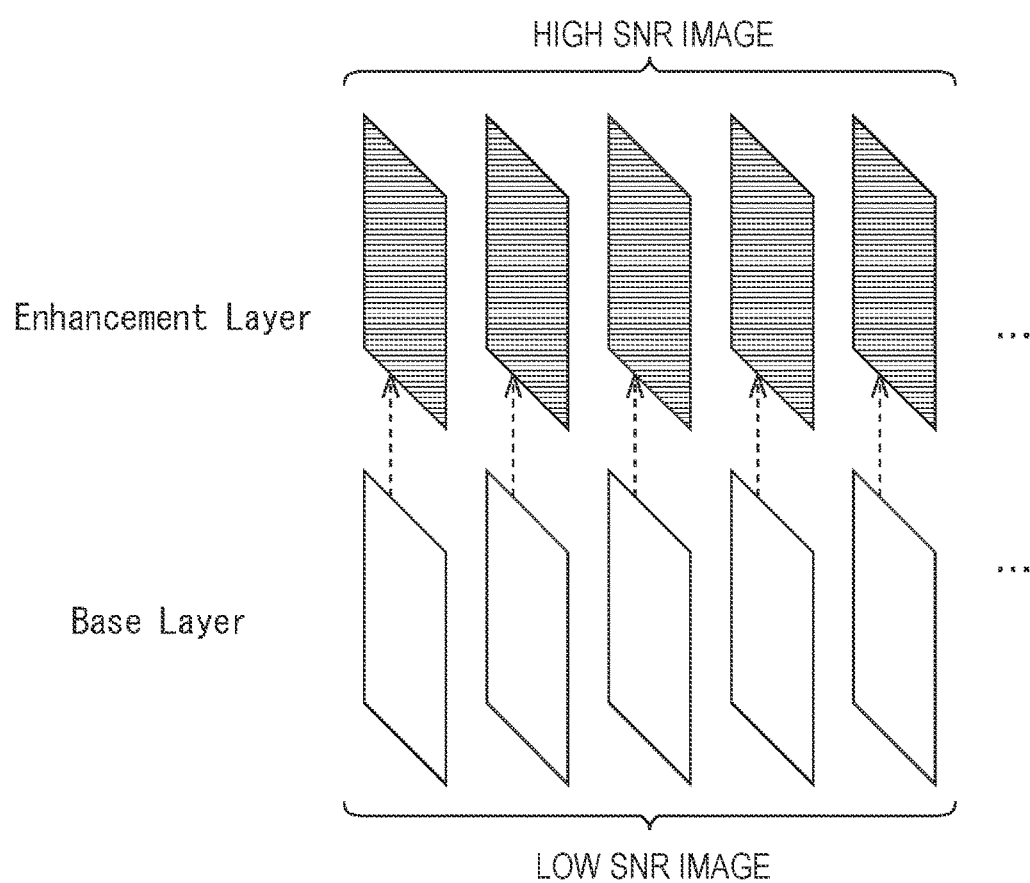
FIG. 22 is a diagram describing an example of scalable encoding of a signal-to-noise ratio.

Further, as a parameter enabling such scalability, for example, a signal to noise ratio (SNR) may be applied (SNR scalability). In the SNR scalability, the SN ratio is different for each layer. That is, as illustrated in FIG. 22, each picture is layered into two layers, a base layer having a lower SNR than the original image and an enhancement layer that is synthesized with an image of the base layer to obtain the original image (original SNR). That is, in base layer image compression information, information about an image having a low PSNR is transmitted, and enhancement layer image compression information is added thereto. Therefore, it is possible to rebuild an image having a high PSNR. It is needless to say that the number of levels is only an example, and the image can be layered into any number of levels.

It is needless to say that the parameter enabling scalability may be a parameter other than the above-described examples. For example, there is bit-depth scalability in which the base layer is an image of 8 bits, the enhancement layer is added thereto, and thus an image of 10 bits is obtained.

In addition, in chroma scalability, the base layer is a component image of a 4:2:0 format, the enhancement layer is added thereto, and thus a component image of a 4:2:2 format is obtained.

<Hierarchical Image Encoding Device>

Figure 23:
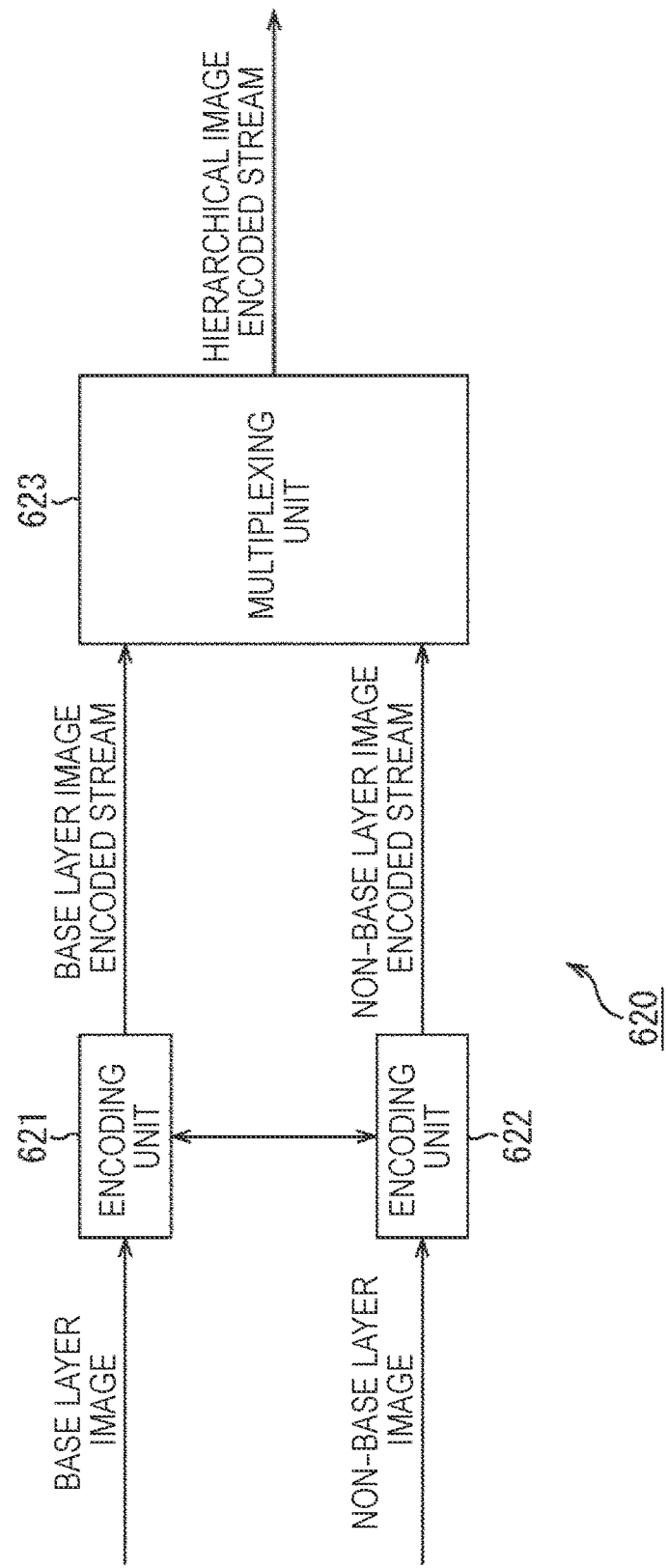
FIG. 23 is a diagram illustrating an example of a main configuration of a hierarchical image encoding device to which the present technology is applied.

FIG. 23 is a diagram illustrating a hierarchical image encoding device which performs the above-described hierarchical image encoding. The hierarchical image encoding device 620 has an encoding unit 621, another encoding unit 622, and a multiplexing unit 623 as illustrated in FIG. 23.

The encoding unit 621 encodes a base layer image to generate a base layer image encoded stream. The encoding unit 622 encodes a non-base layer image to generate a non-base layer image encoded stream. The multiplexing unit 623 multiplexes the base layer image encoded stream generated by the encoding unit 621 and the non-base layer image encoded stream generated by the encoding unit 622 to generate a hierarchical image encoded stream.

<Hierarchical Image Decoding Device>

Figure 24:
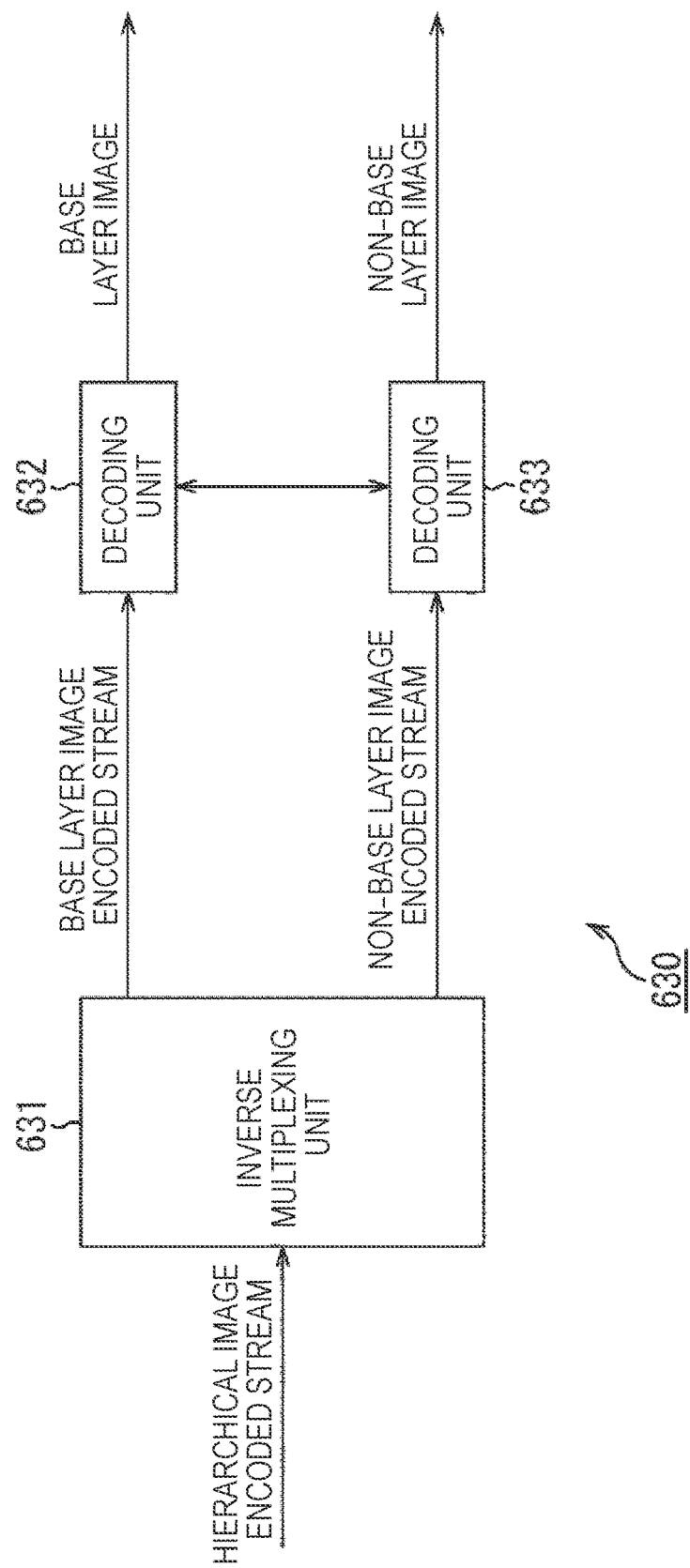
FIG. 24 is a diagram illustrating an example of a main configuration of a hierarchical image decoding device to which the present technology is applied.

FIG. 24 is a diagram illustrating a hierarchical image decoding device which performs the above-described hierarchical image decoding. The hierarchical image decoding device 630 has an inverse multiplexing unit 631, a decoding unit 632, and another decoding unit 633 as illustrated in FIG. 24.

The inverse multiplexing unit 631 inversely multiplexes the hierarchical image encoded stream obtained by multiplexing the base layer image encoded stream and the non-base layer image encoded stream to extract the base layer image encoded stream and the non-base layer image encoded stream. The decoding unit 632 decodes the base layer image encoded stream extracted by the inverse multiplexing unit 631 to obtain the base layer image. The decoding unit 633 decodes the non-base layer image encoded stream extracted by the inverse multiplexing unit 631 to obtain the non-base layer image.

For example, as the decoding unit 632 and the decoding unit 633 of the hierarchical image decoding device 630, the above-described image decoding device 100 or image decoding device 300 may be applied. Thus, even when the encoding data of the hierarchical image is decoded, the method described in the first and second embodiments can be applied. That is, the hierarchical image decoding device 630 can perform the decoding process of the encoding data of the hierarchical image more efficiently.

<5. Fifth Embodiment>

<Computer>

The series of processes described above can be executed by hardware or software. When the series of processes are executed by software, a program constituting the software is installed in a computer. Here, the computer includes a computer incorporated into dedicated hardware, a general-purpose personal computer, for example, that can execute various functions by installing various programs, and the like.

Figure 25:
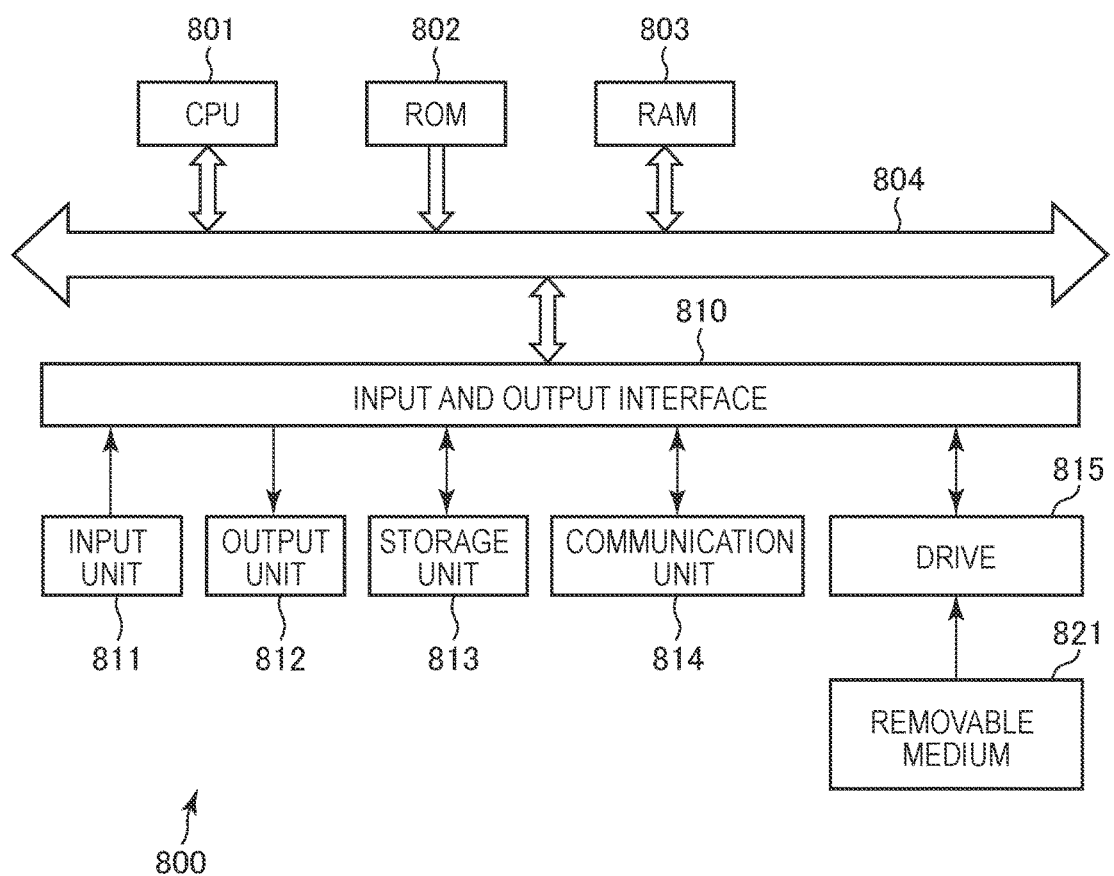
FIG. 25 is a block diagram illustrating an example of a main configuration of a computer.

FIG. 25 is a block diagram illustrating an example of a hardware configuration of a computer which executes the above-described series of processes using a program.

In the computer 800 shown in FIG. 25, a central processing unit (CPU) 801, a read only memory (ROM) 802, and a random access memory (RAM) 803 are connected to one another by a bus 804.

The bus 804 is further connected with an input and output interface 810. The input and output interface 810 is connected with an input unit 811, an output unit 812, a storage unit 813, a communication unit 814, and a drive 815.

The input unit 811 includes, for example, a keyboard, a mouse, a microphone, a touch panel, and an input terminal. The output unit 812 includes, for example, a display, a speaker, and an output terminal. The storage unit 813 includes, for example, a hard disk, a RAM disk, and a non-volatile memory. The communication unit 814 includes, for example, a network interface. The drive 815 drives a removable medium 821 such as a magnetic disk, an optical disc, a magneto optical disc or a semiconductor memory.

In the computer configured as described above, the CPU 801 loads and executes a program stored in, for example, the storage unit 813, through the input and output interface 810 and the bus 804, in the RAM 803 and thus the above-described series of processes is performed. In addition, data necessary for the CPU 801 to perform various types of processing is also appropriately stored in the RAM 803.

The program executed by the computer (the CPU 801) can be recorded in the removable medium 821, for example, as package media, and applied. In this case, when the removable medium 821 is mounted in the drive 815, the program can be installed in the storage unit 813 through the input and output interface 810.

In addition, the program can be provided through wired or wireless transmission media such as a local area network, the Internet, and digital satellite broadcasting. In this case, the program can be received by the communication unit 814 and installed in the storage unit 813.

Alternatively, the program can be installed in advance in the ROM 802 or the storage unit 813.

Note that the program executed by the computer may be a program which performs the processes in a time series manner in the order described in the present specification, or may be a program which performs the processes in parallel or at necessary timings when they are invoked, or the like.

It should be also noted that, in this specification, the steps describing the program stored in the recording medium include not only a process performed in time series according to the sequence shown therein but also a process executed in parallel or individually, not necessarily performed in time series.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

Further, an element described as a single device (or processing unit) above may be configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, the present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

The image decoding device according to the above-described embodiments may be applied to various electronic devices, for example, a transmitter or a receiver used for satellite broadcasting, cable broadcasting such as cable TV, delivery over the Internet, delivery to a terminal through cellular communication, and a recording device configured to record an image in media such as an optical disc, a magnetic disk and a flash memory, and a reproduction device configured to reproduce an image in such a storage medium. Hereinafter, four application examples will be described.

<6. Sixth embodiment>
<First application example: television receiver>

Figure 26:
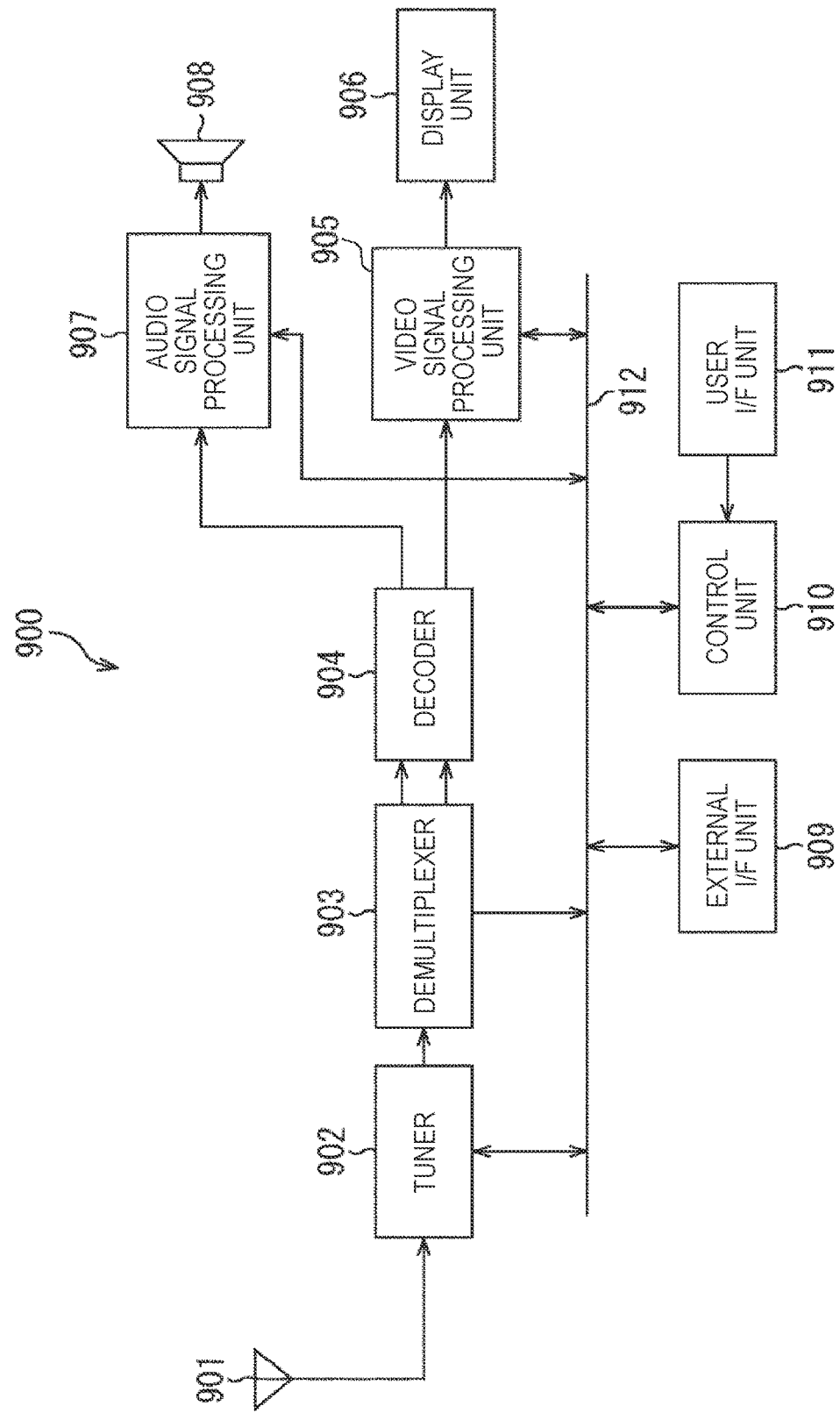
FIG. 26 is a block diagram illustrating an example of a schematic configuration of a television device.

FIG. 26 illustrates an example of a schematic configuration of a television device to which the above-described embodiment is applied. A television device 900 includes an antenna 901, a tuner 902, a demultiplexer 903, a decoder 904, a video signal processing unit 905, a display unit 906, an audio signal processing unit 907, a speaker 908, an external interface (I/F) unit 909, a control unit 910, a user interface (I/F) unit 911, and a bus 912.

The tuner 902 extracts a desired channel signal from a broadcast signal received through the antenna 901, and demodulates the extracted signal. Then, the tuner 902 outputs an encoding bitstream obtained by demodulation to the demultiplexer 903. That is, the tuner 902 serves as a transmission unit in the television device 900, which receives an encoding stream in which an image is encoded.

The demultiplexer 903 separates a video stream and an audio stream of a viewing target program from the encoding bitstream, and outputs separated streams to the decoder 904. In addition, the demultiplexer 903 extracts auxiliary data such as an electronic program guide (EPG) from the encoding bitstream, and supplies the extracted data to the control unit 910. When the encoding bitstream is scrambled, the demultiplexer 903 may perform descrambling.

The decoder 904 decodes the video stream and the audio stream input from the demultiplexer 903. Then, the decoder 904 outputs video data generated in the decoding process to the video signal processing unit 905. In addition, the decoder 904 outputs audio data generated in the decoding process to the audio signal processing unit 907.

The video signal processing unit 905 reproduces video data input from the decoder 904, and displays a video on the display unit 906. In addition, the video signal processing unit 905 may display an application screen supplied through a network on the display unit 906. In addition, the video signal processing unit 905 may perform an additional process of the video data, for example, noise removal, according to settings. Further, the video signal processing unit 905 generates an image of a graphical user interface (GUI), for example, a menu, a button or a cursor, and superimposes the generated image on an output image.

The display unit 906 is driven by a drive signal supplied from the video signal processing unit 905, and displays a video or an image on a video area of a display device (for example, a liquid crystal display, a plasma display or an organic electroluminescence display (OELD)).

The audio signal processing unit 907 performs a reproducing process such as D/A conversion and amplification of audio data input from the decoder 904, and outputs audio from the speaker 908. In addition, the audio signal processing unit 907 may perform an additional process such as noise removal of the audio data.

The external interface unit 909 is an interface for connecting the television device 900 and an external device or a network. For example, a video stream or an audio stream received through the external interface unit 909 may be decoded by the decoder 904. That is, the external interface unit 909 also serves as a transmission unit in the television device 900, which receives an encoding stream in which an image is encoded.

The control unit 910 includes a processor such as a CPU and a memory such as a RAM and a ROM. The memory stores a program executed by the CPU, program data, EPG data, and data acquired via a network. The program stored in the memory is read and executed by the CPU, for example, when the television device 900 starts. The CPU executes the program, and therefore controls operations of the television device 900 according to, for example, a manipulation signal input from the user interface unit 911.

The user interface unit 911 is connected to the control unit 910. The user interface unit 911 includes, for example, a button or a switch for a user to manipulate the television device 900 and a reception unit of a remote control signal. The user interface unit 911 detects user manipulation through such components, generates a manipulation signal, and outputs the generated manipulation signal to the control unit 910.

The bus 912 connects the tuner 902, the demultiplexer 903, the decoder 904, the video signal processing unit 905, the audio signal processing unit 907, the external interface unit 909 and the control unit 910 to one another.

In the television device 900 configured in this manner, the decoder 904 may include functions of the image decoding device 100 or image decoding device 300. That is, the decoder 904 may decode the encoding data using the method described in the first and second embodiments. Thus, the television device 900 can perform the decoding process of the received encoding bitstream more efficiently.

<Second application example: mobile phone>

Figure 27:
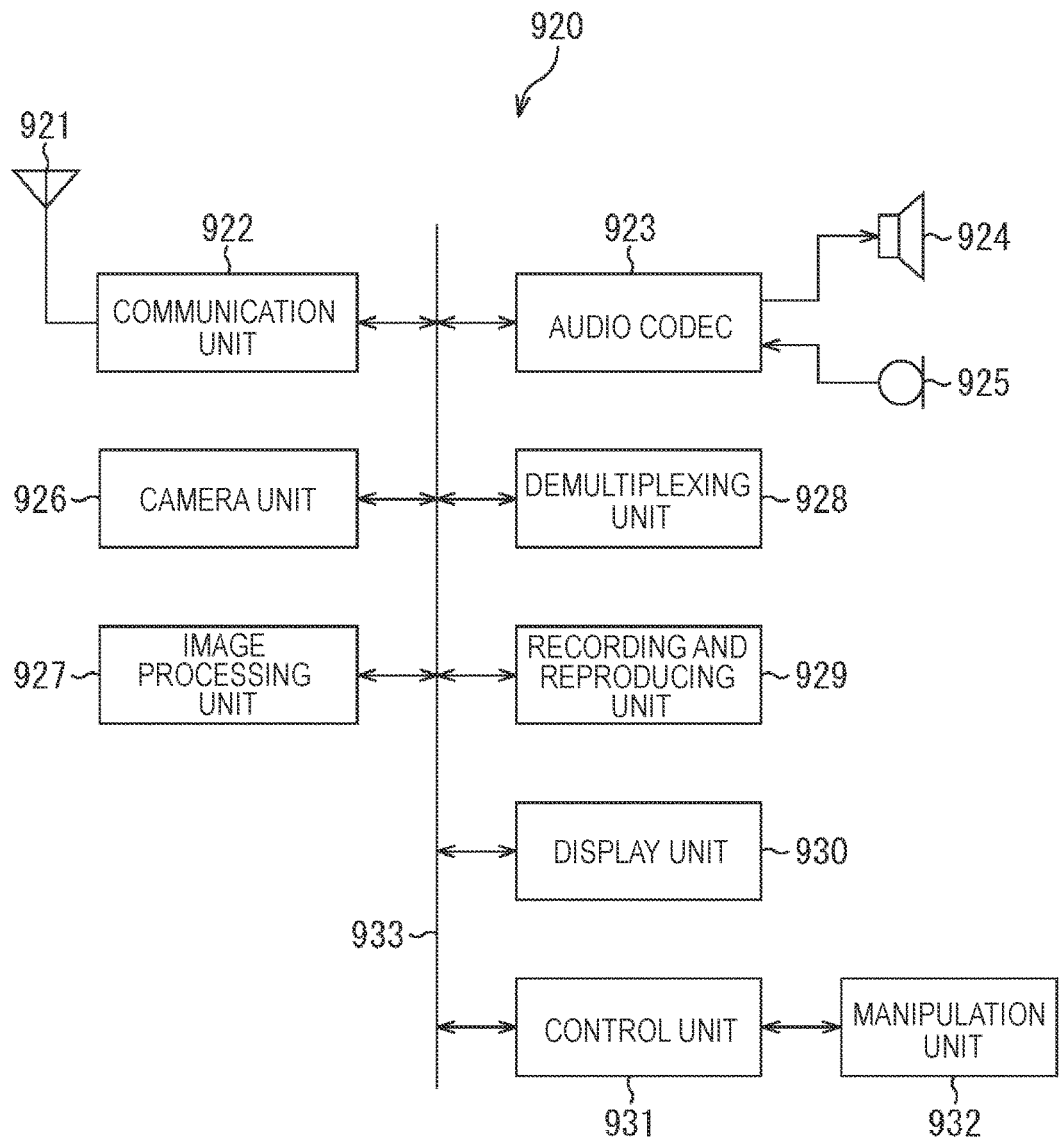
FIG. 27 is a block diagram illustrating an example of a schematic configuration of a mobile telephone.

FIG. 27 illustrates an example of a schematic configuration of a mobile phone to which the above-described embodiment is applied. A mobile phone 920 includes an antenna 921, a communication unit 922, an audio codec 923, a speaker 924, a microphone 925, a camera unit 926, an image processing unit 927, a demultiplexing unit 928, a recording and reproducing unit 929, a display unit 930, a control unit 931, a manipulation unit 932, and a bus 933.

The antenna 921 is connected to the communication unit 922. The speaker 924 and the microphone 925 are connected to the audio codec 923. The manipulation unit 932 is connected to the control unit 931. The bus 933 connects the communication unit 922, the audio codec 923, the camera unit 926, the image processing unit 927, the demultiplexing unit 928, the recording and reproducing unit 929, the display unit 930, and the control unit 931 to one another.

The mobile phone 920 performs operations such as audio signal transmission and reception, e-mail or image data transmission and reception, image capturing, and data recording in various operation modes including a voice call mode, a data communication mode, an imaging mode and a videophone mode.

In the voice call mode, an analog audio signal generated by the microphone 925 is supplied to the audio codec 923. The audio codec 923 converts the analog audio signal into audio data, and performs A/D conversion and compression of the converted audio data. Then, the audio codec 923 outputs the compressed audio data to the communication unit 922. The communication unit 922 encodes and modulates the audio data, and generates a transmission signal. Then, the communication unit 922 transmits the generated transmission signal to a base station (not illustrated) through the antenna 921. In addition, the communication unit 922 performs amplification and frequency conversion of a wireless signal received through the antenna 921, and acquires a reception signal. Then, the communication unit 922 demodulates and decodes the reception signal, generates audio data, and outputs the generated audio data to the audio codec 923. The audio codec 923 performs decompression and D/A conversion of the audio data and generates an analog audio signal. Then, the audio codec 923 supplies the generated audio signal to the speaker 924, and outputs audio.

In addition, in the data communication mode, for example, the control unit 931 generates text data of an e-mail according to user manipulation through the manipulation unit 932. In addition, the control unit 931 displays text on the display unit 930. In addition, the control unit 931 generates e-mail data according to a transmission instruction from the user through the manipulation unit 932, and outputs the generated e-mail data to the communication unit 922. The communication unit 922 encodes and modulates the e-mail data, and generates a transmission signal. Then, the communication unit 922 transmits the generated transmission signal to a base station (not illustrated) through the antenna 921. In addition, the communication unit 922 performs amplification and frequency conversion of the wireless signal received through the antenna 921, and acquires a reception signal. Then, the communication unit 922 demodulates and decodes the reception signal, restores the e-mail data, and outputs the restored e-mail data to the control unit 931. The control unit 931 displays content of the e-mail on the display unit 930, supplies the e-mail data to the recording and reproducing unit 929, and writes the data in the storage medium.

The recording and reproducing unit 929 includes a certain readable and writable storage medium. For example, the storage medium may be a built-in storage medium such as a RAM and a flash memory, and an externally mounted storage medium such as a hard disk, a magnetic disk, a magneto optical disc, an optical disc, a Universal Serial Bus (USB) memory, or a memory card.

In addition, in the imaging mode, for example, the camera unit 926 images a subject, generates image data, and outputs the generated image data to the image processing unit 927. The image processing unit 927 encodes the image data input from the camera unit 926, supplies an encoding stream to the recording and reproducing unit 929, and writes the stream in the storage medium.

Further, in an image display mode, the recording and reproducing unit 929 reads the encoding stream recorded in the storage medium, and outputs the read encoding stream to the image processing unit 927. The image processing unit 927 decodes the encoding stream input from the recording and reproducing unit 929, supplies the image data to the display unit 930, and displays the image thereon.

In addition, in the videophone mode, for example, the demultiplexing unit 928 multiplexes the video stream encoded by the image processing unit 927 and the audio stream input from the audio codec 923, and outputs the multiplexed stream to the communication unit 922. The communication unit 922 encodes and modulates the stream and generates a transmission signal. Then, the communication unit 922 transmits the generated transmission signal to a base station (not illustrated) through the antenna 921. In addition, the communication unit 922 performs amplification and frequency conversion of the wireless signal received through the antenna 921, and acquires a reception signal. The encoding bitstream may be included in the transmission signal and the reception signal. Then, the communication unit 922 demodulates and decodes the reception signal, restores the stream, and outputs the restored stream to the demultiplexing unit 928. The demultiplexing unit 928 separates a video stream and an audio stream from the input stream, and outputs the video stream to the image processing unit 927, and the audio stream to the audio codec 923. The image processing unit 927 decodes the video stream and generates video data. The video data is supplied to the display unit 930, and a series of images is displayed by the display unit 930. The audio codec 923 performs decompression and D/A conversion of the audio stream and generates an analog audio signal. Then, the audio codec 923 supplies the generated audio signal to the speaker 924, and outputs audio.

In the mobile phone 920 configured in this manner, for example, the image processing unit 927 may include functions of the image decoding device 100 or the image decoding device 300. That is, the image processing unit 927 may decode the encoding data using the method described in the first and second embodiments. Thus, the mobile phone 920 can perform the decoding process of the encoding stream (the video stream) more efficiently.

<Third application example: recording and reproduction device>

Figure 28:
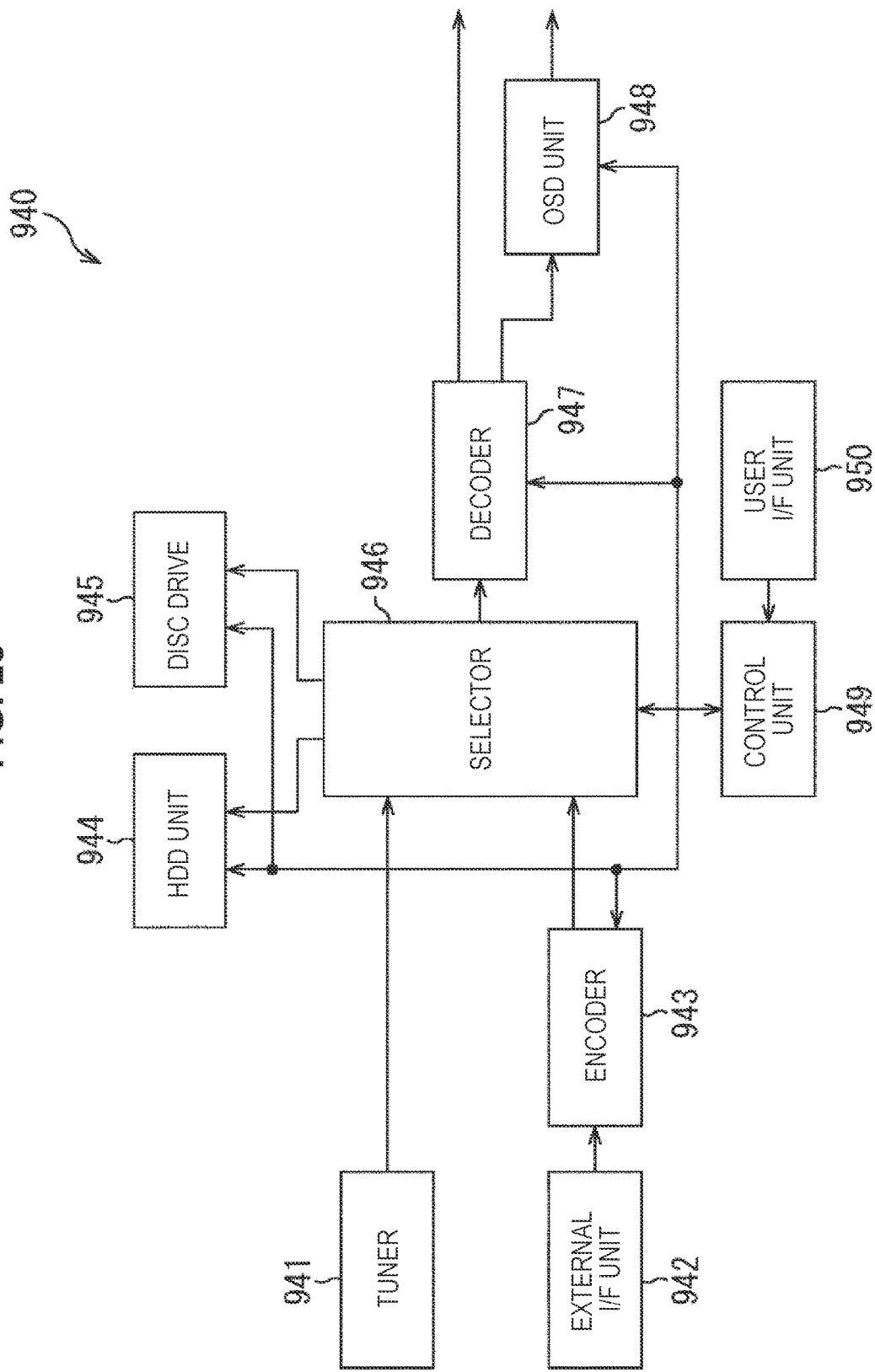
FIG. 28 is a block diagram illustrating an example of a schematic configuration of a recording and reproduction device.

FIG. 28 illustrates an example of a schematic configuration of a recording and reproduction device to which the above-described embodiment is applied. A recording and reproduction device 940 encodes, for example, audio data and video data of a received broadcast program, and records the data in the recording medium. In addition, the recording and reproduction device 940 may encode, for example, audio data and video data acquired from another device, and record the data in the recording medium. In addition, the recording and reproduction device 940 reproduces data recorded in the recording medium using a monitor and a speaker according to, for example, the user's instruction. In this case, the recording and reproduction device 940 decodes the audio data and the video data.

The recording and reproduction device 940 has a tuner 941, an external interface unit (I/F) 942, an encoder 943, a hard disk drive (HDD) unit 944, a disc drive 945, a selector 946, a decoder 947, an on-screen display (OSD) unit 948, a control unit 949, and a user interface unit (I/F) 950.

The tuner 941 extracts a desired channel signal from a broadcast signal received through an antenna (not illustrated), and demodulates the extracted signal. Then, the tuner 941 outputs an encoding bitstream obtained by demodulation to the selector 946. That is, the tuner 941 serves as a transmission unit in the recording and reproduction device 940.

The external interface unit 942 is an interface for connecting the recording and reproduction device 940 and an external device or a network. The external interface unit 942 may be, for example, an Institute of Electrical and Electronic Engineers (IEEE) 1394 interface, a network interface, a USB interface, or a flash memory interface. For example, video data and audio data received through the external interface unit 942 are input to the encoder 943. That is, the external interface unit 942 serves as the transmission unit in the recording and reproduction device 940.

When the video data and audio data input from the external interface unit 942 are not encoded, the encoder 943 encodes the video data and audio data. Then, the encoder 943 outputs the encoding bitstream to the selector 946.

The HDD 944 records the encoding bitstream in which content data such as a video and audio is compressed, various programs, and other data in an internal hard disk. In addition, when a video and audio are reproduced, the HDD 944 reads such data from a hard disk.

The disc drive 945 records and reads data in and from a recording medium that is mounted. The recording medium to be mounted in the disc drive 945 may be, for example, a Digital Versatile Disc (DVD) disc (DVD-Video, DVD-RAM (DVD-Random Access Memory), DVD-Recordable (DVD-R), DVD-Rewritable (DVD-RW), DVD+Recordable (DVD+R), DVD+Rewritable (DVD+RW) and the like) or a Blu-ray (registered trademark) disc.

When a video and audio are recorded, the selector 946 selects the encoding bitstream input from the tuner 941 or the encoder 943, and outputs the selected encoding bitstream to the HDD 944 or the disc drive 945. In addition, when a video and audio are reproduced, the selector 946 outputs the encoding bitstream input from the HDD 944 or the disc drive 945 to the decoder 947.

The decoder 947 decodes the encoding bitstream, and generates video data and audio data. Then, the decoder 947 outputs the generated video data to the OSD 948. In addition, the decoder 947 outputs the generated audio data to an external speaker.

The OSD 948 reproduces the video data input from the decoder 947, and displays a video. In addition, the OSD 948 may superimpose an image of a GUI, for example, a menu, a button or a cursor, on the video to be displayed.

The control unit 949 includes a processor such as a CPU and a memory such as a RAM and a ROM. The memory stores a program executed by the CPU and program data. The program stored in the memory is read and executed by the CPU, for example, when the recording and reproduction device 940 starts. The CPU executes the program, and therefore controls operations of the recording and reproduction device 940 according to, for example, a manipulation signal input from the user interface unit 950.

The user interface unit 950 is connected to the control unit 949. The user interface unit 950 includes, for example, a button and a switch for the user to manipulate the recording and reproduction device 940, and a reception unit of a remote control signal. The user interface unit 950 detects user manipulation through such components, generates a manipulation signal, and outputs the generated manipulation signal to the control unit 949.

In the recording and reproduction device 940 configured in this manner, for example, the decoder 947 may include functions of the image decoding device 100 or the image decoding device 300. That is, the decoder 947 may decode the encoding data using the method described in the first and second embodiments. Thus, the recording and reproduction device 940 can perform the decoding process of the encoding bitstream more efficiently.

<Fourth application example: imaging device>

Figure 29:
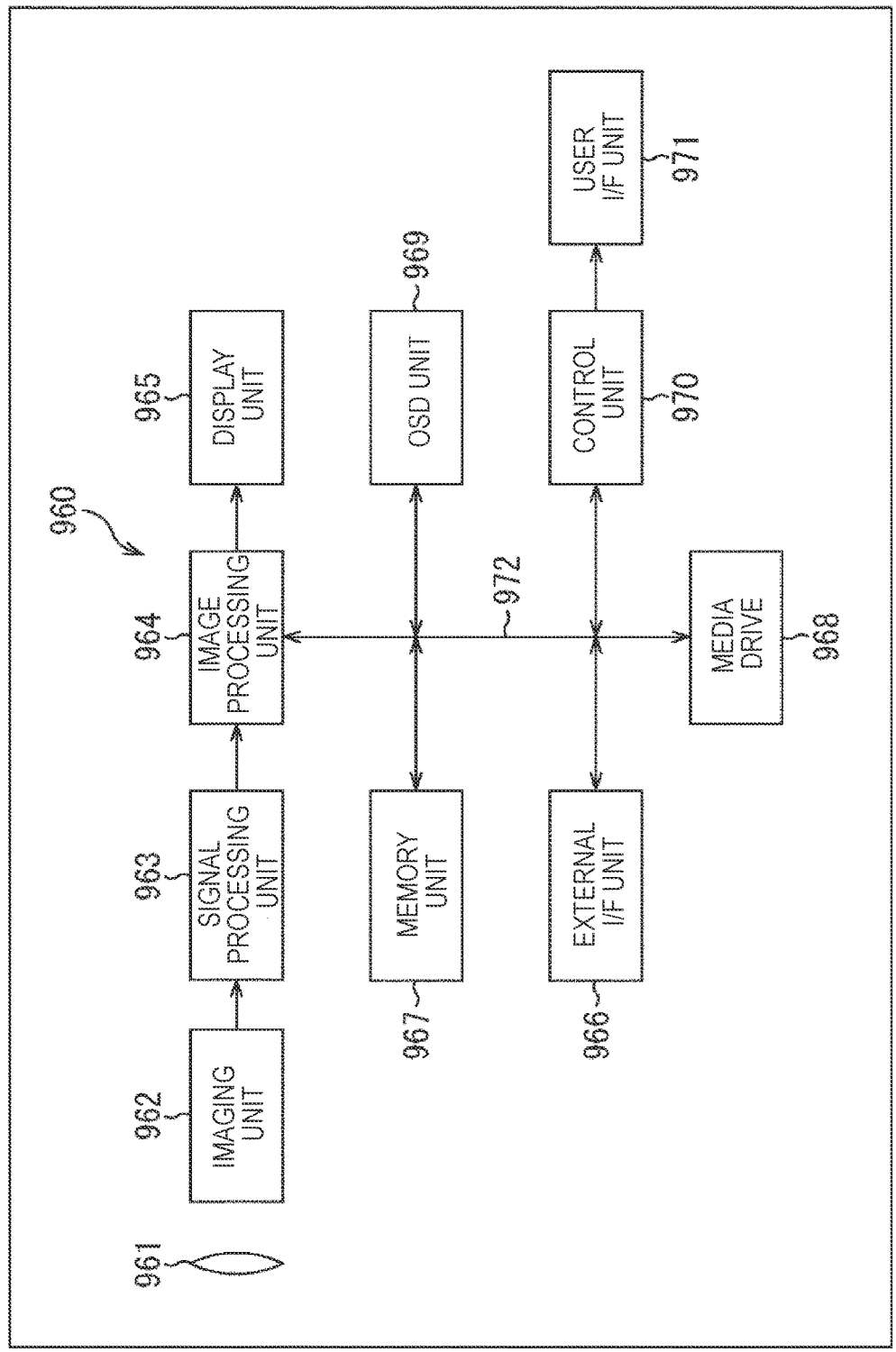
FIG. 29 is a block diagram illustrating an example of a schematic configuration of an imaging device.

FIG. 29 illustrates an example of a schematic configuration of an imaging device to which the above-described embodiment is applied. An imaging device 960 images a subject, generates an image, encodes image data, and records the data in the recording medium.

The imaging device 960 includes an optical block 961, an imaging unit 962, a signal processing unit 963, an image processing unit 964, a display unit 965, an external interface (I/F) unit 966, a memory unit 967, a media drive 968, an OSD 969, a control unit 970, a user interface (I/F) unit 971, and a bus 972.

The optical block 961 is connected to the imaging unit 962. The imaging unit 962 is connected to the signal processing unit 963. The display unit 965 is connected to the image processing unit 964. The user interface unit 971 is connected to the control unit 970. The bus 972 connects the image processing unit 964, the external interface unit 966, the memory unit 967, the media drive 968, the OSD 969, and the control unit 970 to one another.

The optical block 961 includes a focus lens and a diaphragm mechanism. The optical block 961 forms an optical image of the subject on an imaging area of the imaging unit 962. The imaging unit 962 includes an image sensor such as a charge coupled device (CCD) and a complementary metal oxide semiconductor (CMOS), and converts the optical image formed on the imaging area into an image signal as an electrical signal according to photoelectric conversion. Then, the imaging unit 962 outputs the image signal to the signal processing unit 963.

The signal processing unit 963 performs various types of camera signal processing such as knee correction, gamma correction, and color correction of the image signal input from the imaging unit 962. The signal processing unit 963 outputs the image data on which camera signal processing is performed to the image processing unit 964.

The image processing unit 964 encodes the image data input from the signal processing unit 963, and generates encoding data. Then, the image processing unit 964 outputs the generated encoding data to the external interface unit 966 or the media drive 968. In addition, the image processing unit 964 decodes the encoding data input from the external interface unit 966 or the media drive 968, and generates image data. Then, the image processing unit 964 outputs the generated image data to the display unit 965. In addition, the image processing unit 964 may output the image data input from the signal processing unit 963 to the display unit 965 and display an image. In addition, the image processing unit 964 may superimpose display data acquired from the OSD 969 on an image to be output to the display unit 965.

The OSD 969 generates an image of a GUI, for example, a menu, a button or a cursor, and outputs the generated image to the image processing unit 964.

The external interface unit 966 includes, for example, a USB input and output terminal. The external interface unit 966 connects the imaging device 960 and a printer, for example, when an image is printed. In addition, a drive is connected to the external interface unit 966 as necessary. A removable medium, for example, a magnetic disk or an optical disc, is mounted in the drive, and the program read from the removable medium may be installed in the imaging device 960. Further, the external interface unit 966 may be configured as a network interface that is connected to a network such as a LAN and the Internet. That is, the external interface unit 966 serves as the transmission unit in the imaging device 960.

The recording medium mounted in the media drive 968 may be a certain readable and writable removable medium, for example, a magnetic disk, a magneto optical disc, an optical disc, or a semiconductor memory. In addition, the recording medium is fixedly mounted in the media drive 968, and a non-portable storage unit, for example, a built-in hard disk drive or a solid state drive (SSD), may be provided.

The control unit 970 includes a processor such as a CPU and a memory such as a RAM and a ROM. The memory stores a program executed by the CPU and program data. The program stored in the memory is read and executed by the CPU, for example, when the imaging device 960 starts. The CPU executes the program, and therefore controls operations of the imaging device 960 according to, for example, a manipulation signal input from the user interface unit 971.

The user interface unit 971 is connected to the control unit 970. The user interface unit 971 includes, for example, a button and a switch for the user to manipulate the imaging device 960. The user interface unit 971 detects user manipulation through such components, generates a manipulation signal, and outputs the generated manipulation signal to the control unit 970.

In the imaging device 960 configured in this manner, for example, the image processing unit 964 may include functions of the image decoding device 100 or the image decoding device 300. That is, the image processing unit 964 may decode the encoding data using the method described in the first and second embodiments. Thus, the imaging device 960 can perform the decoding process of the encoding data more efficiently.

The present technology can be applied to HTTP streaming, for example, MPEG DASH, in which appropriate data is selected from and used in units of segments among a previously prepared plurality of pieces of encoding data whose resolutions are different. That is, information about encoding or decoding can be shared among the plurality of pieces of encoding data.

<7. Seventh Embodiment>
<Other examples>

Although the examples of devices, systems, and the like to which the present technology is applied have been described above, the present technology is not limited thereto, and can be implemented as any configuration mounted in the devices or devices constituting the systems, for example, processors in the form of system large scale integration (LSI), modules that use a plurality of processors, units that use a plurality of modules, sets obtained by further adding other functions to the units (i.e., a partial configuration of the devices), and the like.

<Video Set>

Figure 30:
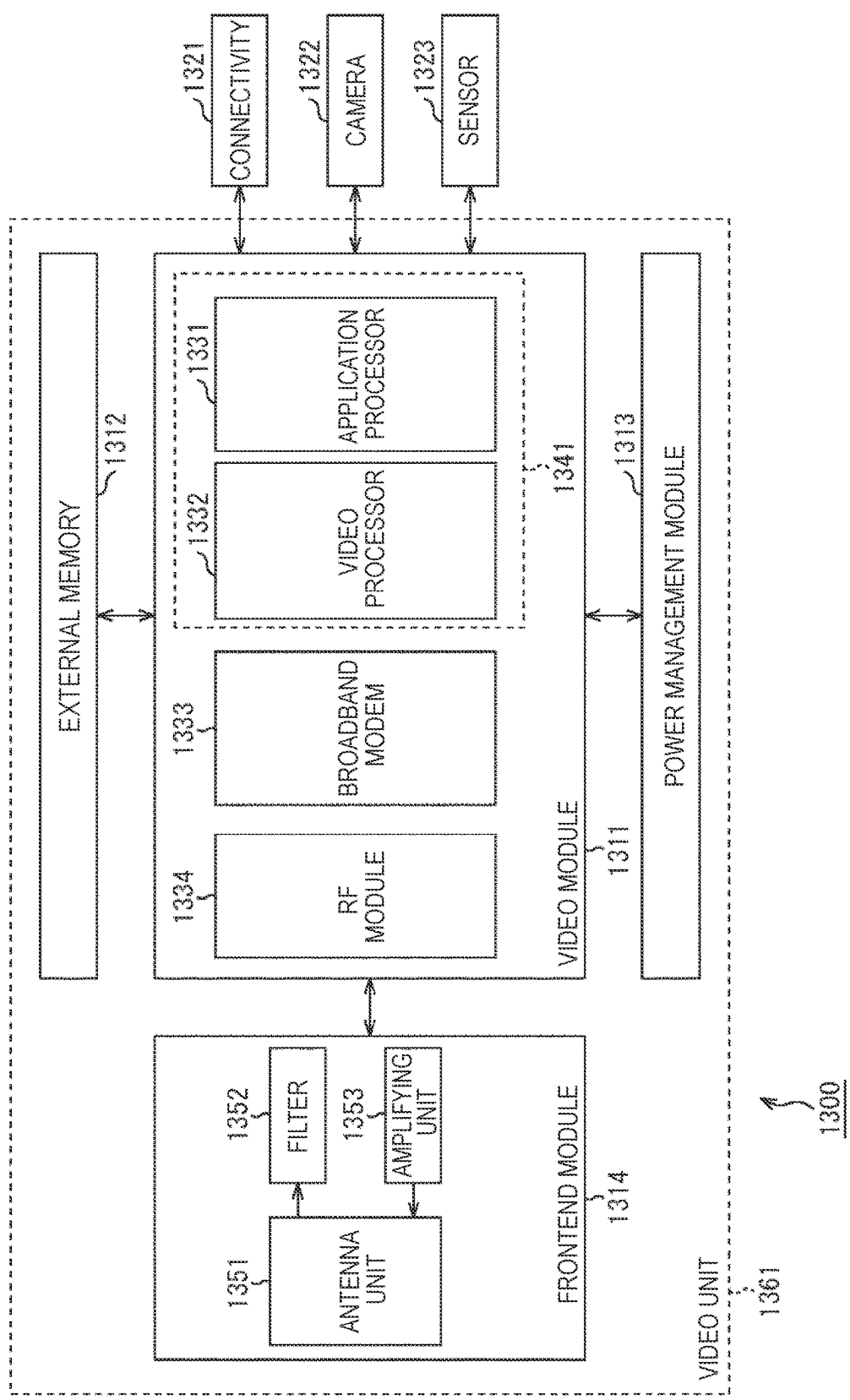
FIG. 30 is a block diagram illustrating an example of a schematic configuration of a video set.

An example in which the present technology is implemented as a set will be described with reference to FIG. 30. FIG. 30 illustrates an example of a schematic configuration of a video set to which the present technology is applied.

As electronic apparatuses have gradually become multifunctional in recent years, when some configurations of each apparatus are prepared for sale, provision, and the like in the stage of development and manufacturing, there are not only cases in which such an apparatus is configured to have one function, but also many cases in which a plurality of configurations having relevant functions are combined and implemented as one set with the plurality of functions.

The video set 1300 illustrated in FIG. 30 is configured to be multifunctional as described above by combining devices having functions of encoding and decoding (which may have either or both of the functions) of images with devices having other functions relating to the foregoing functions.

As illustrated in FIG. 30, the video set 1300 has a module group including a video module 1311, an external memory 1312, a power management module 1313, a frontend module 1314 and the like, and devices having relevant functions such as connectivity 1321, a camera 1322, a sensor 1323, and the like.

A module is a form of a component in which several related componential functions are gathered to provide a cohesive function. A specific physical configuration is arbitrary; however, it is considered to be an integration in which, for example, a plurality of processors each having functions, electronic circuit elements such as a resistor and a capacitor, and other devices are disposed on a circuit board. In addition, making a new module by combining a module with another module, a processor, or the like is also considered.

In the example of FIG. 30, the video module 1311 is a combination of configurations with functions relating to image processing, and has an application processor, a video processor, a broadband modem 1333, and an RF module 1334.

A processor is a semiconductor chip integrated with a configuration having predetermined functions using System-On-Chip (SoC), and is also referred to as, for example, system large scale integration (LSI), or the like. The configuration having a predetermined function may be a logic circuit (hardware configuration), may be, along with CPU, a ROM, and a RAM, a program that is executed by using the elements (software configuration), or may be a combination of both configurations. For example, a processor may have a logic circuit, a CPU, a ROM, a RAM, and the like and may realize some functions with the logic circuit (hardware configuration), or may realize the other functions with a program executed by the CPU (software configuration).

The application processor 1331 of FIG. 30 is a processor that executes an application relating to image processing. The application executed by the application processor 1331 can not only perform an arithmetic process but can also control a configuration internal and external to the video module 1311, for example, the video processor 1332 when necessary in order to realize predetermined functions.

The video processor 1332 is a processor having a function relating to (one or both of) encoding and decoding of images.

The broadband modem 1333 converts data (a digital signal) that is transmitted through either or both of wired and wireless broadband communication performed through a broadband line such as the Internet and a public telephone network into an analog signal according to digital modulation, demodulates the analog signal received through the broadband communication, and converts the signal into data (a digital signal). The broadband modem 1333 processes certain information, for example, image data processed by the video processor 1332, a stream in which image data is encoded, an application program, and setting data.

The RF module 1334 is a module which performs frequency conversion, modulation and demodulation, amplification, a filtering process, and the like on a radio frequency (RF) signal transmitted and received via an antenna. For example, the RF module 1334 generates an RF signal by performing frequency conversion and the like on a baseband signal generated by the broadband modem 1333. In addition, the RF module 1334, for example, generates a baseband signal by performing frequency conversion and the like on an RF signal received via the frontend module 1314.

Note that, as indicated by the dashed line 1341 in FIG. 30, the application processor 1331 and the video processor 1332 may be integrated to constitute one processor.

The external memory 1312 is a module that is provided outside the video module 1311, having a storage device used by the video module 1311. The storage device of the external memory 1312 may be realized with any physical configuration, but is generally used when large amounts of data such as image data in units of frames are stored, and thus it is desirable to realize the storage device with a relatively inexpensive and high-capacity semiconductor memory, for example, a dynamic random access memory (DRAM).

The power management module 1313 manages and controls power supply to the video module 1311 (each constituent element inside the video module 1311).

The frontend module 1314 is a module which provides the RF module 1334 with a frontend function (serving as a circuit of a transmitting and receiving end on an antenna side). The frontend module 1314 has, for example, an antenna unit 1351, a filter 1352, and an amplifying unit 1353 as illustrated in FIG. 30.

The antenna unit 1351 is configured with an antenna which transmits and receives wireless signals and peripherals thereof. The antenna unit 1351 transmits a signal supplied from the amplifying unit 1353 as a radio signal and supplies a received radio signal to the filter 1352 as an electric signal (RF signal). The filter 1352 performs a filtering process or the like on the RF signal received via the antenna unit 1351 and supplies the processed RF signal to the RF module 1334. The amplifying unit 1353 amplifies an RF signal supplied from the RF module 1334, and supplies the signal to the antenna unit 1351.

The connectivity 1321 is a module having a function relating to connection to the outside. A physical configuration of the connectivity 1321 is arbitrary. The connectivity 1321 has, for example, a configuration with a communication function other than that of a communication standard to which the broadband modem 1333 corresponds, an external input and output terminal, or the like.

For example, the connectivity 1321 may have a communicating function that is based on a wireless communication standard such as Bluetooth (a registered trademark), IEEE 802.11 (for example, Wireless Fidelity (Wi-Fi; a registered trademark), near field communication (NFC), or Infrared Data Association (IrDA), an antenna which transmits and receives signals based on the standard, or the like. In addition, the connectivity 1321 may have, for example, a module having a communicating function based on a wired communication standard such as Universal Serial Bus (USB), or High-Definition Multimedia Interface (HDMI; a registered trademark), or a terminal based on the standard. Furthermore, the connectivity 1321 may have, for example, another data (signal) transmitting function of an analog input and output terminal or the like.

Note that the connectivity 1321 may be set to include a device serving as a data (signal) transmission destination. For example, the connectivity 1321 may be set to have a drive (including a drive not only of a removable medium but also of a hard disk, a solid-state drive (SSD), a network-attached storage (NAS), or the like) which reads and writes data with respect to a recording medium such as a magnetic disk, an optical disc, a magneto-optical disc, or a semiconductor memory. In addition, the connectivity 1321 may be set to have an image or audio output device (a monitor, a speaker, or the like).

The camera 1322 is a module having a function of capturing a subject and obtaining image data of the subject. Image data obtained from capturing by the camera 1322 is, for example, supplied to and encoded by the video processor 1332.

The sensor 1323 is a module having arbitrary sensing functions of, for example, a sound sensor, an ultrasound sensor, a light sensor, an illuminance sensor, an infrared sensor, an image sensor, a rotation sensor, an angle sensor, an angular velocity sensor, a speed sensor, an acceleration sensor, an inclination sensor, a magnetic identification sensor, a shock sensor, a temperature sensor, and the like. Data detected by the sensor 1323 is, for example, supplied to the application processor 1331 and used by an application or the like.

The configurations described as modules above may be realized as processors, or conversely the configurations described as processors may be realized as modules.

In the video set 1300 with the configuration described above, the present technology can be applied to the video processor 1332 as will be described below. Thus, the video set 1300 can be implemented as a set to which the present technology is applied.

<Example of a Configuration of a Video Processor>

Figure 31:
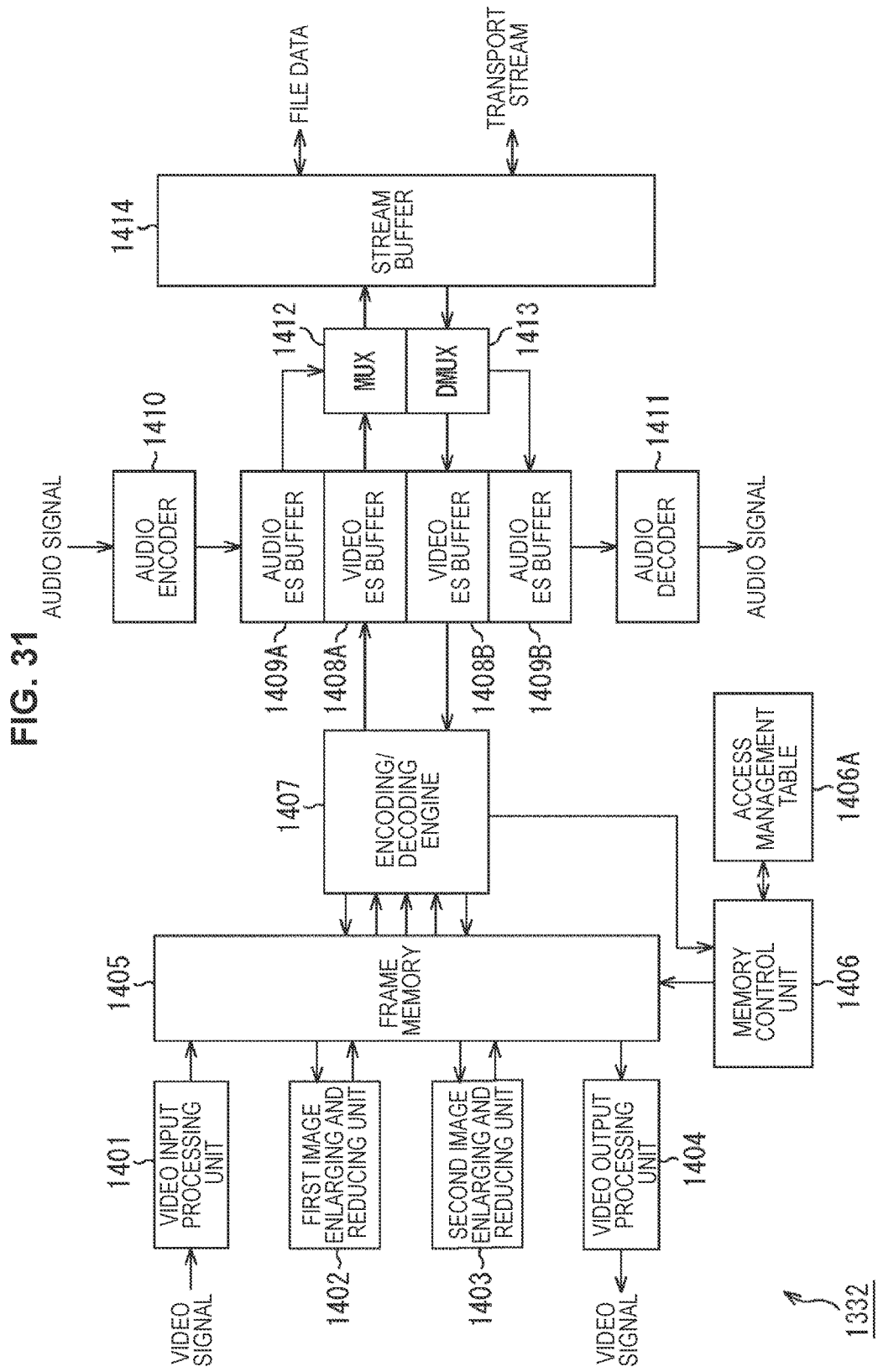
FIG. 31 is a block diagram illustrating an example of a schematic configuration of a video processor.

FIG. 31 illustrates an example of a schematic configuration of the video processor 1332 (of FIG. 30) to which the present technology is applied.

In the example of FIG. 31, the video processor 1332 has a function of receiving inputs of a video signal and an audio signal and encoding the signals in a predetermined scheme and a function of decoding encoded video data and audio data and outputting a video signal and an audio signal for reproduction.

As illustrated in FIG. 31, the video processor 1332 has a video input processing unit 1401, a first image enlarging and reducing unit 1402, a second image enlarging and reducing unit 1403, a video output processing unit 1404, a frame memory 1405, and a memory control unit 1406. In addition, the video processor 1332 has an encoding/decoding engine 1407, video elementary stream (ES) buffers 1408A and 1408B, and audio ES buffers 1409A and 1409B. Furthermore, the video processor 1332 has an audio encoder 1410, an audio decoder 1411, a multiplexer (MUX) 1412, a demultiplexer (DMUX) 1413, and a stream buffer 1414.

The video input processing unit 1401 acquires a video signal input from, for example, the connectivity 1321 (of FIG. 30), and converts the signal into digital image data. The first image enlarging and reducing unit 1402 performs format conversion, an image enlarging or reducing process or the like on image data. The second image enlarging and reducing unit 1403 performs an image enlarging or reducing process on the image data according to the format of a destination to which the data is output via the video output processing unit 1404, or performs format conversion, an image enlarging or reducing process or the like in the same manner as the first image enlarging and reducing unit 1402. The video output processing unit 1404 performs format conversion, conversion into an analog signal, or the like on image data, and outputs the data to, for example, the connectivity 1321 (of FIG. 38) as a reproduced video signal.

The frame memory 1405 is a memory for image data shared by the video input processing unit 1401, the first image enlarging and reducing unit 1402, the second image enlarging and reducing unit 1403, the video output processing unit 1404, and the encoding/decoding engine 1407. The frame memory 1405 is realized as a semiconductor memory, for example, a DRAM, or the like.

The memory control unit 1406 receives a synchronization signal from the encoding/decoding engine 1407 and controls access to the frame memory 1405 for writing and reading according to an access schedule to the frame memory 1405 which is written in an access management table 1406A. The access management table 1406A is updated by the memory control unit 1406 according to processes executed in the encoding/decoding engine 1407, the first image enlarging and reducing unit 1402, the second image enlarging and reducing unit 1403, and the like.

The encoding/decoding engine 1407 performs an encoding process of image data and a decoding process of a video stream that is data obtained by encoding image data. For example, the encoding/decoding engine 1407 encodes image data read from the frame memory 1405, and sequentially writes the data in the video ES buffer 1408A as video streams. In addition, for example, the encoding/decoding engine 1407 sequentially reads video streams from the video ES buffer 1408B, and sequentially writes the data in the frame memory 1405 as image data. The encoding/decoding engine 1407 uses the frame memory 1405 as a work area for such encoding and decoding. In addition, the encoding/decoding engine 1407 outputs a synchronization signal to the memory control unit 1406 at a timing at which, for example, a process on each micro block is started.

The video ES buffer 1408A buffers a video stream generated by the encoding/decoding engine 1407 and supplies the stream to the multiplexer (MUX) 1412. The video ES buffer 1408B buffers a video stream supplied from the demultiplexer (DMUX) 1413 and supplies the stream to the encoding/decoding engine 1407.

The audio ES buffer 1409A buffers an audio stream generated by an audio encoder 1410 and supplies the stream to the multiplexer (MUX) 1412. The audio ES buffer 1409B buffers an audio stream supplied from the demultiplexer (DMUX) 1413 and supplies the stream to an audio decoder 1411.

The audio encoder 1410, for example, digitally converts an audio signal input from, for example, the connectivity 1321 or the like, and encodes the signal in a predetermined scheme, for example, an MPEG audio scheme, an Audio-Code number 3 (AC3) scheme, or the like. The audio encoder 1410 sequentially writes audio streams that are data obtained by encoding audio signals in the audio ES buffer 1409A. The audio decoder 1411 decodes an audio stream supplied from the audio ES buffer 1409B, performs conversion into an analog signal, for example, and supplies the signal to, for example, the connectivity 1321 or the like as a reproduced audio signal.

The multiplexer (MUX) 1412 multiplexes a video stream and an audio stream. A method for this multiplexing (i.e., a format of a bit stream generated from multiplexing) is arbitrary. In addition, during multiplexing, the multiplexer (MUX) 1412 can also add predetermined header information or the like to a bit stream. That is to say, the multiplexer (MUX) 1412 can convert the format of a stream through multiplexing. By multiplexing a video stream and an audio stream, for example, the multiplexer (MUX) 1412 converts the streams into a transport stream that is a bit stream of a format for transport. In addition, by multiplexing a video stream and an audio stream, for example, the multiplexer (MUX) 1412 converts the streams into data of a file format for recording (file data).

The demultiplexer (DMUX) 1413 demultiplexes a bit stream obtained by multiplexing a video stream and an audio stream using a method which corresponds to the multiplexing performed by the multiplexer (MUX) 1412. That is to say, the demultiplexer (DMUX) 1413 extracts a video stream and an audio stream from a bit stream read from the stream buffer 1414 (separates the bit stream into the video stream and the audio stream). The demultiplexer (DMUX) 1413 can convert the format of a stream through demultiplexing (inverse conversion to conversion by the multiplexer (MUX) 1412). For example, the demultiplexer (DMUX) 1413 can acquire a transport stream supplied from, for example, the connectivity 1321, the broadband modem 1333, or the like via the stream buffer 1414, and convert the stream into a video stream and an audio stream through demultiplexing. In addition, for example, the demultiplexer (DMUX) 1413 can acquire file data read from various recording media by, for example, the connectivity 1321 via the stream buffer 1414, and convert the data into a video stream and an audio stream through demultiplexing.

The stream buffer 1414 buffers bit streams. For example, the stream buffer 1414 buffers a transport stream supplied from the multiplexer (MUX) 1412, and supplies the stream to, for example, the connectivity 1321, the broadband modem 1333, or the like at a predetermined timing or based on a request from outside or the like.

In addition, for example, the stream buffer 1414 buffers file data supplied from the multiplexer (MUX) 1412, and supplies the data to, for example, the connectivity 1321 or the like at a predetermined timing or based on a request from outside or the like to cause the data to be recorded on any of various kinds of recording media.

Furthermore, the stream buffer 1414 buffers a transport stream acquired via, for example, the connectivity 1321, the broadband modem 1333, or the like, and supplies the stream to the demultiplexer (DMUX) 1413 at a predetermined timing or based on a request from outside or the like.

In addition, the stream buffer 1414 buffers file data read from any of various kinds of recording media via, for example, the connectivity 1321 or the like, and supplies the data to the demultiplexer (DMUX) 1413 at a predetermined timing or based on a request from outside or the like.

Next, an example of an operation of the video processor 1332 having this configuration will be described. For example, a video signal input to the video processor 1332 from the connectivity 1321 or the like is converted into digital image data in a predetermined format such as a YCbCr format of 4:2:2 of in the video input processing unit 1401, and sequentially written in the frame memory 1405. This digital image data is read by the first image enlarging and reducing unit 1402 or the second image enlarging and reducing unit 1403, undergoes format conversion and an enlarging or reducing process in a predetermined format such as a YCbCr format of 4:2:0, and then is written in the frame memory 1405 again. This image data is encoded by the encoding/decoding engine 1407, and written in the video ES buffer 1408A as a video stream.

In addition, an audio signal input to the video processor 1332 from the connectivity 1321 is encoded by the audio encoder 1410, and then written in the audio ES buffer 1409A as an audio stream.

The video stream of the video ES buffer 1408A and the audio stream of the audio ES buffer 1409A are read and multiplexed by the multiplexer (MUX) 1412 to be converted into a transport stream, file data, or the like. The transport stream generated by the multiplexer (MUX) 1412 is buffered in the stream buffer 1414, and then output to an external network via, for example, the connectivity 1321, the broadband modem 1333, or the like. In addition, the file data generated by the multiplexer (MUX) 1412 is buffered in the stream buffer 1414, and output to, for example, the connectivity 1321 to be recorded in any of various kinds of recording media.

In addition, a transport stream input to the video processor 1332 from an external network via, for example, the connectivity 1321, the broadband modem 1333, or the like is buffered in the stream buffer 1414, and then demultiplexed by the demultiplexer (DMUX) 1413. In addition, for example, file data read from any of various kinds of recording media via the connectivity 1321 and input to the video processor 1332 is buffered in the stream buffer 1414, and then demultiplexed by the demultiplexer (DMUX) 1413. That is to say, the transport stream or the file data input to the video processor 1332 is separated into a video stream and an audio stream by the demultiplexer (DMUX) 1413.

The audio stream is supplied to the audio decoder 1411 via the audio ES buffer 1409B to be decoded, and an audio signal is reproduced. In addition, the video stream is written in the video ES buffer 1408B, then sequentially read by the encoding/decoding engine 1407 to be decoded, and written in the frame memory 1405. The decoded image data undergoes an enlarging and reducing process by the second image enlarging and reducing unit 1403, and is written in the frame memory 1405. Then, the decoded image data is read by the video output processing unit 1404, undergoes format conversion in a predetermined format such as the YCbCr format of 4:2:2, and is further converted into an analog signal, and a video signal is reproduced to be output.

When the present technology is applied to the video processor 1332 configured in this manner, the present technology according to the above-described embodiments may be applied to the encoding/decoding engine 1407. That is, for example, the encoding/decoding engine 1407 may include the above-described functions of the image decoding device 100 or the image decoding device 300. Thus, the video processor 1332 makes it possible to obtain the same effects described with reference to FIG. 1 to FIG. 15.

Note that the encoding/decoding engine 1407 of the present technology (i.e., the functions of the image decoding device 100 or the image decoding device 300) may be realized in the form of hardware such as a logic circuit, in the form of software such as an embedded program, or in both forms.

<Other Configuration Examples of a Video Processor>

Figure 32:
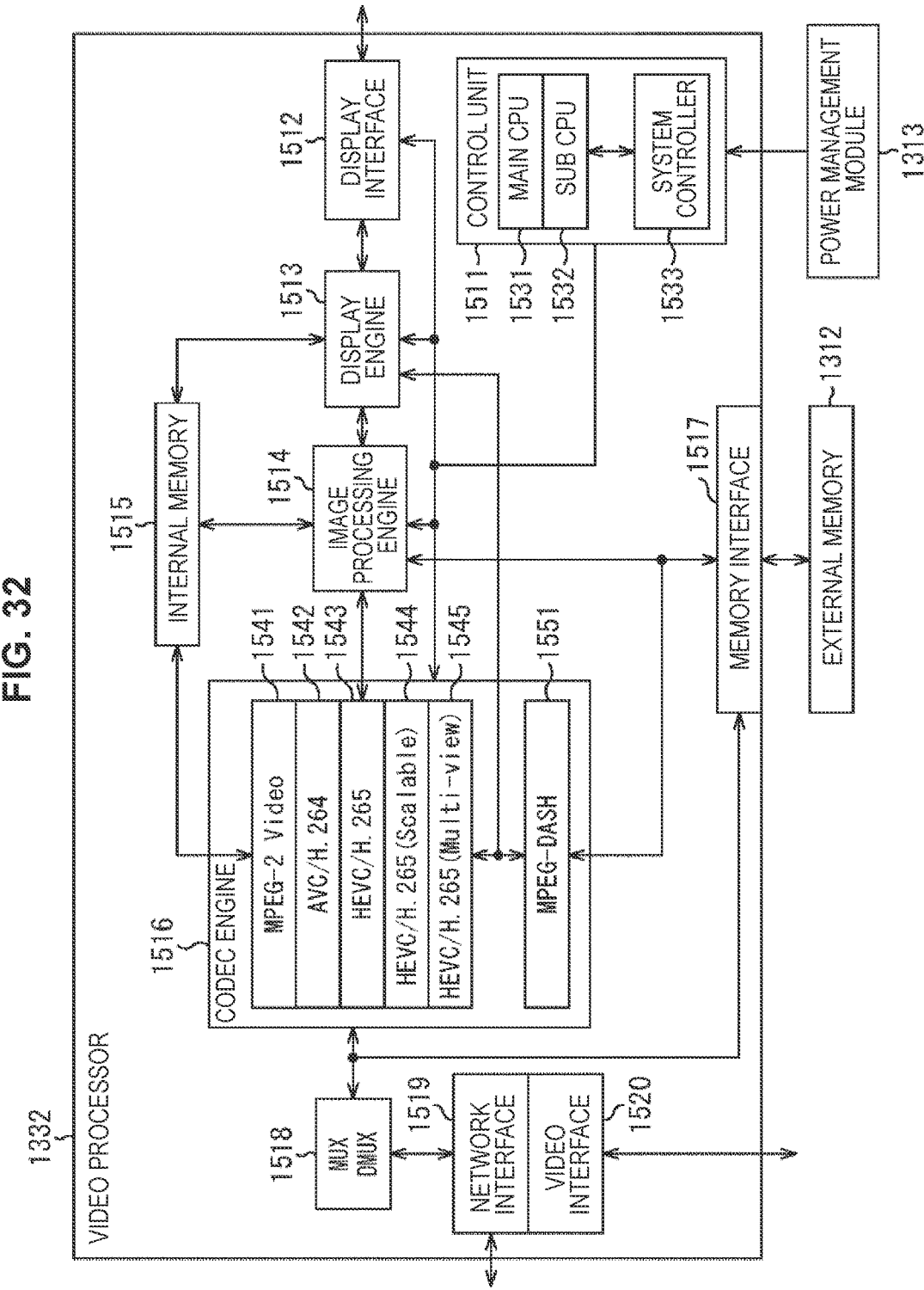
FIG. 32 is a block diagram illustrating another example of a schematic configuration of a video processor.

FIG. 32 illustrates another example of a schematic configuration of the video processor 1332 to which the present technology is applied. In the example of FIG. 32, the video processor 1332 includes a function of encoding and decoding video data according to a predetermined scheme.

More specifically, as illustrated in FIG. 32, the video processor 1332 includes a control unit 1511, a display interface 1512, a display engine 1513, an image processing engine 1514, and an internal memory 1515. In addition, the video processor 1332 includes a codec engine 1516, a memory interface 1517, a multiplexing and demultiplexing unit (MUX DMUX) 1518, a network interface 1519, and a video interface 1520.

The control unit 1511 controls operations of processing units in the video processor 1332, for example, the display interface 1512, the display engine 1513, the image processing engine 1514, and the codec engine 1516.

As illustrated in FIG. 32, the control unit 1511 includes, for example, a main CPU 1531, a sub CPU 1532, and a system controller 1533. The main CPU 1531 executes a program for controlling operations of processing units in the video processor 1332. The main CPU 1531 generates a control signal according to the program, and supplies the signal to the processing units (that is, controls operations of the processing units). The sub CPU 1532 has an auxiliary role of the main CPU 1531. For example, the sub CPU 1532 performs a child process and a subroutine of the program executed by the main CPU 1531. The system controller 1533 controls operations of the main CPU 1531 and the sub CPU 1532, for example, designating a program that the main CPU 1531 and the sub CPU 1532 execute.

The display interface 1512 outputs image data to, for example, the connectivity 1321, under control of the control unit 1511. For example, the display interface 1512 outputs image data of digital data as a video signal that is converted into an analog signal and is reproduced or image data of digital data without change to a monitor device of the connectivity 1321.

Under control of the control unit 1511, the display engine 1513 performs various types of transform processing of the image data such as a format transform, a size transform, and a color gamut transform to match hardware specifications of a monitor device on which the image is displayed.

Under control of the control unit 1511, the image processing engine 1514 performs predetermined image processing of the image data, for example, a filter process for improving image quality.

The internal memory 1515 is a memory that is shared among the display engine 1513, the image processing engine 1514, and the codec engine 1516 and is provided inside the video processor 1332. The internal memory 1515 is used for exchange of data that is performed among, for example, the display engine 1513, the image processing engine 1514, and the codec engine 1516. For example, the internal memory 1515 stores data supplied from the display engine 1513, the image processing engine 1514, or the codec engine 1516, and as necessary (for example, in response to a request), supplies the data to the display engine 1513, the image processing engine 1514, or the codec engine 1516. The internal memory 1515 may be implemented by any storage device. However, in general, the internal memory 1515 is used to store small capacity data such as image data in units of blocks or parameters in many cases. Therefore, it is preferable that the internal memory 1515 be implemented by a semiconductor memory having a high response rate even if it has a relatively (for example, compared to the external memory 1312) small capacity, like a static random access memory (SRAM).

The codec engine 1516 performs a process of encoding or decoding image data. An encoding and decoding scheme corresponding to the codec engine 1516 is arbitrary, and the number of schemes may be one or plural. For example, the codec engine 1516 may include a codec function of a plurality of encoding and decoding schemes, and may encode image data or decode encoding data according to a scheme selected therefrom.

In the example illustrated in FIG. 32, the codec engine 1516 includes, as functional blocks of a codec process, for example, an MPEG-2 Video 1541, an AVC/H.264 1542, an HEVC/H.265 1543, an HEVC/H.265 (Scalable) 1544, an HEVC/H.265 (Multi-view) 1545, and an MPEG-DASH 1551.

The MPEG-2 Video 1541 is a functional block that encodes or decodes image data according to an MPEG-2 scheme. The AVC/H.264 1542 is a functional block that encodes or decodes image data according to an AVC scheme. The HEVC/H.265 1543 is a functional block that encodes or decodes image data according to an HEVC scheme. The HEVC/H.265 (Scalable) 1544 is a functional block that scalably encodes or scalably decodes image data according to an HEVC scheme. The HEVC/H.265 (Multi-view) 1545 is a functional block that performs multi-view encoding or multi-view decoding of image data according to an HEVC scheme.

The MPEG-DASH 1551 is a functional block that transmits and receives image data according to an MPEG-Dynamic Adaptive Streaming over HTTP (MPEG-DASH) scheme. The MPEG-DASH is a technique in which video streaming is performed using HyperText Transmit Protocol (HTTP), and has one feature in which appropriate data is selected and transmitted in units of segments from among a previously prepared plurality of pieces of encoding data whose resolutions are different. In the MPEG-DASH 1551, a stream based on a standard is generated, transmission control of the stream is performed, and the above-described MPEG-2 Video 1541 to the HEVC/H.265 (Multi-view) 1545 are used to encode and decode image data.

The memory interface 1517 is an interface for the external memory 1312. Data supplied from the image processing engine 1514 or the codec engine 1516 is supplied to the external memory 1312 through the memory interface 1517. In addition, data read from the external memory 1312 is supplied to the video processor 1332 (the image processing engine 1514 or the codec engine 1516) through the memory interface 1517.

The multiplexing and demultiplexing unit (MUX DMUX) 1518 multiplexes or demultiplexes various types of data regarding an image, for example, a bitstream of encoding data, image data, and a video signal. The multiplexing and demultiplexing method is arbitrary. For example, when multiplexing is performed, the multiplexing and demultiplexing unit (MUX DMUX) 1518 can combine a plurality of pieces of data into one piece of data, and add predetermined header information to the data. In addition, when demultiplexing is performed, the multiplexing and demultiplexing unit (MUX DMUX) 1518 can divide one piece of data into a plurality of pieces of data and add predetermined header information to each divided piece of data. That is, the multiplexing and demultiplexing unit (MUX DMUX) 1518 can transform a data format according to multiplexing and demultiplexing. For example, the multiplexing and demultiplexing unit (MUX DMUX) 1518 multiplexes the bitstream and therefore can transform the bitstream into a transport stream which is a bitstream having a format for transmission or data (file data) having a file format for recording. It is needless to say that an inverse transform according to demultiplexing is possible.

The network interface 1519 is an interface for, for example, the broadband modem 1333, the connectivity 1321 and the like. The video interface 1520 is an interface for, for example, the connectivity 1321 or the camera 1322.

Next, an example of operations of the video processor 1332 will be described. For example, when a transport stream is received from an external network through the connectivity 1321 or the broadband modem 1333, the transport stream is supplied to and demultiplexed in the multiplexing and demultiplexing unit (MUX DMUX) 1518 through the network interface 1519, and is decoded by the codec engine 1516. Image data obtained by decoding performed by the codec engine 1516 undergoes, for example, predetermined image processing performed by the image processing engine 1514, undergoes a predetermined transform performed by the display engine 1513, and is supplied to, for example, the connectivity 1321 through the display interface 1512, and the image is displayed on a monitor. In addition, for example, the image data obtained by decoding performed by the codec engine 1516 is re-encoded by the codec engine 1516, is multiplexed by the multiplexing and demultiplexing unit (MUX DMUX) 1518, is transformed into file data, is output to, for example, the connectivity 1321 through the video interface 1520, and is recorded in various types of recording media.

Further, for example, file data of encoding data obtained by encoding image data read from a recording medium (not illustrated) by the connectivity 1321 is supplied to and demultiplexed in the multiplexing and demultiplexing unit (MUX DMUX) 1518 through the video interface 1520, and is decoded by the codec engine 1516. The image data obtained by decoding performed by the codec engine 1516 undergoes predetermined image processing by the image processing engine 1514, undergoes a predetermined transform by the display engine 1513, and is supplied to, for example, the connectivity 1321, through the display interface 1512, and the image is displayed on a monitor. In addition, for example, the image data obtained by decoding performed by the codec engine 1516 is re-encoded by the codec engine 1516, is multiplexed by the multiplexing and demultiplexing unit (MUX DMUX) 1518, is transformed into a transport stream, is supplied to, for example, the connectivity 1321 or the broadband modem 1333 through the network interface 1519, and is transmitted to another device (not illustrated).

Exchange of the image data or other data among the processing units in the video processor 1332 may be performed using, for example, the internal memory 1515 or the external memory 1312. In addition, the power management module 1313 controls power supply to, for example, the control unit 1511.

When the present technology is applied to the video processor 1332 configured in this manner, the above-described embodiments according to the present technology may be applied to the codec engine 1516. That is, for example, the codec engine 1516 may have a functional block that implements the above-described image decoding device 100 or image decoding device 300. Thus, the video processor 1332 makes it possible to obtain the same effects described with reference to FIG. 1 to FIG. 15.

In the codec engine 1516, the present technology (that is, functions of the image decoding device 100) may be implemented by either or both of hardware such as a logic circuit and software such as an embedded program.

While two configuration examples of the video processor 1332 have been described above, the video processor 1332 has an arbitrary configuration, and may have a configuration other than the above two examples. In addition, the video processor 1332 may include one semiconductor chip or a plurality of semiconductor chips, for example, a 3-dimensional stacked LSI in which a plurality of semiconductors are stacked. In addition, the video processor 1332 may be implemented by a plurality of LSIs.

<Application Example to Devices>

The video set 1300 can be embedded into various devices configured to process image data. The video set 1300 can be embedded in, for example, the television device 900 (FIG. 26), the mobile phone 920 (FIG. 27), the recording and reproduction device 940 (FIG. 28), or the imaging device 960 (FIG. 29). When the video set 1300 is embedded, the device makes it possible to obtain the same effects described with reference to FIG. 1 to FIG. 15.

Even in a part of each configuration of the above-described video set 1300, as long as the video processor 1332 is included, it can be implemented as a configuration to which the present technology is applied. For example, the video processor 1332 alone can be implemented as a video processor to which the present technology is applied. In addition, for example, as described above, the processor indicated by the dashed line 1341 or the video module 1311 can be implemented as a processor or a module to which the present technology is applied. Moreover, for example, a combination of the video module 1311, the external memory 1312, the power management module 1313, and the frontend module 1314 can be implemented as a video unit 1361 to which the present technology is applied. Any configuration makes it possible to obtain the same effects described with reference to FIG. 1 to FIG. 15.

That is, as long as the video processor 1332 is included, any configuration can be embedded in various devices configured to process image data, similarly to the case of the video set 1300. For example, the video processor 1332, the processor indicated by the dashed line 1341, the video module 1311, or the video unit 1361 can be embedded in, for example, the television device 900 (FIG. 26), the mobile phone 920 (FIG. 27), the recording and reproduction device 940 (FIG. 28), or the imaging device 960 (FIG. 29). Then, when any configuration to which the present technology is applied is embedded, the device makes it possible to obtain the same effects described with reference to FIG. 1 to FIG. 15, similarly to the case of the video set 1300.

In addition, an example in which various pieces of information are multiplexed in an encoding stream and transmitted from the encoding side to the decoding side has been described herein. However, a method of transmitting such information is not limited to such an example. For example, instead of multiplexing such information in the encoding bitstream, it may be transmitted or recorded as separate data associated with the encoding bitstream. Here, the description "associated with" means that an image (including a part of an image such as a slice or a block) included in the bitstream and information corresponding to the image may be linked when decoding is performed. That is, information may be transmitted through a different transmission path from that of an image (or a bitstream). In addition, information may be recorded in a different recording medium (or another recording area of the same recording medium) from that of an image (or a bitstream). Further, information and an image (or a bitstream) may be associated according to an arbitrary unit, for example, a plurality of frames, one frame, or a part of a frame.

Additionally, the present technology may also be configured as below.

(1)
An image decoding device including:
a decoding unit configured to generate decoded data by decoding encoding data obtained by encoding image data; and
a processing unit configured to independently perform processes of the decoded data generated by the decoding unit for each block size performed in a method according to a block size based on a block structure of the encoding data.

(2)
The image decoding device according to (1), wherein the processing unit includes an inverse quantization unit configured to perform inverse quantization of the decoded data that is quantized.

(3)
The image decoding device according to (1) or (2), wherein
the block structure is information indicating a number and positions of transform units for each size, and
the inverse quantization unit independently performs inverse quantization for each size of the transform unit.

(4)
The image decoding device according to any one of (1) to (3), wherein
the processing unit includes an inverse orthogonal transform unit configured to perform an inverse orthogonal transform of the decoded data that is orthogonally transformed.

(5)
The image decoding device according to any one of (1) to (4), wherein
the block structure is information indicating a number and positions of transform units for each size, and
the inverse orthogonal transform unit independently performs an inverse orthogonal transform for each size of the transform unit.

(6)
The image decoding device according to any one of (1) to (5), wherein
the processing unit includes an inter prediction unit configured to generate a prediction image on which motion compensation is performed.

(7)
The image decoding device according to any one of (1) to (6), wherein
the block structure is information indicating a number and positions of prediction units for each size, and
the inter prediction unit independently performs motion compensation for each size of the prediction unit.

(8)
The image decoding device according to any one of (1) to (7), wherein
the block structure is information indicating a number and positions of coding units for each size, and
the inter prediction unit independently performs motion compensation for each size of the coding unit.

(9)
The image decoding device according to any one of (1) to (8), wherein
the processing unit performs processes performed in a method according to the block size in parallel for each block size.

(10)
The image decoding device according to any one of (1) to (9), further including
an analysis unit configured to analyze a block structure of the encoding data,
wherein the processing unit independently performs processes performed in a method according to the block size based on an analysis result of the block structure by the analysis unit for each block size.

(11)
The image decoding device according to any one of (1) to (10), wherein
the analysis unit obtains a number of generations and generation positions of coding units of the encoding data for each size.

(12)
The image decoding device according to any one of (1) to (11), wherein
the analysis unit obtains a number of generations and generation positions of transform units of the encoding data for each size.

(13)
The image decoding device according to any one of (1) to (12), wherein the analysis unit obtains a number of generations and generation positions of prediction units of the encoding data for each size.

(14)

The image decoding device according to any one of (1) to (13), further including a parallel control unit configured to control parallelization of processes performed in a method according to the block size based on an amount of a processing load for each block size.

(15)

The image decoding device according to any one of (1) to (14), wherein the parallel control unit parallelizes processes performed in a method according to the block size such that an amount of a load is as uniform as possible.

(16)

The image decoding device according to any one of (1) to (15), wherein the parallel control unit obtains an amount of a processing load for each block size based on an environment.

(17)

The image decoding device according to any one of (1) to (16), wherein the parallel control unit obtains an amount of a processing load for each block size based on a calibration result.

(18)

An image decoding method including:

generating decoded data by decoding encoding data obtained by encoding image data; and independently performing processes of the generated decoded data performed in a method according to a block size for each block size based on a block structure of the encoding data.

REFERENCE SIGNS LIST 100 image decoding device
112 reversible decoding unit
113 block analysis unit
114 inverse quantization unit
115 inverse orthogonal transform unit
121 inter prediction unit
131 CU analysis unit
132 TU analysis unit
133 PU analysis unit

The invention claimed is:

1. An image decoding device, comprising:
at least one processor configured to:
generate decoded data from encoded image data; and
collectively control processes of the decoded data for each size of transform units based on a block structure of the encoded image data, wherein the block structure is information that indicates at least a number of prediction units and positions of the prediction units for each size of the prediction units, wherein the prediction units are grouped for the each size of the prediction units; and
collectively process the transform units of same size.

2. The image decoding device according to claim 1, wherein the at least one processor is further configured to control inverse quantization of the decoded data that is quantized.

3. The image decoding device according to claim 2, wherein the information further indicates a number of the transform units and positions of the transform units for the each size of the transform units, and the at least one processor is further configured to independently control inverse quantization for the each size of the transform units.

4. The image decoding device according to claim 1, wherein the at least one processor is further configured to control an inverse orthogonal transform of the decoded data that is orthogonally transformed.

5. The image decoding device according to claim 4, wherein the at least one processor is further configured to independently control the inverse orthogonal transform for the each size of the transform units.

6. The image decoding device according to claim 1, wherein the at least one processor is further configured to generate a prediction image which is motion compensated.

7. The image decoding device according to claim 6, wherein wherein the at least one processor is further configured to independently control motion compensation for the each size of the prediction units.

8. The image decoding device according to claim 6, wherein the information further indicates a number of coding units and positions of the coding units for each size of the coding units, and the at least one processor is further configured to control motion compensation for the each size of the coding units.

9. The image decoding device according to claim 1, wherein the at least one processor is further configured to control the processes in parallel for the each size of the transform units based on a respective size of the transform units.

10. The image decoding device according to claim 1, wherein the at least one processor is further configured to:
analyze the block structure of the encoded image data; and
independently control the processes based on the analyzed block structure for the each size of the transform units.

11. The image decoding device according to claim 10, wherein the at least one processor is further configured to obtain a number of generations and generation positions of coding units of the encoded image data for each size of the coding units.

12. The image decoding device according to claim 10, wherein the at least one processor is further configured to obtain a number of generations and generation positions of the transform units of the encoded image data for the each size of the transform units.

13. The image decoding device according to claim 10, wherein the at least one processor is further configured to obtain a number of generations and generation positions of the prediction units of the encoded image data for the each size of the prediction units.

14. The image decoding device according to claim 1, wherein the at least one processor is further configured to control parallelization of the processes based on an amount of a processing load for the each size of the transform units.

15. The image decoding device according to claim 14, wherein
the at least one processor is further configured to parallelize the processes such that the amount of the processing load is uniform.

16. The image decoding device according to claim 14, wherein
the at least one processor is further configured to obtain the amount of the processing load for the each size based on hardware specifications of the image decoding device.

17. The image decoding device according to claim 14, wherein
the at least one processor is further configured to:
obtain, based on a calibration process, a calibration result to measure performance of the each size of the transform units; and
obtain the amount of the processing load for the each size of the transform units based on the calibration result.

18. An image decoding method, comprising:
generating decoded data from encoded image data; and
collectively controlling processes of the decoded data for each size of transform units based on a block structure of the encoded image data, wherein the block structure is information that includes at least a number of prediction units and position of the prediction units for each size of the prediction units,
wherein the prediction units are grouped for the each size of the prediction units; and
collectively processing the transform units of same size.

* * * * *